(12) United States Patent
Kim

(10) Patent No.: US 8,937,698 B2
(45) Date of Patent: Jan. 20, 2015

(54) METHOD OF MANUFACTURING A LIQUID CRYSTAL DISPLAY HAVING HIGH RESPONSE SPEED

(75) Inventor: Jae-Hoon Kim, Yongin-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 13/533,440

(22) Filed: Jun. 26, 2012

(65) Prior Publication Data

US 2012/0282838 A1    Nov. 8, 2012

Related U.S. Application Data

(62) Division of application No. 12/676,354, filed on Mar. 3, 2010.

(30) Foreign Application Priority Data

| Sep. 17, 2008 | (KR) | 10-2008-0091055 |
|---|---|---|
| Oct. 31, 2008 | (KR) | 10-2008-0107985 |
| Dec. 29, 2008 | (KR) | 10-2008-0135660 |
| Jan. 5, 2009 | (KR) | 10-2009-0000314 |
| Jan. 5, 2009 | (KR) | 10-2009-0000315 |
| Jan. 23, 2009 | (KR) | 10-2009-0006338 |
| Feb. 19, 2009 | (KR) | 10-2009-0013805 |
| Feb. 19, 2009 | (KR) | 10-2009-0013929 |
| Mar. 18, 2009 | (KR) | 10-2009-0023199 |
| Mar. 19, 2009 | (KR) | 10-2009-0023676 |
| Apr. 7, 2009 | (KR) | 10-2009-0030068 |
| May 15, 2009 | (KR) | 10-2009-0042842 |
| May 15, 2009 | (KR) | 10-2009-0042843 |
| May 15, 2009 | (KR) | 10-2009-0042855 |
| May 15, 2009 | (KR) | 10-2009-0042856 |
| May 19, 2009 | (KR) | 10-2009-0043702 |
| May 29, 2009 | (KR) | 10-2009-0047851 |
| Sep. 15, 2009 | (KR) | 10-2009-0087024 |
| Sep. 15, 2009 | (KR) | 10-2009-0087083 |
| Sep. 17, 2009 | (WO) | PCT/KR2009/005278 |

(51) Int. Cl.
 *G02F 1/1337* (2006.01)
 *G02F 1/13* (2006.01)

(52) U.S. Cl.
 USPC .......... 349/124; 349/123; 349/128; 349/134; 349/136; 349/187

(58) Field of Classification Search
 USPC ................. 349/134, 136, 123–124, 128, 187
 See application file for complete search history.

(56) References Cited

U.S. PATENT DOCUMENTS

| 5,438,421 A | 8/1995 | Sugawara et al. |
|---|---|---|
| 5,786,041 A | 7/1998 | Takenaka et al. |

(Continued)

FOREIGN PATENT DOCUMENTS

| CN | 1646662 | 7/2005 |
|---|---|---|
| CN | 101206365 | 6/2008 |

(Continued)

OTHER PUBLICATIONS

European Search Report corresponding to EP 09814762.2, Feb. 17, 2012, 9 pages.

(Continued)

*Primary Examiner* — Lauren Nguyen

(74) *Attorney, Agent, or Firm* — Innovation Counsel LLP

(57) ABSTRACT

First alignment is performed by forming an alignment layer that includes a photopolymerizable monomer or oligomer on a substrate and the like, introducing liquid crystal, and bringing the liquid crystal into contact with the alignment layer including the photopolymerizable monomer or oligomer. The liquid crystal is then subjected to secondary alignment by photopolymerizing the photopolymerizable monomer or oligomer including the alignment layer to form an alignment regulator in a state in which an electric field is applied to the liquid crystal to change the alignment of the liquid crystal.

8 Claims, 43 Drawing Sheets

(56) References Cited

U.S. PATENT DOCUMENTS

| | | | |
|---|---|---|---|
| 6,128,058 | A | 10/2000 | Walton |
| 6,191,836 | B1 | 2/2001 | Woo et al. |
| 6,335,776 | B1 | 1/2002 | Kim et al. |
| 6,512,569 | B1 | 1/2003 | Acosta et al. |
| 6,696,114 | B1 | 2/2004 | Kawatsuki et al. |
| 7,105,209 | B2 | 9/2006 | Heckmeier et al. |
| 7,294,369 | B2 | 11/2007 | Harding et al. |
| 7,326,449 | B2 | 2/2008 | Geisow et al. |
| 7,929,091 | B2 | 4/2011 | Shin et al. |
| 8,178,288 | B2 | 5/2012 | Yen et al. |
| 8,345,201 | B2 | 1/2013 | Mizusaki et al. |
| 8,481,130 | B2 | 7/2013 | Harding et al. |
| 2001/0005249 | A1 | 6/2001 | Stebler et al. |
| 2002/0054270 | A1 | 5/2002 | Kim |
| 2003/0203130 | A1* | 10/2003 | Geisow et al. ............... 428/1.2 |
| 2004/0046914 | A1 | 3/2004 | Hirota |
| 2004/0169806 | A1* | 9/2004 | Takeda et al. ............... 349/130 |
| 2005/0116200 | A1 | 6/2005 | Nakanishi et al. |
| 2005/0162596 | A1* | 7/2005 | Kim et al. .................... 349/134 |
| 2006/0050209 | A1 | 3/2006 | Higa |
| 2006/0139537 | A1* | 6/2006 | Park et al. .................... 349/123 |
| 2006/0152660 | A1 | 7/2006 | Tanaka et al. |
| 2007/0024786 | A1* | 2/2007 | Tanaka et al. ............... 349/139 |
| 2007/0109466 | A1 | 5/2007 | Choi et al. |
| 2008/0062354 | A1 | 3/2008 | Ho et al. |
| 2008/0106689 | A1 | 5/2008 | Inoue et al. |
| 2008/0151145 | A1 | 6/2008 | Kumazawa et al. |
| 2008/0153379 | A1 | 6/2008 | Kumazawa et al. |
| 2008/0160222 | A1* | 7/2008 | Harding et al. .............. 428/1.26 |
| 2008/0179565 | A1* | 7/2008 | Hsieh et al. ................. 252/299.5 |
| 2009/0002618 | A1 | 1/2009 | Lee et al. |
| 2010/0085524 | A1 | 4/2010 | Nakagawa |
| 2011/0128486 | A1 | 6/2011 | Kim |
| 2011/0128487 | A1 | 6/2011 | Kim |
| 2011/0164213 | A1 | 7/2011 | Nakanishi et al. |

FOREIGN PATENT DOCUMENTS

| | | |
|---|---|---|
| EP | 1498468 A1 | 1/2005 |
| EP | 2352061 A1 | 8/2011 |
| JP | 05-188377 | 7/1993 |
| JP | 10-039308 A | 2/1998 |
| JP | 10-268318 A | 10/1998 |
| JP | 2000-122066 | 4/2000 |
| JP | 2003-177418 | 6/2003 |
| JP | 2003-287755 | 10/2003 |
| JP | 2003-307720 | 10/2003 |
| JP | 2004-286984 | 10/2004 |
| JP | 2004-301979 | 10/2004 |
| JP | 2005-120091 | 5/2005 |
| JP | 2006-171304 A | 6/2006 |
| JP | 2006-215184 | 8/2006 |
| JP | 2007-501958 | 2/2007 |
| JP | 2008-076950 | 4/2008 |
| KR | 10-1993-0002869 | 2/1993 |
| KR | 10-2006-0018401 | 3/2006 |
| WO | 95/34843 A | 12/1995 |
| WO | 2008-108032 | 9/2008 |
| WO | 2010/026721 | 3/2010 |
| WO | 2010-047011 A1 | 4/2010 |

OTHER PUBLICATIONS

European Search Report corresponding to EP 09814778.8, Mar. 2, 2012, 12 pages.
International Search Report for PCT/KR2009/005247 dated Apr. 27, 2010 (3 pages).
Written Opinion of the International Searching Authority for PCT/KR 2009/005247 dated Apr. 27, 2010 (5 pages).
International Search Report for PCT/KR2009/005278 dated Mar. 22, 2010 (4 pages).
Written Opinion of the International Searching Authority for PCT/KR 2009/005278 dated Mar. 22, 2010 (3 pages).

* cited by examiner

METHOD OF MANUFACTURING A LIQUID CRYSTAL DISPLAY HAVING HIGH RESPONSE SPEED

RELATED APPLICATIONS

This application is a divisional of U.S. patent application Ser. No. 12/676,354, filed Mar. 3, 2010, which claims priority of International Patent Corporation Treaty Application No. PCT/KR2009/005278, filed on Sep. 17, 2009, which claims priority of Korean Patent Application No. 10-2008-0091055, filed Sep. 17, 2008, Korean Patent Application No. 10-2008-0107985, filed Oct. 31, 2008, Korean Patent Application No. 10-2008-0135660, filed Dec. 29, 2008, Korean Patent Application No. 10-2009-0000314, filed Jan. 5, 2009, Korean Patent Application No. 10-2009-0000315, filed Jan. 5, 2009, Korean Patent Application No. 10-2009-0006338, filed Jan. 23, 2009, Korean Patent Application No. 10-2009-0013929, filed Feb. 19, 2009, Korean Patent Application No. 10-2009-0013805, filed Feb. 19, 2009, Korean Patent Application No. 10-2009-0023199, filed Mar. 18, 2009, Korean Patent Application No. 10-2009-0023676, filed Mar. 19, 2009, Korean Patent Application No. 10-2009-0030068, filed Apr. 7, 2009, Korean Patent Application No. 10-2009-0042855, filed May 15, 2009, Korean Patent Application No. 10-2009-0042856, filed May 15, 2009, Korean Patent Application No. 10-2009-0042842, filed May 15, 2009, Korean Patent Application No. 10-2009-0042843, filed May 15, 2009, Korean Patent Application No. 10-2009-0043702, filed May 19, 2009, Korean Patent Application No. 10-2009-0047851, filed May 29, 2009, Korean Patent Application No. 10-2009-0087083, filed Sep. 15, 2009, Korean Patent Application No. 10-2009-0087024, filed Sep. 15, 2009, the entire disclosures of which are incorporated herein by reference.

BACKGROUND OF THE INVENTION (a) Field of the Invention

The present description relates to a liquid crystal display and a method for manufacturing the same.

(b) Description of the Related Art

Currently, various kinds of flat panel displays are being developed. Among them, a liquid crystal display is a flat panel display that is extensively used for the most various purposes.

Liquid crystal displays, according to an arrangement state of liquid crystal and a driving manner, include a twisted nematic (TN) liquid crystal display, a vertically aligned (VA) liquid crystal display, an in-plane switching (IPS) liquid crystal display, an optically compensated bend (OCB) liquid crystal display, and the like. In these liquid crystal displays, the liquid crystal has a predetermined arrangement at an early stage due to effects of an alignment layer and intrinsic properties of the liquid crystal, the arrangement of the liquid crystal is changed if an electric field is applied thereto due to an optical anisotropic property of the liquid crystal, a polarization state of light passing through the liquid crystal varies according to an arrangement state of the liquid crystal, and the difference is represented by a difference in amount of light transmitted through a polarizer to display an image.

The alignment that determines an initial arrangement of the liquid crystal is generally performed by rubbing the alignment layer in a predetermined direction using a rubbing method. However, since the rubbing method is mechanically performed, it is difficult to precisely control the initial alignment state of the liquid crystal and provide different alignment directions for each fine region.

Meanwhile, since the liquid crystal display changes an image through a mechanical operation of the liquid crystal, there is a problem in that a residual image phenomenon of a motion picture occurs due to a low response speed of the liquid crystal.

The above information disclosed in this Background section is only for enhancement of understanding of the background of the invention and therefore it may contain information that does not form the prior art that is already known in this country to a person of ordinary skill in the art.

SUMMARY OF THE INVENTION

An exemplary embodiment of the present invention provides an alignment method for precisely controlling an initial alignment state of liquid crystal and a liquid crystal display that is manufactured through the same.

An exemplary embodiment of the present invention provides a simple method for providing different alignment directions for each fine region, and a liquid crystal display that is manufactured through the same.

An exemplary embodiment of the present invention provides a liquid crystal display that has a high response speed.

The present invention is not limited thereto, and other objects that are not mentioned will be apparently understood by those skilled in the art from the following description.

A liquid crystal display according to an exemplary embodiment of the present invention includes: a first substrate; a second substrate facing the first substrate; a first electrode formed on at least one of the first substrate and the second substrate; a second electrode formed on at least one of the first substrate and the second substrate; a liquid crystal layer interposed between the first substrate and the second substrate; and a first alignment layer formed on the first substrate and contacted with the liquid crystal layer, wherein the first alignment layer includes a first alignment base layer and a plurality of first alignment regulators, and the first alignment regulators are extended from the inside of the first alignment base layer and provide an alignment force to the liquid crystal of the liquid crystal layer.

A liquid crystal display according to an exemplary embodiment of the present invention includes: a first substrate; a second substrate facing the first substrate; a first electrode formed on the first substrate, and a domain division means for dividing a pixel area into a first domain and a second domain; a second electrode formed on the second substrate, and having a continuous surface without a cutout; a liquid crystal layer interposed between the first substrate and the second substrate; and a first alignment layer formed on one of the first substrate and the second substrate and contacted with the liquid crystal layer, wherein the first alignment layer includes a first alignment base layer and a plurality of first alignment regulators made of a different material from the first alignment base layer, and the first alignment regulator is extended from the inside of the first alignment base layer while having a pre-tilt, the first alignment base layer is a material for horizontally aligning the liquid crystal, and a rotating direction of the pre-tilt of the first alignment regulator disposed in the first domain is opposite to a rotating direction of the pre-tilt of the first alignment regulator disposed in the second domain with reference to a horizontal axis.

A manufacturing method of a liquid crystal display according to an exemplary embodiment of the present invention includes: forming a first alignment layer that includes an alignment base material and a monomer or oligomer on a first substrate; assembling the first substrate on which the first alignment layer is formed and a second substrate; and applying a voltage between a first electrode and a second electrode formed on at least one of the first substrate and the second substrate, and irradiating light to the first alignment layer to polymerize a monomer or oligomer.

A method for manufacturing a liquid crystal display according to an exemplary embodiment of the present invention includes: forming a first electrode throughout a first region and a second region on a first substrate; forming a second electrode on a second substrate; forming a first alignment layer that includes a first alignment base material and a monomer or oligomer made of a different material from the first alignment base material on one of the first substrate and the second substrate; introducing a liquid crystal between the first substrate and the second substrate; covering the second region by a photomask; applying a first voltage between the first electrode and the second electrode, and irradiating light to the first alignment layer to polymerize a monomer or oligomer included in the first alignment layer disposed in the first region; and applying a second voltage between the first electrode and the second electrode, and irradiating light to the first alignment layer to polymerize a monomer or oligomer included in the first alignment layer disposed in the second region, wherein the first voltage and the second voltage are different from each other.

A method for manufacturing a liquid crystal display according to an exemplary embodiment of the present invention includes: forming a first electrode on a first substrate; forming a second electrode on a second substrate facing the first substrate; forming a first alignment layer that includes a photopolymerizable alignment base material and a monomer or oligomer on one of the first and second substrates; forming a liquid crystal layer including a photopolymerizable monomer or oligomer and a liquid crystal between the first substrate and the second substrate; applying a voltage between the first electrode and the second electrode; and irradiating light to the first alignment layer to polymerize a photopolymerizable monomer or oligomer to form an alignment regulator layer having a pre-tilt of a predetermined angle in the first alignment base material.

A manufacturing method of a liquid crystal display according to another exemplary embodiment of the present invention includes: forming a first alignment layer that includes an alignment base material and a photopolymerizable monomer or oligomer and a polymerization initiator on a first substrate; assembling the first substrate on which the first alignment layer is formed and a second substrate; applying a voltage between a first electrode and a second electrode formed on at least one of the first substrate and the second substrate, and polymerizing the monomer or oligomer included in the first alignment layer; and injecting a liquid crystal material between the first substrate and the second substrate after polymerizing the monomer or oligomer included in the first alignment layer.

A manufacturing method of a liquid crystal display according to another exemplary embodiment of the present invention includes: providing a first substrate including a gate line, a data line intersecting the gate line, a thin film transistor having a control electrode and an input electrode respectively connected to the gate line and the data line, a first linear electrode connected to an output terminal of the thin film transistor, and a second linear electrode facing the first linear electrode; providing a second substrate; forming a first alignment layer that includes an alignment base material, a photopolymerizable monomer or oligomer, and a polymerization initiator on one of the first substrate and the second substrate; assembling the first substrate on which the first alignment layer is formed and a second substrate; and applying a voltage between the first linear electrode and the second linear electrode and irradiating light to the first alignment layer to polymerize the photopolymerizable monomer or oligomer.

According to an exemplary embodiment of the present invention, a rubbing method of the liquid crystal may be simplified, a pre-tilt of the liquid crystal may be controlled, and a response speed of the liquid crystal may be improved.

DETAILED DESCRIPTION OF THE EMBODIMENTS

Figure 1:
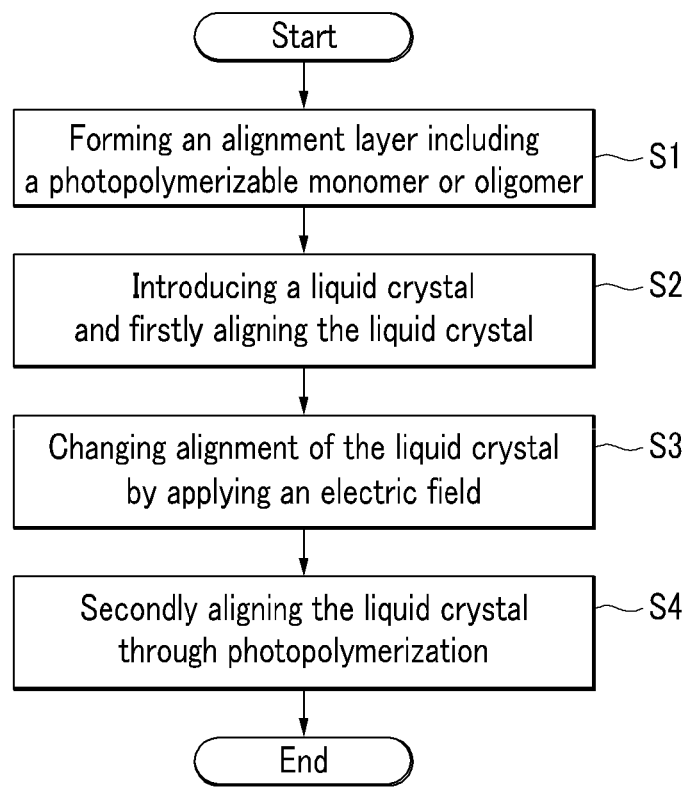
FIG. 1 is a flowchart of a method for aligning a liquid crystal according to an exemplary embodiment of the present invention.

Hereinafter, referring to the drawings, an exemplary embodiment of the present invention will be described in detail. However, the present invention is not limited to exemplary embodiments to be disclosed below and may be implemented in various forms. It will be appreciated by those skilled in the art that changes may be made in these embodiments without departing from the principles and spirit of the general inventive concept, the scope of which is defined in the appended claims and their equivalents. The same reference numerals designate the same elements throughout the specification.

FIG. 1 is a flowchart of a method for aligning liquid crystal according to an exemplary embodiment of the present invention.

First, an alignment layer that includes a photopolymerizable monomer or oligomer is formed on a substrate or the like (S1). The photopolymerizable monomer or oligomer is mixed with the alignment base material, and is coated and cured for forming the alignment layer.

The alignment base material of the alignment layer may be any one of general materials that are used for an alignment layer of a liquid crystal display. Accordingly, the alignment layer that includes the photopolymerizable monomer or oligomer may act as the alignment layer of the liquid crystal, and the liquid crystal may be aligned according to the properties of the alignment base material in various patterns such as vertical and horizontal patterns. Here, the mass of the photopolymerizable monomer or oligomer may be in the range of 0.1 wt %-50 wt % of the entire mass of the alignment layer combining the alignment base material and the photopolymerizable monomer or oligomer but solvent which is removed during heat hardening. When the mass of the photopolymerizable monomer or oligomer is less than 0.1 wt %, the amount thereof is in sufficient such that it is difficult to determining the pre-tilt direction of the liquid crystal by polymerizing the photopolymerizable monomer or oligomer, or to align the liquid crystal without the physical rubbing, and when the mass of the photopolymerizable monomer or oligomer is more than 50 wt %, the alignment force of the alignment regulator obtained by polymerizing the photopolymerizable monomer or oligomer is too strong thereby overcoming the alignment effect by the alignment base material, and there is a significant amount of remaining monomer or oligomer that is not polymerized, thereby polluting the liquid crystal.

When the alignment base material mixed with the photopolymerizable monomer or oligomer is coated, a polymerization initiator may be added. It is not absolutely necessary to add the polymerization initiator, however the polymerization may be speedily executed by adding the it. As the polymerization initiator, benzoyl peroxide, cumene hydroperoxide, t-butyl peroctoate, dicumyl peroxide, methyl ethyl ketone peroxide, benzoyl alkyl ether based compounds, acetophenone based compounds, benzophenone based compounds, xanthone based compounds, benzoin ether based compounds, or benzyl ketal based compounds may be used, and they may be used as is or may be appropriately mixed. Also, it is preferable that the polymerization initiator is added at less than 10 weight % with respect to the polymerizable compound. When added at more than 10 weight %, the polymerization initiator may function as an impurity such that the display quality of the display device may be deteriorated.

Next, first alignment is performed by introducing liquid crystal and bringing the liquid crystal into contact with the alignment layer including the photopolymerizable monomer or oligomer (S2). Here, the introduction of the liquid crystal is performed by using a method for injecting the liquid crystal between the two substrates that have the alignment layer including the photopolymerizable monomer or oligomer. Here, the liquid crystal may also be injected after adding the photopolymerizable monomer or oligomer thereto.

Next, by applying an electric field to the liquid crystal, the alignment of the liquid crystal is changed (S3). The applying of the electric field to the liquid crystal may be performed by a method such as applying a voltage between the two electrodes that are previously formed on the substrate or by applying a voltage between the electrodes that are disposed at the outside thereof. The change of the alignment of the liquid crystal according to the application of the electric field is performed according to the dielectric anisotropy of the liquid crystal, and in the case of liquid crystal having positive dielectric anisotropy it is sloped in a direction that is parallel to the electric field, and in the case of the liquid crystal having the negative dielectric anisotropy it is sloped in a direction that is perpendicular to the electric field. In addition, the degree of change of the alignment of the liquid crystal may vary according to the intensity of the electric field.

Subsequently, in a state in which the alignment of the liquid crystal is changed through the application of the electric field, by photopolymerizing the photopolymerizable monomer or oligomer included in the alignment layer to form an alignment regulator, the liquid crystal is subjected to secondary alignment (S4). The photopolymerization is performed by irradiating light such as ultraviolet rays, which initiates the polymerization of the photopolymerizable monomer or oligomer. The alignment regulator is arranged according to the alignment of the liquid crystal, and even after the applied electric field is removed, the arrangement is maintained to affect the alignment of the liquid crystal. Therefore, the liquid crystal may be arranged by the secondary alignment so as to have a pre-tilt angle that is different from that of the primary alignment.

The pre-tilt angle mentioned in the present description may have an angle and a direction which are respectively defined as a polar angle (0-180 degrees) and an azimuthal angle (0-360 degrees). That is, the pre-tilt angle may be analysed to include the azimuthal angle and the polar angle. The azimuthal angle means an angle between a gate line or a data line and a projection of a liquid crystal or an alignment regulator on the substrate. The polar angle means an angle between a perpendicular line of the substrate and the liquid crystal or the alignment regulator.

The secondary alignment may be used in order to align the liquid crystal in a predetermined azimuth angle when physical rubbing is not applied to the alignment layer, and to allow the liquid crystal to have a pre-tilt so that an operation direction of the liquid crystal is previously determined before the electric field is applied.

In below, various embodiments manufactured by applying the above described method for aligning a liquid crystal will be described.

Now, an exemplary embodiment in which the alignment method of the liquid crystal according to an exemplary embodiment of the present invention is applied to a vertical alignment liquid crystal display will be described.

Figure 2:
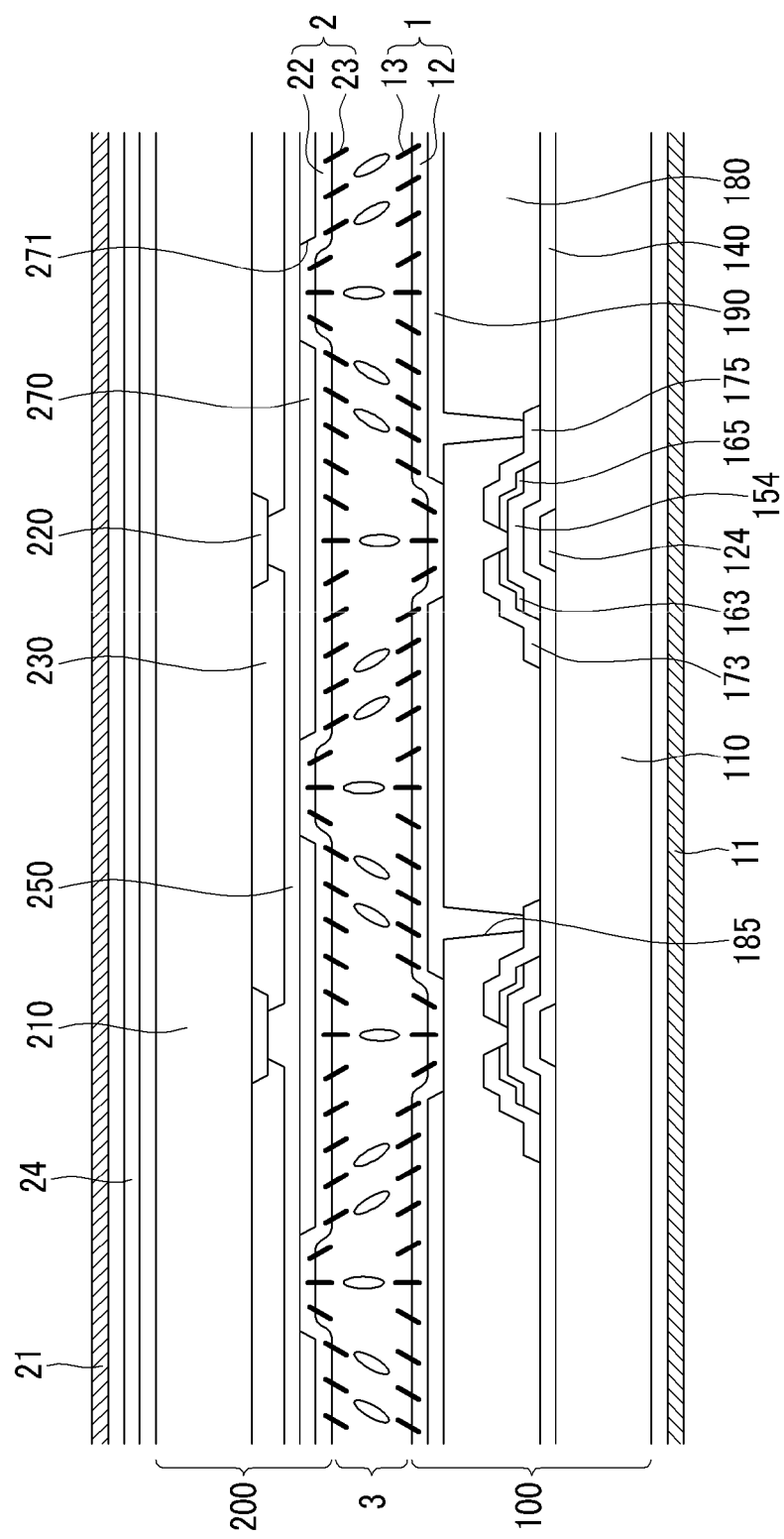
FIG. 2 is a cross-sectional view of a liquid crystal display according to an exemplary embodiment of the present invention.

FIG. 2 is a cross-sectional view of a liquid crystal display according to an exemplary embodiment of the present invention.

The liquid crystal display according to an exemplary embodiment of the present invention includes a thin film transistor array panel 100, a common electrode panel 200, a liquid crystal layer 3, a lower polarizer 11, an upper polarizer 21, and a compensation layer 24.

The thin film transistor array panel 100 includes an insulation substrate 110 and thin film layers that are formed thereon, and the common electrode panel 200 includes an insulation substrate 210 and thin films that are formed thereon.

Firstly, the thin film transistor array panel 100 will be described.

A gate electrode 124 is formed on the insulation substrate 110 that is made of a transparent glass and the like. The gate electrode 124 receives a scanning signal through a gate line (not shown).

A gate insulating layer 140 is formed on the gate electrode 124, an intrinsic semiconductor 154 that is made of amorphous silicon and the like is formed on the gate insulating layer 140, and ohmic contacts 163 and 165 that are made of materials such as n+ hydrogenated amorphous silicon in which a silicide or an n-type impurity is doped at a high concentration are formed on the intrinsic semiconductor 154. For convenience, the intrinsic semiconductor 154 and the ohmic contacts 163 and 165 may be called semiconductors, and the term "semiconductor" may mean a polysilicon semiconductor, an oxide semiconductor, or the like in addition to the set of the intrinsic semiconductors and the ohmic contact layers.

A plurality of source electrodes 173 and drain electrodes 175 are formed on the ohmic contacts 163 and 165. Each source electrode 173 receives an image signal voltage from a data line (not shown). Each drain electrode 175 faces a source electrode 173 on the gate electrode 124. A channel unit of the intrinsic semiconductor 154 between the source electrode 173 and the drain electrode 175 is exposed.

The gate electrode 124, the source electrode 173, and the drain electrode 175 form a thin film transistor (TFT) in conjunction with the intrinsic semiconductor 154, and a channel of the thin film transistor is formed on the channel unit of the intrinsic semiconductor 154 between the source electrode 173 and the drain electrode 175.

A passivation layer 180 that has a contact hole 185 is formed on the channel unit of the gate insulating layer 140, the source electrode 173, the drain electrode 175, and the channel portion of the intrinsic semiconductor 154. The passivation layer 180 may be made of an inorganic insulating material such as silicon nitride or silicon oxide, or an organic insulating material such as a resin.

Pixel electrodes 190 are formed on the passivation layer 180. The pixel electrodes 190 are connected to the drain electrodes 175 through the contact holes 185, and may be formed of a transparent conductive layer such as ITO (indium tin oxide) or IZO (indium zinc oxide). The pixel electrodes 190 receive a data voltage from the drain electrodes 175. The pixel electrodes 190 may have a cutout (not shown). The cutout enables an electric field that is formed when the voltage is applied between the pixel electrodes 190 and a common electrode 270 to have a component that is parallel to the substrate 210, thus controlling the slope direction of the liquid crystal.

A lower alignment layer 1 is formed on the pixel electrodes 190. The lower alignment layer 1 includes an alignment base layer 12 and an alignment regulator 13. The alignment base layer 12 may include at least one of materials that are generally used as the liquid crystal alignment layer such as a polyamic acid, a poly-imide, lecithin, nylon, PVA (polyvinyl alcohol), and the like. Accordingly, the liquid crystal is basically aligned according to the property of the alignment base layer 12. The alignment regulator 13 is extended from the inside of the alignment base layer 12, and is formed by photopolymerizing the photopolymerizable monomer or oligomer.

Here, the mass of the alignment regulator 13 may be in the range of 0.1 wt % -50 wt % of the entire mass of the lower alignment layer 1 combining the alignment base layer 12 and the alignment regulator 13. When the mass of the alignment regulator 13 is less than 0.1 wt %, the amount thereof is insufficient such that it is difficult to determining the pre-tilt of the liquid crystal by the alignment regulator 13, and when the mass of the alignment regulator 13 is more than 50 wt %, the alignment force of the alignment regulator 13 is too strong, thereby overcoming the alignment effect by the alignment base layer 12 such that the effect that the alignment base layer 12 and the alignment regulator 13 are together formed may be eliminated.

As the photopolymerizable monomer or oligomer, there are a reactive mesogen (RM) NOA series manufactured by Norland, Co., Ltd., and the like.

The term 'mesogenic material' or 'mesogenic compound' includes materials or compounds comprising one or more rod-shaped, board-shaped or disk-shaped mesogenic groups, i.e. groups with the ability to induce liquid crystal phase behaviour. Liquid crystal compounds with rod-shaped or board-shaped groups are also known in the art as 'calamitic' liquid crystals. Liquid crystal compounds with a disk-shaped group are also known in the art as 'discotic' liquid crystals. The compounds or materials comprising mesogenic groups do not necessarily have to exhibit a liquid crystal phase themselves. It is also possible that they show liquid crystal phase behaviour only in mixtures with other compounds, or when the mesogenic compounds or materials, or the mixtures thereof, are polymerized. The term 'reactive mesogen (RM)" means a polymerisable mesogenic compound.

The reactive mesogen is polymerized by light such as ultraviolet rays, and is a material that is aligned according to an alignment state of the adjacent material. Examples of the reactive mesogen may be a compound that is represented by the following formula:

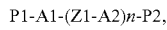

wherein P1 and P2 are independently selected from acrylate, methacrylate, vinyl, vinyloxy, and epoxy groups, A1 and A2 are independently selected from 1,4-phenylene and naphthalene-2,6-diyl groups, Z1 is any one of COO—, OCO—, and single bonds, and n is any one of 0, 1, and 2.

In more detail, it may be a compound that is represented by any one of the following formulas:

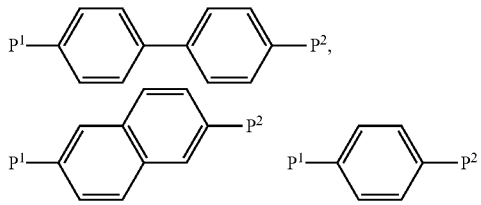

wherein P1 and P2 are independently selected from acrylate, methacrylate, vinyl, vinyloxy, and epoxy groups.

The alignment regulator 13 of the lower alignment layer 1 has a pre-tilt that slopes in a direction away from the cutout or the side of the pixel electrodes 190. Traces of the polymerization initiator may remain in the lower alignment layer 1.

Next, the common electrode panel 200 will be described.

A light blocking member 220 is formed on the insulation substrate 210 that is made of transparent glass and the like, and a color filter 230 is formed on each region that is defined by the light blocking member 220. An overcoat 250 is formed on the color filter 230 and the common electrode 270 is formed on the overcoat 250.

The common electrode 270 has a cutout 271. The cutout 271 enables an electric field that is formed when a voltage is applied between the pixel electrodes 190 and the common electrode 270 to have a component that is parallel to the substrate 210, thus controlling the slope direction of the liquid crystal.

The overcoat 250 may be omitted, and the color filter 230 and the light blocking member 220 may be formed on the thin film transistor array panel 100.

An upper alignment layer 2 is formed on the common electrode 270. The upper alignment layer 2 includes an alignment base layer 22 and an alignment regulator 23. The alignment base layer 22 may include at least one of materials that are generally used as the liquid crystal alignment layer such as a poly-amic acid, a poly-imide, lecithin, nylon, PVA (polyvinyl alcohol), and the like. Accordingly, the liquid crystal is basically aligned according to the property of the alignment base layer 22. The alignment regulator 23 is extended from the inside of the alignment base layer 22, and is formed by photopolymerizing the photopolymerizable monomer or oligomer.

Here, the mass of the alignment regulator 23 may be in the range of 0.1 wt % -50 wt % of the entire mass of the lower alignment layer 2 combining the alignment base layer 22 and the alignment regulator 23. When the mass of the alignment regulator 23 is less than 0.1 wt %, the amount thereof is insufficient such that it is difficult to determining the pre-tilt direction of the liquid crystal by the alignment regulator 23, and when the mass of the alignment regulator 23 is more than 50 wt %, the alignment force of the alignment regulator 23 is too strong thereby overcoming the alignment effect by the alignment base layer 22 such that the effect that the alignment base layer 22 and the alignment regulator 23 are together formed may be eliminated.

As the photopolymerizable monomer or oligomer, as described above, there are a reactive mesogen (RM), NOA series manufactured by Norland, Co., Ltd., and the like.

The alignment regulator 23 of the upper alignment layer 2 has a pre-tilt that slopes in a direction away from the cutout 271 of the common electrode 270.

The liquid crystal layer 3 includes the liquid crystal that has negative dielectric anisotropy and is perpendicularly arranged by alignment force of the alignment base layers 12 and 22 with respect to the substrates 110 and 210, and the liquid crystal that is adjacent to the lower alignment layer 1 and the upper alignment layer 2 has a pre-tilt by effect of the alignment regulators 13 and 23 of the lower alignment layer 1 and the upper alignment layer 2. As described above, if the liquid crystal has the pre-tilt, since the liquid crystal of all regions is immediately sloped according to the pre-tilt when the electric field is applied, the response speed is very fast. Accordingly, a residual image problem of the motion picture may be solved.

This effect will be described with reference to Table 1

TABLE 1

|  | Normal PVA (Patterned Vertically Aligned) LCD | Embodiment of the present invention (alignment regulator was formed through light illumination with applying 4 V) |
| --- | --- | --- |
| Black [mV] | 2.7 | 4.2 |
| Vth [V] | 3.4 | 1.9 |
| Rising Time [ms] at 7 V | 23.2 | 4.4 |
| Falling Time [ms] at 7 V | 4.8 | 8.1 |
| Response Time [ms] | 28.0 | 12.5 |

In table 1, Black [mV] is a voltage representing amount of light leakage of black state and measured by a photo diode. According to table 1, a liquid crystal display according to the present invention having alignment regulators has a lower threshold voltage and a shorter response time by half or less, which is a sum of the rising time and falling time, than a normal PVA liquid crystal display. Though, the light leakage of black state is little bit higher in the liquid crystal display according to the present invention, this is an ignorable difference. If one wants to reduce the light leakage of black state, it will be achieved by applying a lower voltage to the alignment layer during light illumination for forming the alignment regulators.

When injecting the liquid crystal with the photopolymerizable monomer or oligomer added thereto, the alignment regulator by which the lower alignment layer 1 and the upper alignment layer 2 are separated may exist in the liquid crystal layer 3, and some photopolymerizable monomer or oligomer that is not photopolymerized may remain.

The lower polarizer 11 and the upper polarizer 21 may be disposed to enable transmissive axes thereof to cross each other.

The compensation layer 24 may be a phase retardation layer such as a ¼ wavelength delay layer or a ½ wavelength delay layer or an viewing angle compensation layer. Two or more compensation layers 24 may be included, or they may be omitted.

Figure 3:
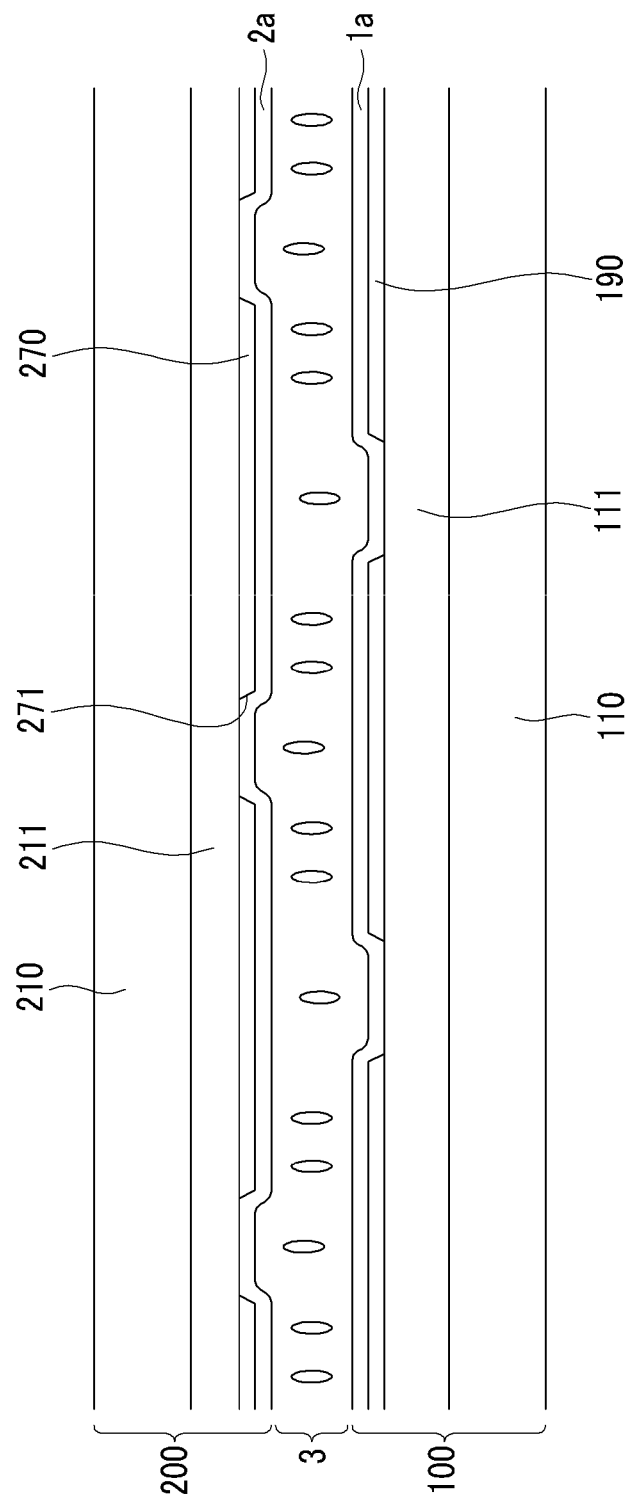
FIGS. 3 and 4 are cross-sectional views that illustrate a process for manufacturing a liquid crystal display according to an exemplary embodiment of the present invention.
Figure 4:
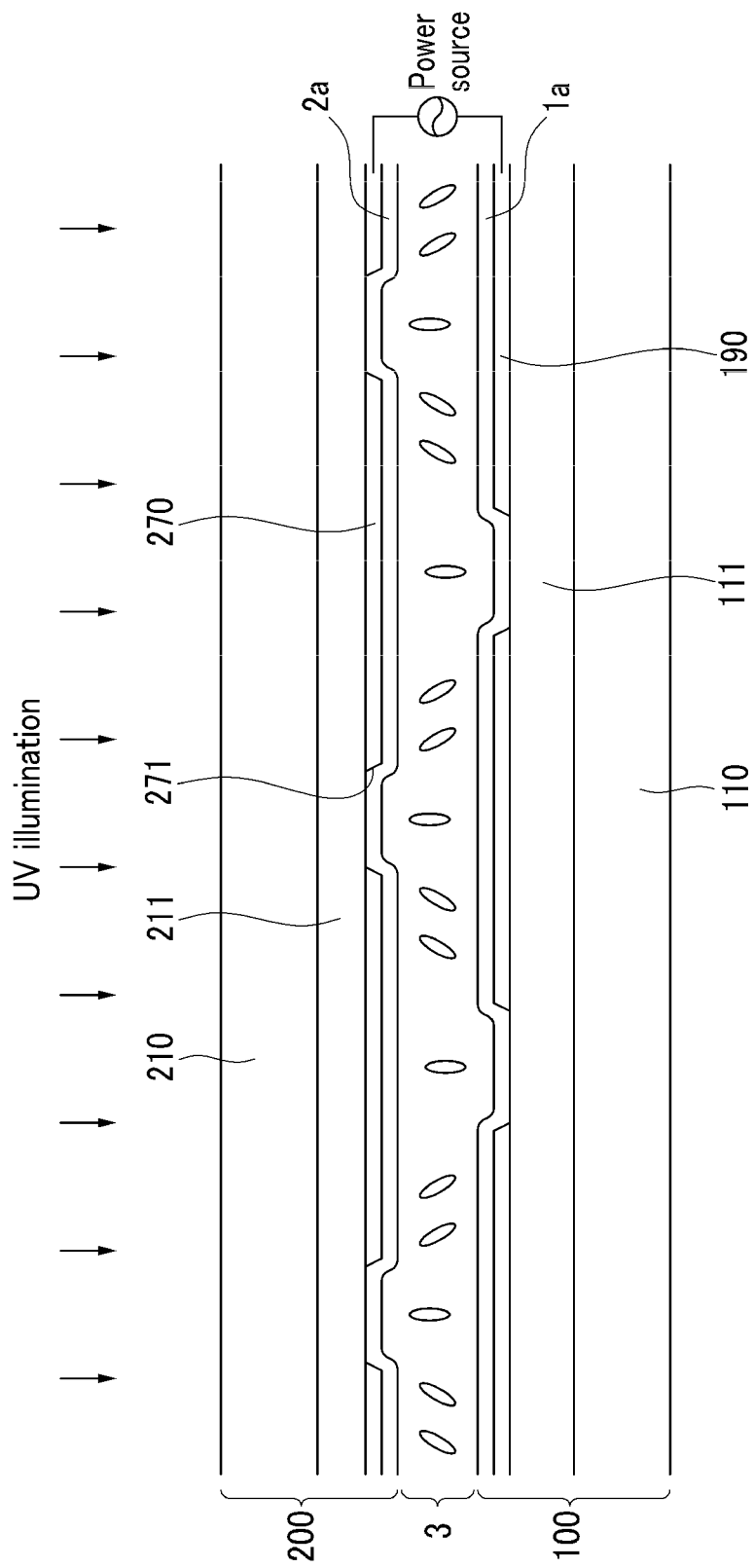

With reference to FIGS. 3 and 4, a method for manufacturing a liquid crystal display according to an exemplary embodiment of the present invention will be described. In FIGS. 3 and 4, thin film layers that are formed on the thin film transistor array panel 100 and the common electrode panel 200 are schematically illustrated with reference numerals 111 and 211.

First, as shown in FIG. 3, the thin film layer 111 that includes various wiring and thin film transistors is formed on the first insulation substrate 110 by using a thin film deposition method, a photolithography method, a photo-etching method, or the like, and the pixel electrodes 190 are formed on the first thin film layer 111. In addition, the second thin film layer 211 that includes light blocking members and color filters is formed on the second insulation substrate 210 by using a thin film deposition method, a photolithography method, a photo-etching method, or the like, and the common electrode 270 is formed on the second thin film layer 211.

Next, the alignment base material and the photopolymerizable monomer or oligomer are mixed with each other and coated on the pixel electrodes 190 of the thin film transistor array panel 100, and are subjected to heat treatment (curing) at a temperature in the range of 100 to 180° C. for 0.5 to 1 hour to cure the alignment base material, thereby forming a lower alignment layer 1a that includes the photopolymerizable monomer or oligomer. In addition, the alignment base material and the photopolymerizable monomer or oligomer are mixed with each other and coated on the common electrode 270 of the common electrode panel 200, and are subjected to heat treatment (curing) at a temperature in the range of 100 to 180° C. for 0.5 to 1 hour to cure the alignment base material, thereby forming an upper alignment layer 2a that includes the photopolymerizable monomer or oligomer.

On the other hand, a polymerization initiator may be added to the alignment base material and the photopolymerizable monomer or oligomer. It is not absolutely necessary to add the polymerization initiator, however the polymerization may be speedily executed by adding the polymerization initiator.

Here, the alignment base material may include at least one of materials that are generally used as the liquid crystal alignment layer such as a poly-amic acid, a poly-imide, lecithin, nylon, PVA (polyvinyl alcohol), and the like. Accordingly, the lower alignment layer 1a and the upper alignment layer 2a that include the photopolymerizable monomer or oligomer may serve to perform alignment of the liquid crystal according to the properties of the alignment base layers 12 and 22. As the photopolymerizable monomer or oligomer, as described above, a reactive mesogen (RM), NOA series manufactured by Norland, Co., Ltd., and the like may be used.

Subsequently, the thin film transistor array panel 100 and the common electrode panel 200 are assembled. The assembling of these panels 100 and 200 may be performed by using either of two methods.

As a first method, a sealant is coated on either of the thin film transistor array panel 100 and the common electrode panel 200 to define a region on which the liquid crystal is filled, the liquid crystal is dripped on the defined region, and the thin film transistor array panel 100 and common electrode panel 200 are arranged and bonded. At this time, a spacer for maintaining an interval between the two substrates 100 and 200 may be dispersed before or after the coating of the liquid crystal. The spacer may be previously formed on the thin film transistor array panel 100 and the common electrode panel 200 through a forming process of the thin film. Here, the liquid crystal may be dripped after adding the photopolymerizable monomer or oligomer thereto.

As a second method, the sealant is coated on either one of the thin film transistor array panel 100 and the common electrode panel 200 to define the region at which the liquid crystal is filled and having a liquid crystal injection hole, and the two substrates 100 and 200 are arranged and bonded. Next, there is a method in which, in a vacuum state, the liquid crystal injection hole is dipped in a liquid crystal storage bath, the vacuum is eliminated to inject the liquid crystal, and the liquid crystal injection hole is sealed. Here, the liquid crystal may be dripped after adding the photopolymerizable monomer or oligomer thereto.

Subsequently, as shown in FIG. 4, in a state in which the voltage is applied between the pixel electrodes 190 and the common electrode 270 to rearrange the liquid crystal, light such as ultraviolet rays and the like is irradiated onto the lower and upper alignment layers 1a and 2a to photopolymerize the photopolymerizable monomer or oligomer. Thereby, as shown in FIG. 1, the alignment regulators 13 and 23 that are extended from the inside of the alignment base layers 12 and 22 are formed. The alignment regulators 13 and 23 have a pre-tilt according to the arrangement state of the liquid crystal.

Here, by changing the intensity of the voltage that is applied between the pixel electrodes 190 and the common electrode 270, the pre-tilt angle of the alignment regulators 13 and 23 may be controlled. That is, if a strong voltage is applied between the pixel electrodes 190 and the common electrode 270, the liquid crystal lies almost parallel to the surface of the substrates 110 and 210, and in this state, if the ultraviolet rays are irradiated thereon, the alignment regulators 13 and 23 have a large pre-tilt. On the contrary, if a weak voltage is applied between the pixel electrodes 190 and the common electrode 270, the liquid crystal stands up almost perpendicular with respect to the surface of the substrates 110 and 210, and in this state, if the ultraviolet rays are irradiated thereon, the alignment regulators 13 and 23 have a small pre-tilt.

As described above, if the photopolymerizable monomer or oligomer is mixed with the alignment base material to form the alignment layer and photopolymerized to form the alignment regulator, it is easy to control the pre-tilt of the alignment regulator and a problem that may occur by leaving un-reacted photopolymerizable monomer or oligomer in the liquid crystal layer 3 may be prevented.

Thus far, a method in which, after the liquid crystal is filled between the thin film transistor array panel 100 and the common electrode panel 200 the voltage is applied thereto to form the alignment regulators 13 and 23, has been described. However, unlike this, the liquid crystal may be injected after the alignment regulators 13 and 23 are formed. That is, in a state in which the liquid crystal is not filled between the thin film transistor array panel 100 and the common electrode panel 200, the voltage is applied between the pixel electrodes 190 and the common electrode 270 and the ultraviolet rays are irradiated to the alignment layers 1a and 2a that include the photopolymerizable monomer or oligomer to form the alignment regulators 13 and 23. The liquid crystal is injected after the alignment regulators 13 and 23 are formed.

Next, the compensation layer 24 and the polarizers 11 and 21 are attached and the module process is performed.

Figure 5:
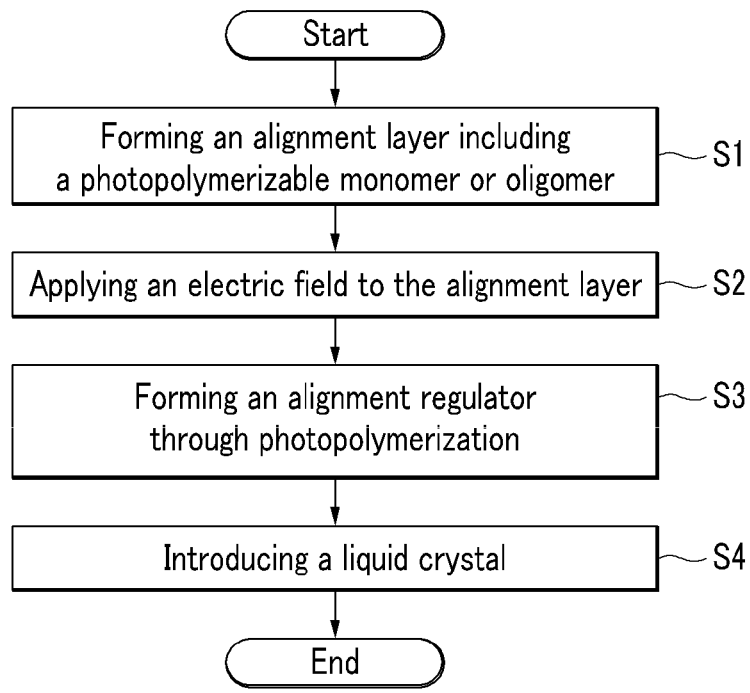
FIG. 5 is a flowchart of a method for aligning a liquid crystal according to an exemplary embodiment of the present invention.

This method will be described with reference to FIG. 5. First, an alignment layer that includes a photopolymerizable monomer or oligomer is formed on a substrate or the like (S1). The photopolymerizable monomer or oligomer is mixed with the alignment base material, and is coated and cured for forming the alignment layer. Next, an electric field is applied to the alignment layer (S2). By applying the electric field, the photopolymerizable monomer or oligomer mixed in the alignment layer becomes reactive to the electric field so that photopolymerizable monomer or oligomer can be rearranged.

The applying of the electric field to the alignment layer may be performed by a method such as applying a voltage between two electrodes that are previously formed on the substrate or by applying a voltage between electrodes that are provided by a separate apparatus.

A solvent can be added into the alignment layer before applying the electric field. In a more detailed example, the solvent can be sprayed on the layer, or can be injected into the space between the first substrate and the second substrate after the first substrate and the second substrate on which the alignment layer is formed are coupled to each other. In case the solvent is added into the alignment layer, the viscosity of the alignment material is lowered so that the photopolymerizable monomer or oligomer can be rearranged effectively by the electric field. Here, the solvent can be, for example, Propylene Glycol Methyl Ether Acetate (PGMEA) or an aromatic solvent such as toluene and xylene. After the photopolymerizable monomer or oligomer is rearranged by applying the electric field, the solvent can be removed by performing a vacuum removing process, a heating process or an air drying process.

Subsequently, the alignment layer is illuminated with a light to photopolymerize the photopolymerizable monomer or oligomer included in the alignment layer to form an alignment regulator (S3). Here, the applying of the electric field and the light illumination may be proceeded before assembling a lower substrate and an upper substrate. Next, liquid crystal is introduced between the lower substrate and the upper substrate (S4). The introduction of the liquid crystal is performed by using a vacuum injection or a dripping. In the above, both of the lower and upper substrates have alignment layers 1 and 2 respectively having alignment regulators 13 and 23. However, only one of the lower and upper substrates may have an alignment layer having an alignment regulator. This case also shows an improved response speed of liquid crystals. This will be described with reference to Table 2.

TABLE 2

|  | Normal PVA (Patterned Vertically Aligned) LCD | Embodiment of the present invention (only one of the lower and upper substrates has an alignment layer having an alignment regulator) |
| --- | --- | --- |
| Black [mV] | 2.7 | 3.0 |
| Vth [V] | 3.4 | 2.8 |
| Rising Time [ms] at 7 V | 23.2 | 5.3 |
| Falling Time [ms] at 7 V | 4.8 | 7.0 |
| Response Time [ms] | 28.0 | 12.3 |

According to table 2, a liquid crystal display according to the present invention having alignment regulators has a lower threshold voltage and a shorter response time by half or less, which is a sum of the rising time and falling time, than a normal PVA liquid crystal display. Though, the light leakage of black state is little bit higher in the liquid crystal display according to the present invention, this is an ignorable difference. If one wants to reduce the light leakage of black state, it will be achieved by applying a lower voltage to the alignment layer during light illumination for forming the alignment regulators.

Figure 6:
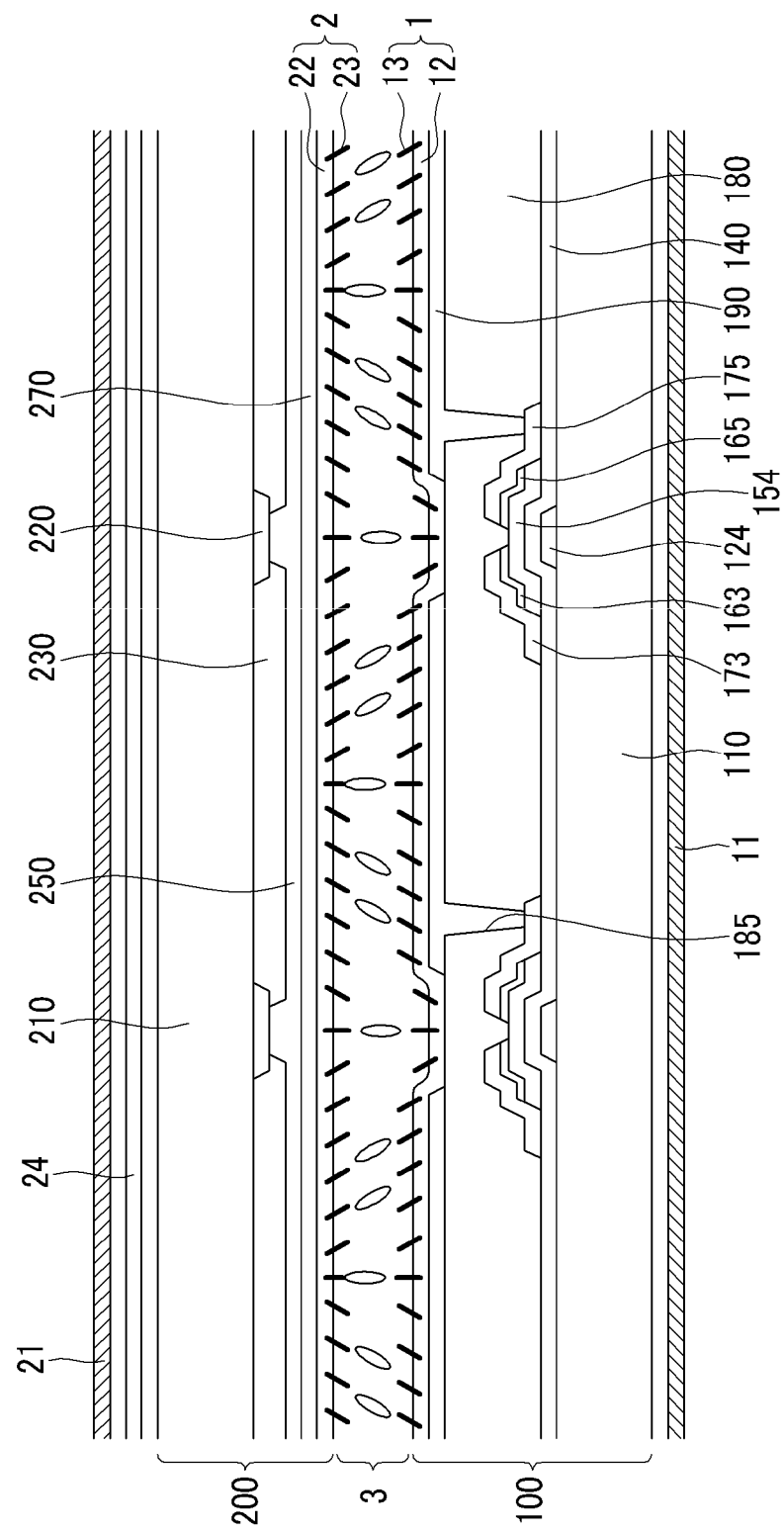
FIG. 6 is a cross-sectional view of a liquid crystal display according to an exemplary embodiment of the present invention.

In the above, the common electrode 270 has a cutout 271. However, as shown in FIG. 6, the common electrode 270 may not have any cutout. When liquid crystals are properly regulated by the alignment regulators 13 and 23, forming a cutout in the common electrode 270 may not be necessary. If a cutout is not formed in the common electrode 270, manufacturing method is simplified by reducing number of photo-etching process. Even though the common electrode 270 does not have a cutout, response speed of liquid crystals may be fast enough because the liquid crystals rapidly align according to pre-tilt when an electric field is applied. This will be described with reference to Table 2.

TABLE 3

|  | Normal PVA (common electrode does not have a cutout) | Embodiment of the present invention (common electrode does not have a cutout but alignment regulators are formed) |
| --- | --- | --- |
| Black [mV] | 1.4 | 1.5 |
| Vth [V] | 3.1 | 2.1 |
| Rising Time [ms] at 7 V | 1861.9 | 7.5 |
| Falling Time [ms] at 7 V | 6.0 | 5.0 |
| Response time [ms] | 1867.9 | 12.5 |

According to table 3, a liquid crystal display according to the present invention having alignment regulators has a lower threshold voltage and a shorter response time which is a sum of the rising time and falling time than a normal PVA liquid crystal display. Though, the light leakage of black state is little bit higher in the liquid crystal display according to the present invention, this is an ignorable difference.

In a vertically aligned mode liquid crystal display, a cutout may have various shapes as below descriptions.

Figure 7:
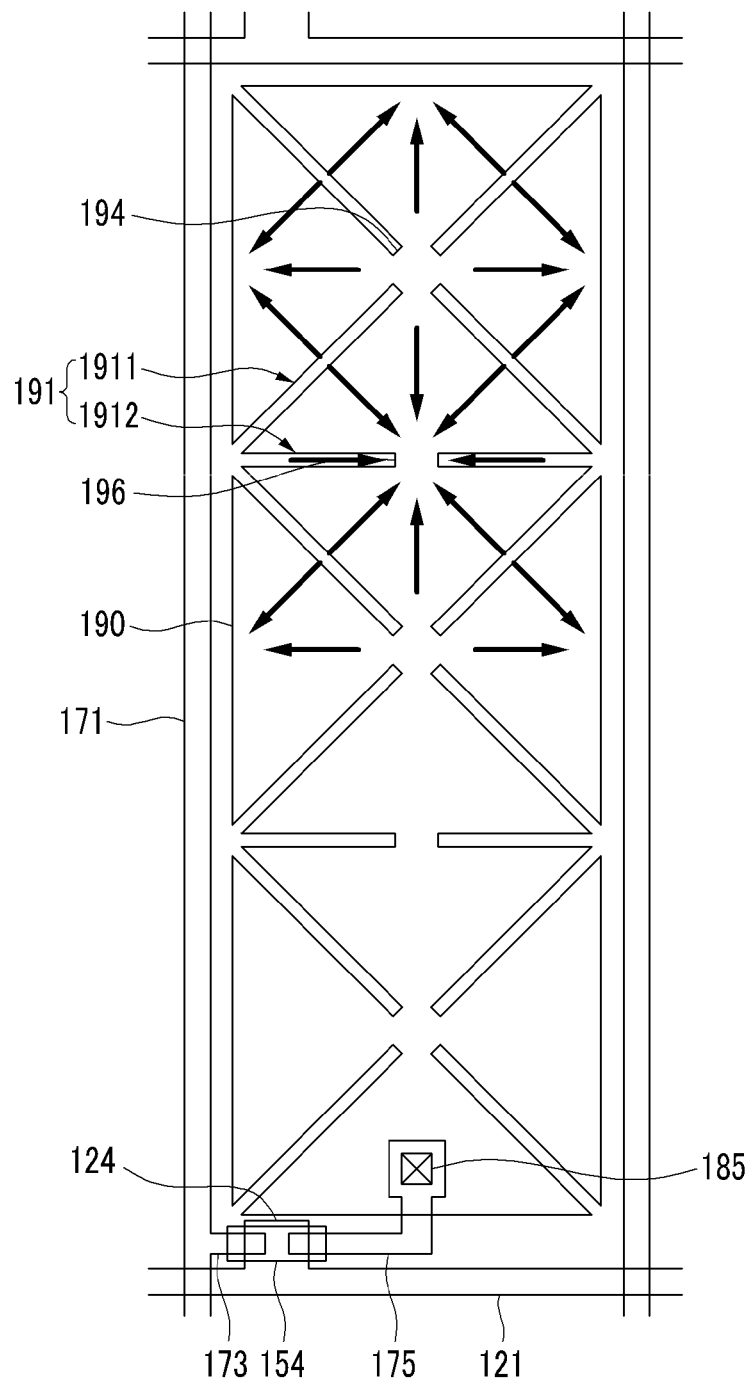
FIG. 7 is a layout view of a liquid crystal display according to another exemplary embodiment of the present invention.

FIG. 7 is a layout view of a liquid crystal display according to another exemplary embodiment of the present invention.

Referring to FIG. 7, the gate line 121 is extended in the transverse direction, and the data line 171 is extended in the longitudinal direction. The thin film transistor including a gate electrode 124, a source electrode 173, a drain electrode 175, and an intrinsic semiconductor 154, and the pixel electrode 190 connected to the drain electrode 175 is formed in each region defined by the intersection of two gate lines 121 and two data lines 171.

The pixel electrode 190 has an edge that is near a rectangle shape, and includes a plurality of cutouts 191. The cutout 191 divides the pixel electrode 190 into a plurality of triangle regions, and a plurality of triangle regions are connected into one through connections 196 and 194. In detail, the cutout 191 includes a first cutout 1911 inclined with respect to the edge line of the pixel electrode 190, and a second cutout 1912 perpendicular or parallel to the edge line of the pixel electrode 190. The second cutout 1912 that is perpendicular with respect to the portion parallel to the data line 171 among the edge of the pixel electrode 190 divides the pixel electrode 190 into three equal portions. The first cutout 1911 respectively divides three equal portions divided by the second cutout into four triangle regions. The connections 196 and 194 may be disposed according to the edge of the pixel electrode 190, and may be changed in various shapes.

Like this, in the state in which the cutout 191 is disposed, if the voltage is applied between the pixel electrode 190 and the common electrode 270, the cutout 191 generates the electric field having a horizontal component, and the liquid crystal molecules is arranged by the electric field, as shown in the arrow of FIG. 7. When the liquid crystal molecules are arranged like in FIG. 7, time is required, and this is the reason that the liquid crystal molecules are operated through two steps. That is, the liquid crystal molecules are firstly arranged in the perpendicular direction for the cutout 191, and the arrangement collision generated between liquid crystal molecules under the first arrangement is softened such that the liquid crystal molecules are secondarily arranged thereby forming the arrangement of FIG. 7. However, in an exemplary embodiment of the present invention, the alignment regulators 13 and 23 are formed in the state in which the liquid crystal molecules are arranged like in FIG. 7 by the application of the electric field such that the alignment regulator 13 and 23 has the pre-tilt with the final arrangement state of the liquid crystal molecules. Accordingly, the liquid crystal molecules are not operated through two steps under the application of the electric field, and are arranged with the final arrangement state like in FIG. 7. Therefore, the response speed of the liquid crystal is fast.

Next, various shapes of the cutout of the pixel electrode 190 will be described with reference to drawings.

FIG. 8 to FIG. 12 are layout views showing a pixel electrode of a liquid crystal display according to various exemplary embodiments of the present invention.

Figure 8:
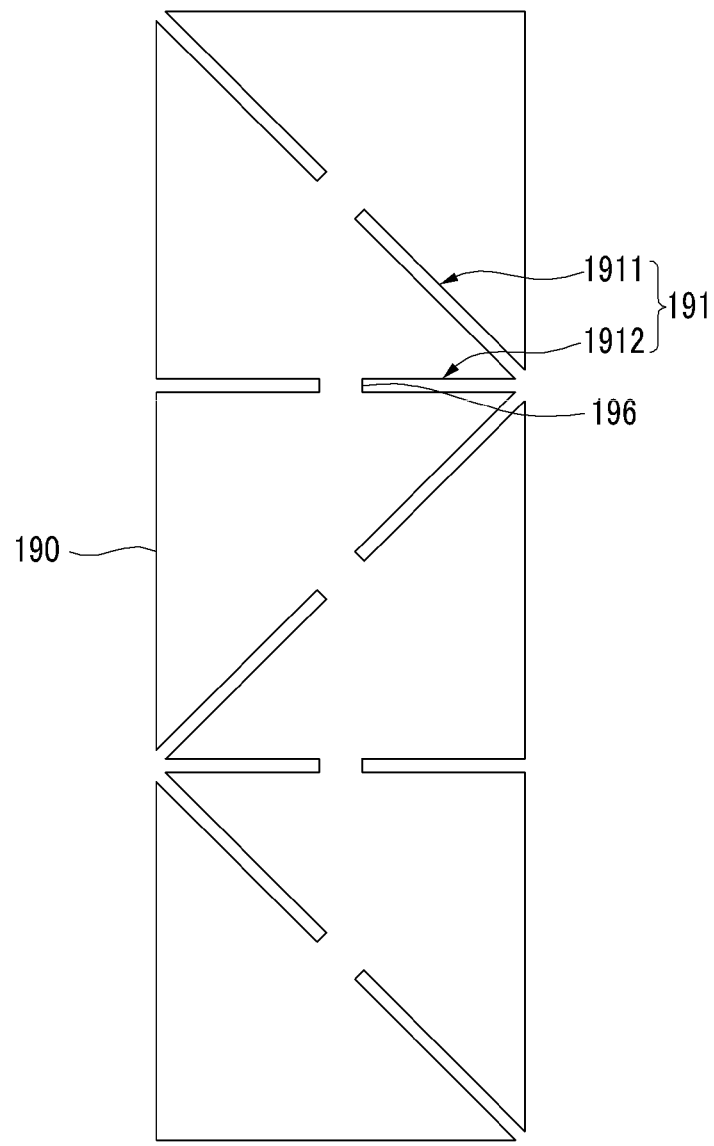
FIG. 8 to FIG. 12 are layout views showing a pixel electrode of a liquid crystal display according to various exemplary embodiments of the present invention.

Firstly, referring to FIG. 8, the cutout 191 divides the pixel electrode 190 into a plurality of triangle regions, and a plurality of triangle regions are connected into one through the connections 196. In detail, the cutout 191 includes a first cutout 1911 inclined with respect to the edge line of the pixel electrode 190, and a second cutout 1912 that is perpendicular or parallel to the edge line of the pixel electrode 190. The second cutout 1912 that is perpendicular with respect to the portion parallel to the data line 171 among the edge of the pixel electrode 190 divides the pixel electrode 190 into three equal portions. The first cutout 1911 respectively divides three equal portions divided by the second cutout 1912 into two triangle regions. The connection 196 may be disposed according to the edge of the pixel electrode 190 and may be changed in various shapes.

Figure 9:
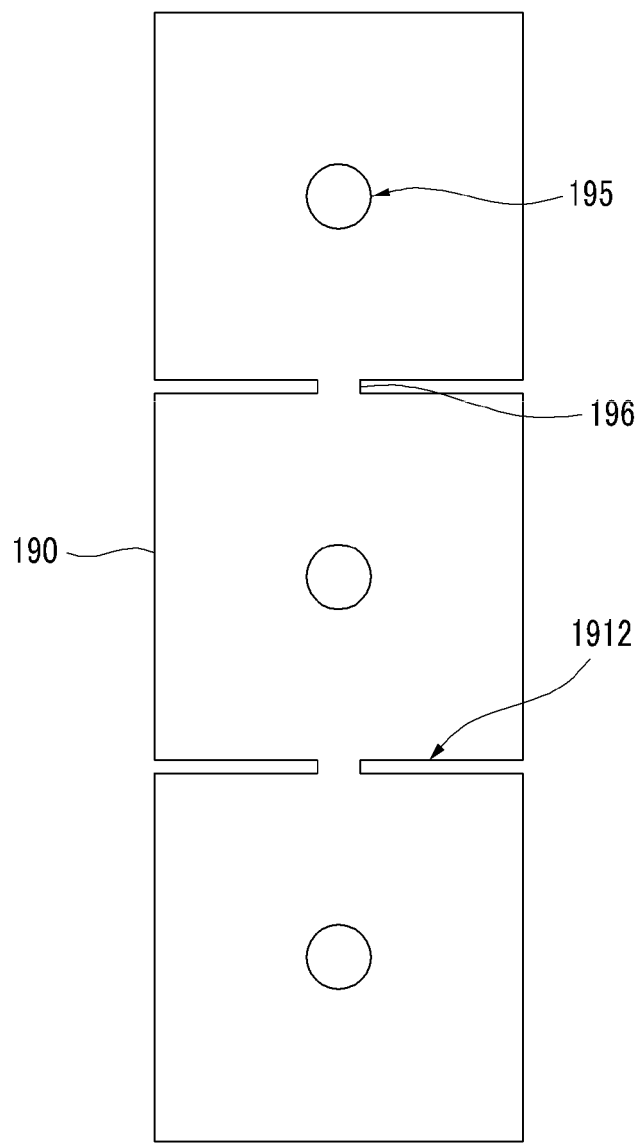

Referring to FIG. 9, cutouts 191 and 195 include a linear cutout 191 dividing the pixel electrode 190 into a plurality of subregions (three subregions in the drawing), and a circle cutout 195 disposed on the central part of each subregion. The circle cutout 195 may be replaced for a polygon, a quadrangle, or a pentagon, and the circle may be referred to as one of the polygons.

Figure 10:
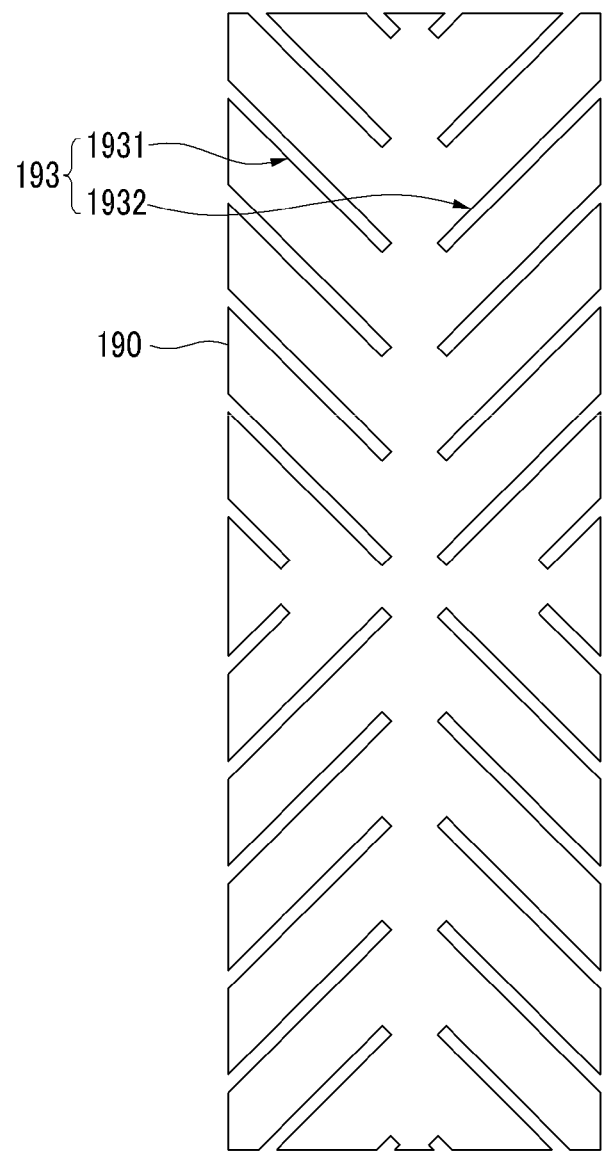

Referring to FIG. 10, the cutout 193 is a plurality of slits dividing the pixel electrode 190 into a plurality of belt regions, and the cutout 193 is obliquely inclined with respect to the edge of the pixel electrode 190. The cutout 193 is classified into the first slit 1931 and the second slit 1932 according to the inclination direction, and the slits 1931 and 1932 may perpendicularly cross each other. The pixel electrode 190 is divided into four region of an upper left portion, a lower left portion, an upper right portion, and a lower right portion by the arrangement of the cutouts 193, the first slit 1931 is disposed in the upper left and the lower right regions, and the second slit 1932 is disposed in the upper right and the lower left regions.

Figure 11:
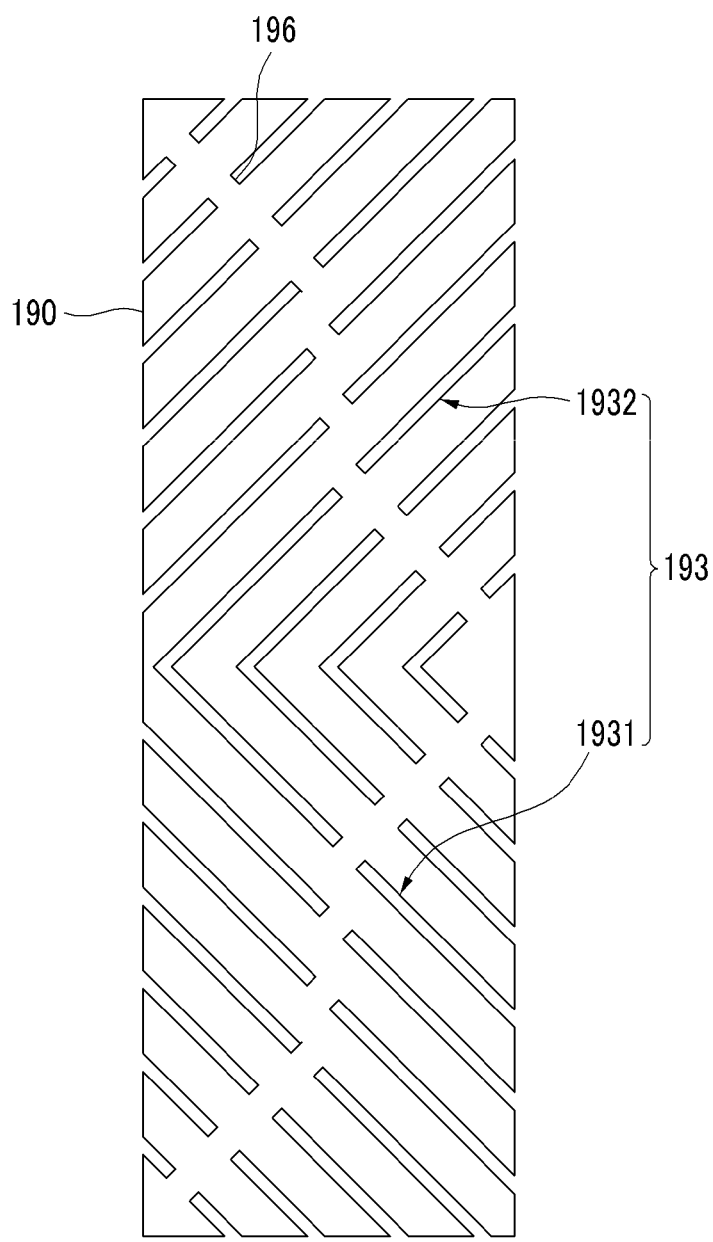

Referring to FIG. 11, the cutout 193 is a plurality of slits dividing the pixel electrode 190 into a plurality of belt regions, and the cutout 193 is obliquely inclined with respect to the edge of the pixel electrode 190. The cutout 193 is classified into the first slit 1931 and the second slit 1932 according to the inclination direction, and the slits 1931 and 1932 may perpendicularly cross each other. The pixel electrode 190 is divided into four regions of the upper portion and the lower portion by the arrangement of the cutout 193, the first slit 1931 is disposed in the upper region, and the second slit 1932 is disposed in the lower region. The first slit 1931 and the second slit 1932 meet each other at a boundary of the upper region and the lower region and form a chevron shape. The regions of the pixel electrode 190 divided by the cutout 193 are connected into one by the connections 196.

Figure 12:
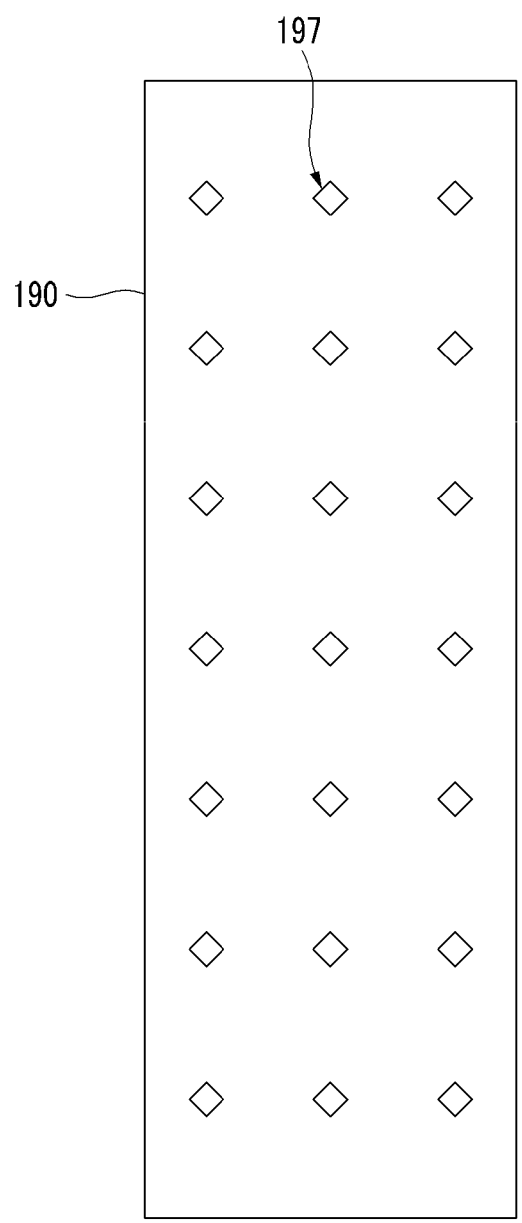

Referring to FIG. 12, a plurality of quadrangle cutouts 197 forming a matrix are disposed in the pixel electrode 190. The cutouts may be various polygons such as circular, triangular, and pentagonal.

Another exemplary embodiment of the present invention will now be described.

Figure 13:
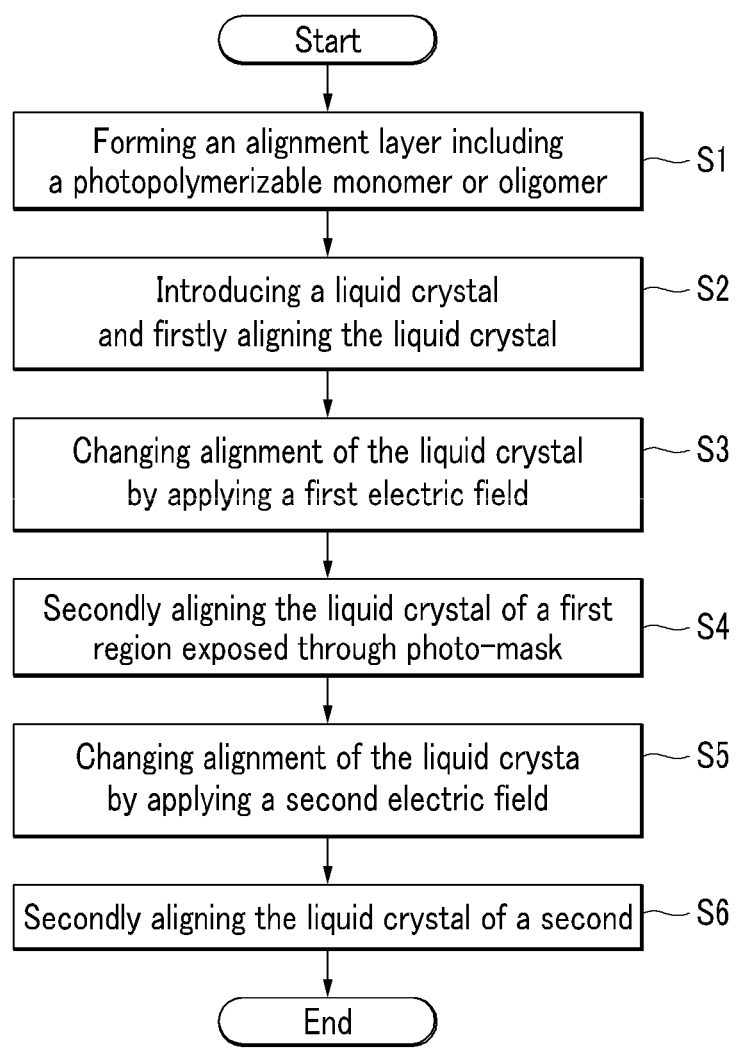
FIG. 13 is a flowchart of a method for aligning a liquid crystal according to another exemplary embodiment of the present invention.

FIG. 13 is a flowchart of a method for aligning a liquid crystal according to an exemplary embodiment of the present invention.

First, an alignment layer that includes a photopolymerizable monomer or oligomer is formed on a substrate or the like (S1). The photopolymerizable monomer or oligomer is mixed with the alignment base material, and coated, and the alignment base material is cured for forming the alignment layer. The alignment base material of the alignment layer may be a material aligning the liquid crystal in the vertical direction. Accordingly, the alignment layer including the photopolymerizable monomer or oligomer performs the function as the alignment layer of the liquid crystal. It is not absolutely necessary to add the polymerization initiator, however the polymerization may be speedily executed by adding the polymerization initiator.

Next, the liquid crystal is introduced such that the liquid crystal is contacted with the alignment layer including the photopolymerizable monomer or oligomer, thereby firstly aligning the liquid crystal (S2). Here, the introduction of the liquid crystal is performed by using a method for injecting the liquid crystal between the two substrates that have the alignment layer including the photopolymerizable monomer or oligomer. Here, the liquid crystal may also be injected by adding the photopolymerizable monomer or oligomer.

Next, by applying an electric field to the liquid crystal, the alignment of the liquid crystal is changed (S3). The applying of the electric field to the liquid crystal may be performed by a method such as applying a voltage between the two electrodes that are previously formed on the substrate, or by applying a voltage between the electrodes that are disposed at the outside thereof. The change of the alignment of the liquid crystal according to the application of the electric field is performed according to the dielectric anisotropy of the liquid crystal, and the liquid crystal preferably has negative dielectric anisotropy. Accordingly, the liquid crystal is inclined in the direction vertical to the first electric field. Also, the changing degree of the alignment of the liquid crystal may be changed according to the intensity of the first electric field. That is, the angle between the direction vertical to the horizontal surface of the lower substrate and the long axis of the liquid crystal is referred to as a tilt angle, and the tilt angle of the liquid crystal is changed according to the intensity of the first electric field.

Next, the first photomask of a shape corresponding to the second region including the portion of a plurality of domains formed in the pixel area is positioned to the second region, and the light is irradiated. Accordingly, the light is only irradiated on the first region that is not covered by the first photomask, and includes the rest as a plurality of domains. Here, in a state in which the alignment of the liquid crystal is changed through the application of the first electric field, by photopolymerizing the photopolymerizable monomer or oligomer to form an alignment regulator, the liquid crystal that is disposed in the first region where the light is not blocked by the first photomask is subjected to secondary alignment (S4). The photopolymerization is performed by irradiating light such as ultraviolet rays, which initiates the polymerization of the photopolymerizable monomer or oligomer. The alignment regulator that is disposed in the first region is arranged according to the alignment of the liquid crystal that is disposed in the first region, and even after the applied first electric field is eliminated, the arrangement is maintained to affect the alignment of the neighboring liquid crystal. Therefore, the liquid crystal that is disposed in the first region where the light is not blocked by the first photomask may be arranged by the secondary alignment so as to have a polar angle that is different from that of the first alignment. The secondary alignment may be used in order to previously determine the operation direction of the liquid crystal when the electric field is applied and to allow the liquid crystal to have a pre-tilt.

Next, the liquid crystal is applied with the second electric field having a different magnitude from the first electric field to change the alignment of the liquid crystal (S5). The second electric field may be a greater or lesser electric field than the first electric field. The second electric field that is different from the first electric field may be applied by controlling the voltage applied between two electrodes. The tilt angle of the liquid crystal disposed in the second domain by the second electric field that is different from the first electric field is different from the tilt angle of the liquid crystal formed by the first electric field in the previous step (S3). When the liquid crystal has the negative dielectric anisotropy and the second electric field is larger than the first electric field, the tilt angle of the liquid crystal in S5 is larger than that in S3, and when the second electric field is less than the first electric field, the tilt angle of the liquid crystal in S5 is less than that in S3.

Next, the light is irradiated to the first region and the second region without the photomask. As above described, in the state in which the alignment of the liquid crystal is changed through the application of the second electric field, the alignment regulator having the predetermined pre-tilt may be formed in the second region by photopolymerizing the photopolymerizable monomer or oligomer. Here, the alignment regulator disposed in the first region has the predetermined pre-tilt by the process of S4, and is fixed such that, although it is exposed by the light, the pre-tilt of the alignment regulator of the first region is not changed.

Accordingly, the liquid crystal of the second region is secondly aligned (S6). The alignment regulator disposed in the second region is arranged according the alignment of the liquid crystal disposed in the second region. The tilt angle of the liquid crystal by the second electric field is different from the tilt angle of the liquid crystal by the first electric field of S3 such that amount of the pre-tilt of the alignment regulator disposed in the second region is different from amount of the pre-tilt of the alignment regulator formed in the first region in S4.

Although the applied second electric field is removed, the alignment regulator disposed in the second region affects the neighboring liquid crystal while maintaining the pre-tilt. Accordingly, the liquid crystal disposed in the second region has the different tilt angle from the tilt angle of the liquid crystal disposed in the first region. When the tilt angle of the liquid crystal disposed in the first region is larger than the tilt angle of the liquid crystal disposed in the second region, relation curve lines of the transmittance for the voltage applied between the first domain and the second domain, that is, a gamma curve, are different. Accordingly, the gamma curve line of one pixel area is a curved line of which the gamma curve of the first region and the gamma curve line of the second region are combined, such that the optical characteristics of the first region and the second region are effectively compensated to each other, thereby improving the lateral visibility.

Here, the first region and the second region that have the different amount of pre-tilt of the alignment regulator may be two regions into which one pixel is divided, or two regions that display different images. For example, the first region may be a red pixel region, and the second region may be a blue pixel area or a green pixel region. More than three regions having different amount of pre-tilt of the alignment regulator may be formed for the red, green, and blue pixels to have the different pre-tilt angles.

Thus, an exemplary embodiment in which the liquid crystal alignment method according to an exemplary embodiment of the present invention is applied to a vertical alignment liquid crystal display will be described.

Figure 14:
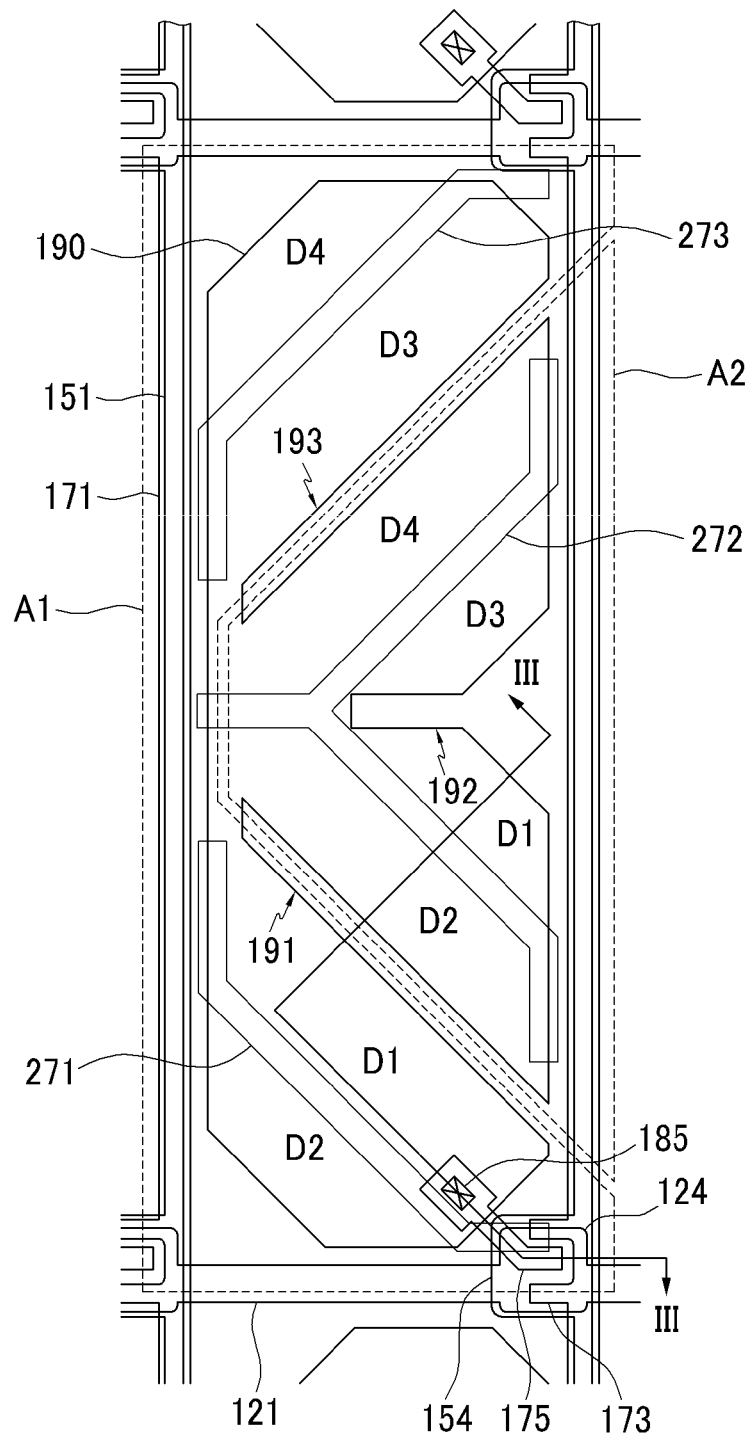
FIG. 14 is a layout view of a liquid crystal display according to an exemplary embodiment of the present invention.
Figure 15:
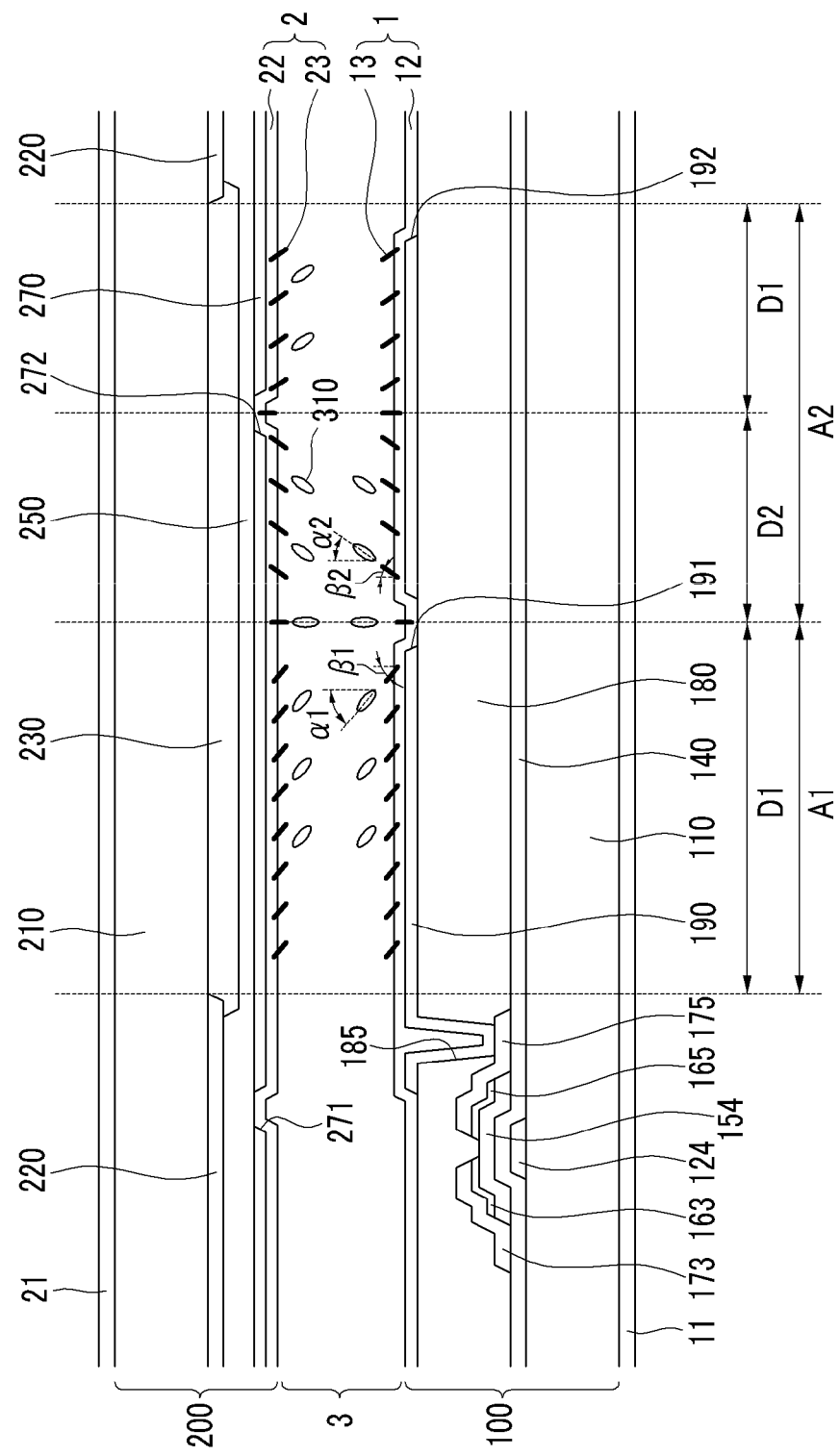
FIG. 15 is a cross-sectional view taken along the line III-III of FIG. 14.

FIG. 14 is a layout view of a liquid crystal display according to an exemplary embodiment of the present invention, and FIG. 15 is a cross-sectional view taken along the line III-III of FIG. 14.

A liquid crystal display according to an exemplary embodiment of the present invention includes a thin film transistor array panel 100, a common electrode panel 200, a liquid crystal layer 3, a lower polarizer 11, and an upper polarizer 21.

The thin film transistor array panel 100 includes thin films formed on an insulation substrate 110, and the common electrode panel 200 includes thin films formed on an insulation substrate 210.

Firstly, the thin film transistor array panel 100 will be described.

A gate electrode 124 is formed on the insulation substrate 110 that is made of transparent glass and the like. The gate electrode 124 receives a scanning signal through a gate line 121.

A gate insulating layer 140 is formed on the gate electrode 124, and an intrinsic semiconductor 151 and 154 that is made of amorphous silicon and the like is formed on the gate insulating layer 140. The intrinsic semiconductor 151 and 154 includes a semiconductor stripe 151 extending in the longitudinal direction according to a data line 171, and a channel portion 154 extending toward the gate electrode 124, the source electrode 173, and the drain electrode 175. The ohmic contacts 163 and 165 that are made of materials such as n+ hydrogenated amorphous silicon in which a silicide or an n-type impurity is doped at a high concentration are formed on the channel portion 154. For convenience, the channel portion 154 of the intrinsic semiconductor, and the ohmic contacts 163 and 165 may be called semiconductors, and the term "semiconductor" may mean a polysilicon semiconductor, an oxide semiconductor, or the like in addition to the set of the intrinsic semiconductor and the ohmic contact layer.

A plurality of source electrodes 173 and drain electrodes 175 are formed on the ohmic contacts 163 and 165. The source electrode 173 receives the image signal voltage from a data line 171. The drain electrode 175 faces the source electrode 173 on the gate electrode 124. The channel portion 154 is exposed between the source electrode 173 and the drain electrode 175.

The gate electrode 124, the source electrode 173, and the drain electrode 175 form a thin film transistor (TFT) in conjunction with the intrinsic semiconductor 154, and a channel of the thin film transistor is formed on the channel portion of the intrinsic semiconductor 154 between the source electrode 173 and the drain electrode 175.

A passivation layer 180 that has a contact hole 185 is formed on the gate insulating layer 140, the source electrode 173, the drain electrode 175, and the channel portion 154 of the intrinsic semiconductor. The passivation layer 180 may be made of an inorganic insulating material such as silicon nitride or silicon oxide, or an organic insulating material such as a resin.

A pixel electrode 190 is formed on the passivation layer 180. The pixel electrodes 190 are connected to the drain electrodes 175 through the contact holes 185, and may be formed of a transparent conductive layer such as ITO (indium tin oxide) or IZO (indium zinc oxide). The pixel electrodes 190 receive a data voltage from the drain electrodes 175. The pixel electrode 190 includes a plurality of cutouts 191, 192, and 193 as domain division means. The cutouts 191, 192, and 193 formed in the pixel electrode 190 include a transverse cutout 192 disposed on the position bisecting the pixel electrode 190s in lower and upper portions and formed in the transverse direction, and oblique cutouts 191 and 193 disposed on the bisected upper and lower portions of the pixel electrode 190 and formed in the oblique direction. The transverse cutout 192 is a shape that is dogged from the right edge of the pixel electrode 190 toward the left edge of the pixel electrode 190, and the entrance thereof is widely and symmetrically extended. Accordingly, the pixel electrode 190 substantially has mirror symmetry with respect to a line (parallel to the gate line) bisecting the pixel area defined by the intersection of the gate line 121 and the data line 171. Here, the upper and lower oblique cutouts 191 and 193 are perpendicular to each other, and this is to uniformly disperse the fringe field into four directions.

A lower alignment layer 1 is formed on the pixel electrode 190. The lower alignment layer 1 includes an alignment base layer 12 and an alignment regulator 13. The alignment base layer 12 may include at least one of materials that are generally used as the liquid crystal alignment layer such as a poly-amic acid, a poly-imide, lecithin, nylon, PVA (polyvinyl alcohol), and the like. Accordingly, the liquid crystal is basically aligned according to the property of the alignment base layer 12. The alignment regulator 13 is extended from the inside of the alignment base layer 12, and is formed by photopolymerizing the photopolymerizable monomer or oligomer.

As the photopolymerizable monomer or oligomer, there are a reactive mesogen (RM) NOA series manufactured by Norland, Co., Ltd., and the like.

The alignment regulator 13 of the lower alignment layer 1 may have a pre-tilt that slopes in a direction away from the cutout 191 of the pixel electrodes 190. Here, a pola angle of the pre-tilt $\beta 1$ of the alignment regulator 13 disposed in the first region A1 is different from a pola angle of the pre-tilt $\beta 2$ of the alignment regulator 13 disposed in the second region A2.

Next, the common electrode panel 200 will be described.

A light blocking member 220 is formed on the insulation substrate 210 that is made of transparent glass and the like, and a color filter 230 is formed on each region that is defined by the light blocking member 220. An overcoat 250 is formed on the color filter 230, and the common electrode 270 is formed on the overcoat 250.

The common electrode 270 has cutouts 271, 272, and 273 that function as the domain division means between the cutouts 191, 192, and 193 of the pixel electrode 190. The cutouts 271, 272, and 273 of one set of the common electrode 270 include an oblique portion alternately disposed with the cutouts 191 and 193 forming 45 degrees with respect to the gate line 121 and parallel to the cutouts 191 and 193 among the cutouts 191, 192, and 193 of the pixel electrode 190, and an end portion overlapping the edge of the pixel electrode 190. Here, the end portion is classified into a vertical direction end portion and a horizontal direction end portion.

The overcoat 250 may be omitted, and the color filter 230 and the light blocking member 220 may be formed in the thin film transistor array panel 100.

An upper alignment layer 2 is formed on the common electrode 270. The upper alignment layer 2 also includes an alignment base layer 22 and an alignment regulator 23. The alignment base layer 22 may include at least one of materials that are generally used as the liquid crystal alignment layer such as a poly-amic acid, a poly-imide, lecithin, nylon, PVA (polyvinyl alcohol), and the like. Accordingly, the liquid crystal is basically aligned according to the property of the alignment base layer 22. The alignment regulator 23 is extended from the inside of the alignment base layer 22, and is formed by photopolymerizing the photopolymerizable monomer or oligomer.

As the photopolymerizable monomer or oligomer, as described above, there are a reactive mesogen (RM), NOA series manufactured by Norland, Co., Ltd., and the like.

The alignment regulator 23 of the upper alignment layer 2 has the pre-tilt that is inclined in the same direction as the alignment regulator 13 of the lower alignment layer 1 of the position corresponding thereto. Here, a pola angle of the pre-tilt angle $\beta 1$ of the alignment regulator 23 disposed in the first region A1 is different from a pola angle of the pre-tilt angle $\beta 2$ of the alignment regulator 23 disposed in the second region A2.

When the thin film transistor array panel 100 and the common electrode panel 200 are aligned, one set of the cutouts 271, 272, and 273 of the common electrode 270 and one set of the cutout 191, 192, and 193 of the pixel electrode 190 divide the pixel electrode 190 into a plurality of subareas.

The portion of the liquid crystal layer 3 between each subregion of the pixel electrode 190 and the each subregion of the common electrode 270 corresponding thereto is referred to as a subregion, the subregions are classified into eight kinds according to the average long axis direction of the liquid crystal when the electric field is applied, and they are referred to as a domain.

As above-described, when the thin film transistor array panel 100 and the common electrode panel 200 are aligned, the cutouts 191, 192, and 193 of the pixel electrode 190 and the cutouts 271, 272, and 273 of the common electrode 270 divide the pixel area into a plurality of domains, the electric field formed when the voltage is applied between the pixel electrode 190 and the common electrode 270 generates the horizontal component with respect to the substrates 110 and 210, and the horizontal component has a function of controlling the direction that the liquid crystal is inclined.

These domains are classified into four kinds according to the average long axis direction of the liquid crystal that is disposed therein, and each domain is elongated thereby having a width and a length. The arrangement of the liquid crystal inside these domains is regular such that the viewing angle of the liquid crystal display is widened. In FIG. 2, two of the first domain D1, two of the second domain D2, two of the third domain D3, and two of the fourth domain D4 are shown, the first region A1 includes one set of the first domain to the fourth domain, and the second region A2 includes another set of the first domain to the fourth domain. The boundaries of the domains are disposed on the cutouts 191, 192, and 193 of the pixel electrode 190 in FIG. 2, however the boundaries of the domains are not always disposed on the cutouts 191, 192, and 193 of the pixel electrode 190.

The liquid crystal layer 3 includes the liquid crystal that has negative dielectric anisotropy and is perpendicularly arranged by alignment force of the alignment base layers 12 and 22 with respect to the substrates 110 and 210, and the liquid crystal that is adjacent to the lower alignment layer 1 and the upper alignment layer 2 has a pre-tilt by effect of the alignment regulators 13 and 23 of the lower alignment layer 1 and the upper alignment layer 2. As described above, if the liquid crystal has the pre-tilt, since the liquid crystal of all regions is immediately sloped according to a pre-tilt when the electric field is applied, the response speed is very fast.

Also, the alignment regulators 13 and 23 affect the alignment of the liquid crystal adjacent thereto, and a pola angle of the pre-tilt $\beta 1$ of the alignment regulators 13 and 23 disposed in the first domain D1 and the second domain D2 of the first region A1 is larger than a pola angle of the pre-tilt 2 of the alignment regulators 13 and 23 disposed in the first domain D1 and the second domain D2 of the second region A2 such that a pola angle of the pre-tilt $\alpha 2$ of the liquid crystal adjacent to the lower and upper alignment layers 1 and 2 disposed in the first domain D1 and the second domain D2 of the first region A1 is larger than a pola angle of the pre-tilt $\alpha 2$ of the liquid crystal adjacent to the lower and upper alignment layers 1 and 2 disposed in the first domain D1 and the second domain D2 of the second region A2.

Accordingly, when the voltage is applied, the entire liquid crystal of the liquid crystal layer 3 is inclined according to the pre-tilt of the liquid crystal adjacent to the lower and upper alignment layers 1 and 2, and here, the tilt angle of the liquid crystal disposed in the first domain D1 and the second domain D2 of the first region A1 is larger than the tilt angle of the liquid crystal disposed in the first domain D1 and the second domain D2 of the second region.

Accordingly, the gamma curves between the first region A1 and the second region A2 are different such that the optical characteristics of the first region A1 and the second region A2 are effectively compensated to each other, thereby improving the lateral visibility.

As above-described, the lower alignment layer 1 and the upper alignment layer 2 both include the alignment base layers 12 and 22, and the alignment regulators 13 and 23, however it is possible for one of the lower alignment layer 1 and the upper alignment layer 2 to only include the alignment base layer and the alignment regulator, and for the remaining one to only be made of the alignment base layer.

The lower polarizer 11 and the upper polarizer 21 may be disposed to enable transmissive axes thereof to cross each other.

The compensation film may be disposed between the polarizer 21 and the substrate 210, and may be a phase retardation layer such as a ¼ wavelength retardation layer or a ½ wavelength retardation layer or a viewing angle compensation layer. Two or more compensation layers 24 may be included, or they may be omitted.

A method for manufacturing a liquid crystal display according to an exemplary embodiment of the present invention will now be described with reference to FIG. 16 to FIG. 20.

Figure 16:
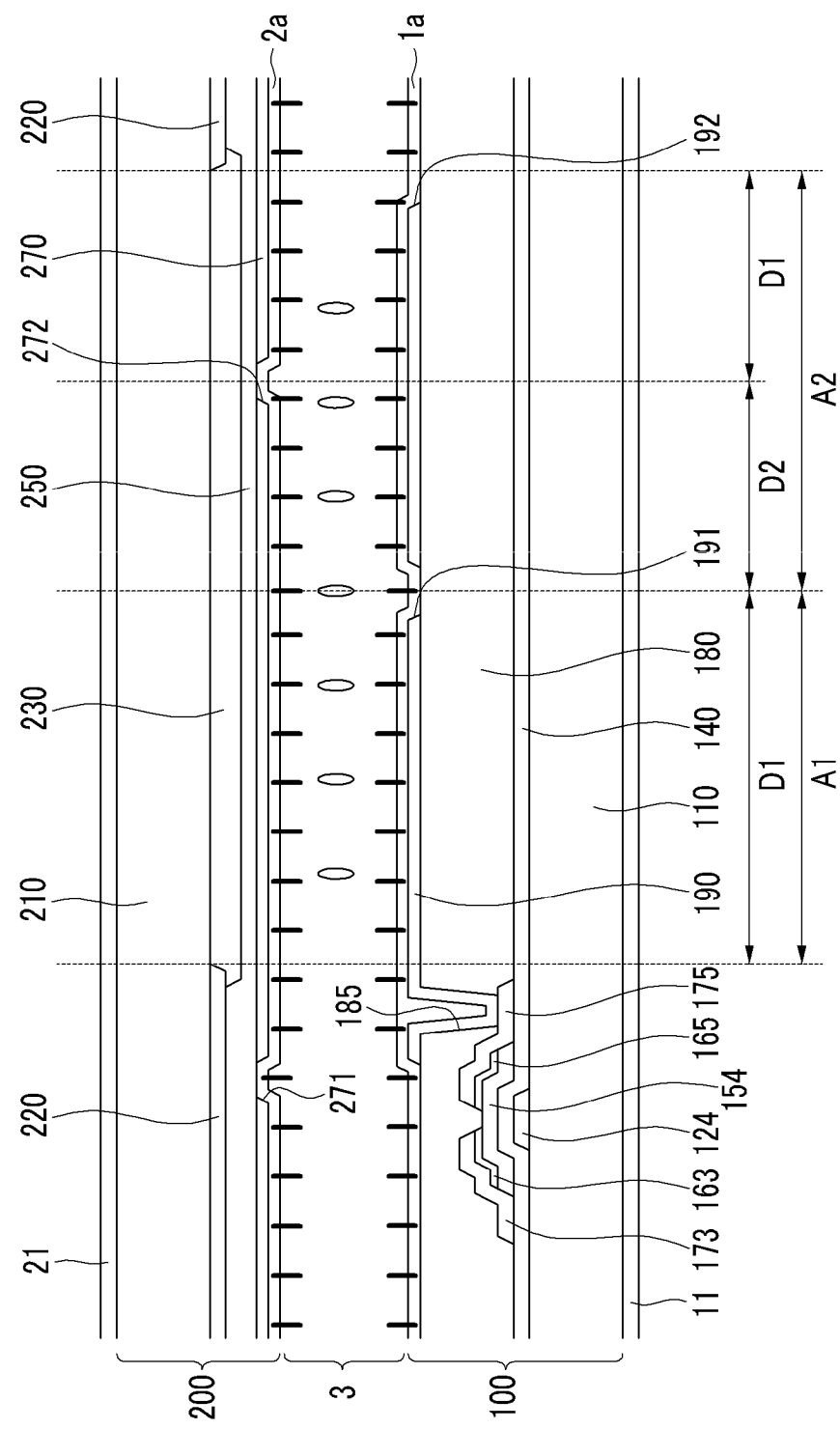
FIG. 16 is a cross-sectional view showing a step for firstly aligning a liquid crystal according to an exemplary embodiment of the present invention.
Figure 17:
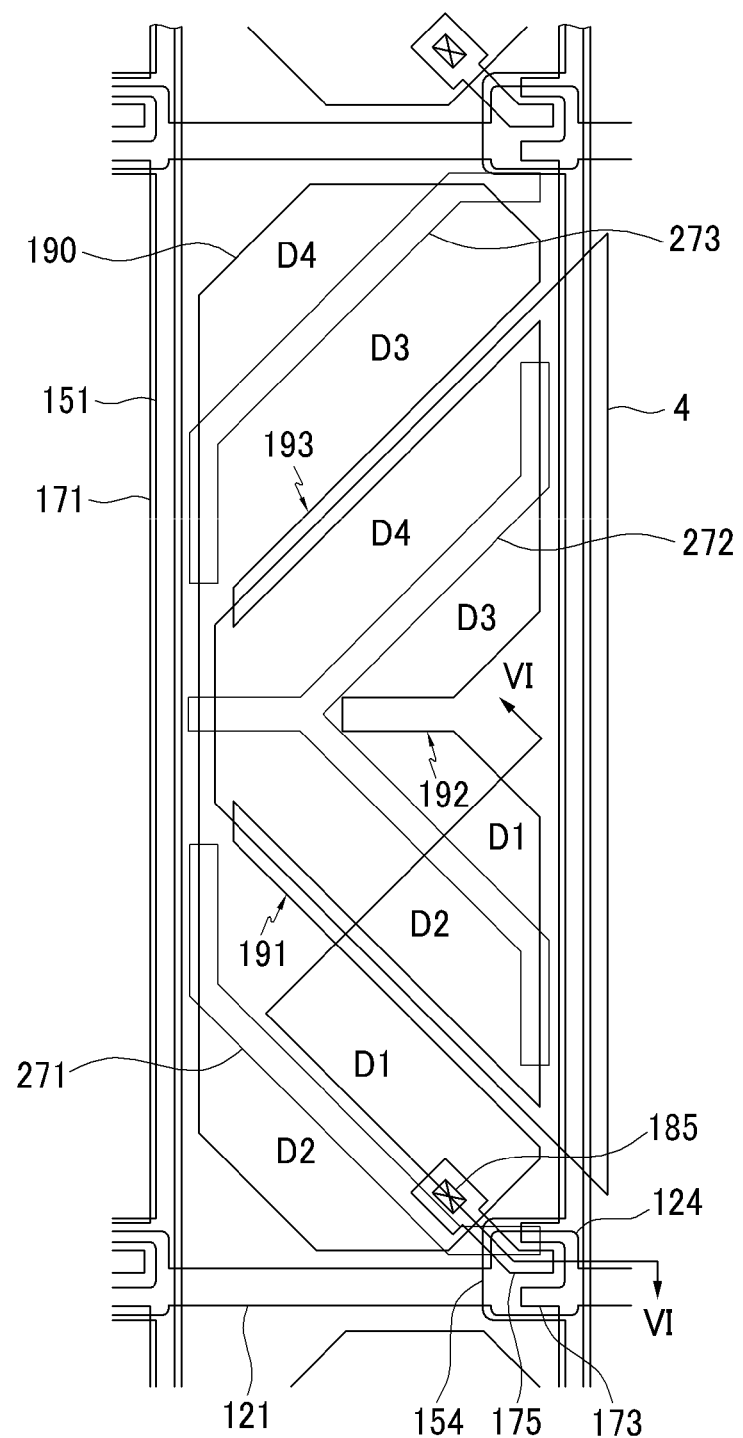
FIG. 17 is a layout view showing a step for secondly aligning a liquid crystal disposed in the first region according to an exemplary embodiment of the present invention.
Figure 18:
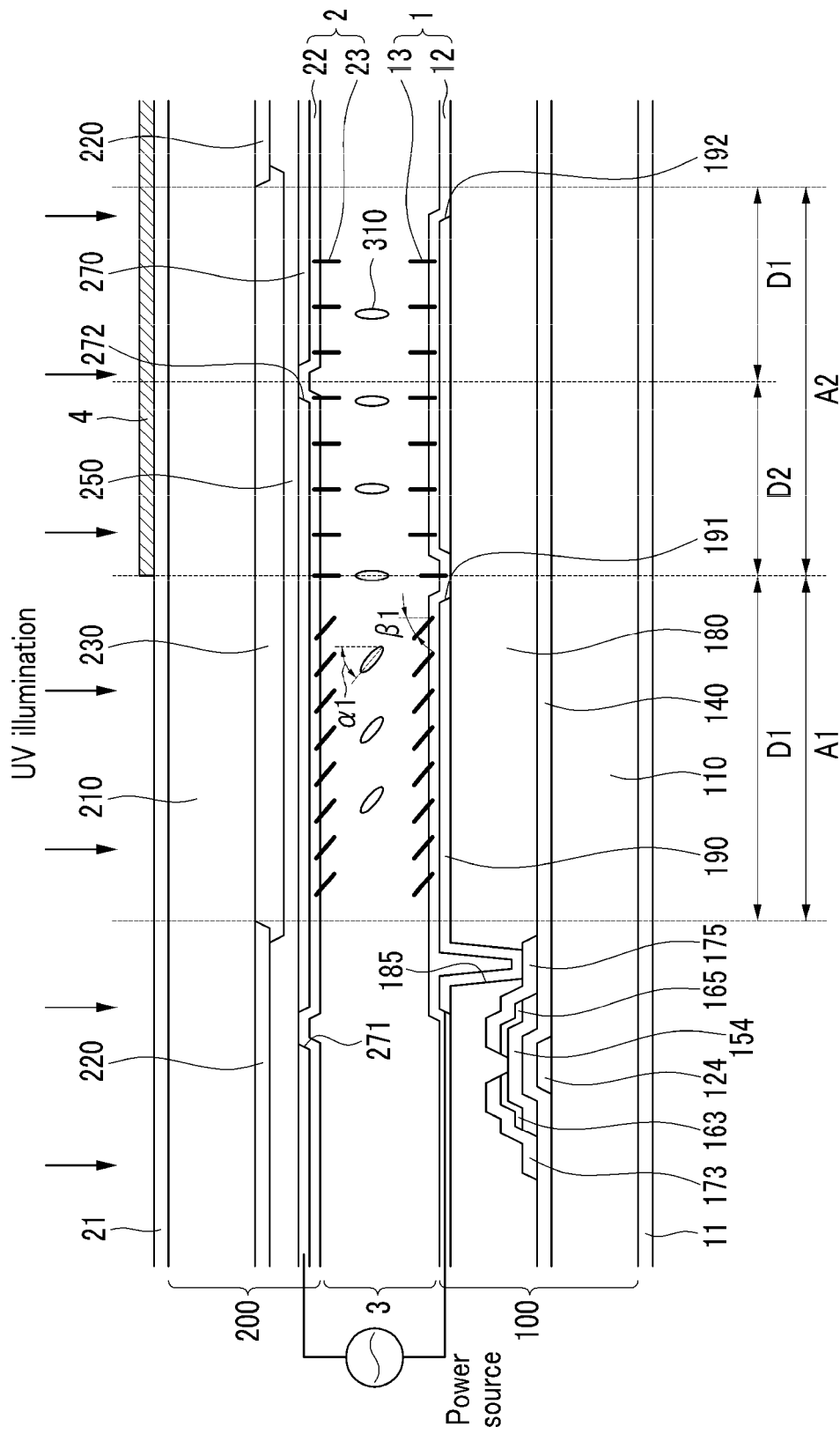
FIG. 18 is a cross-sectional view taken along the line VI-VI of FIG. 17.
Figure 19:
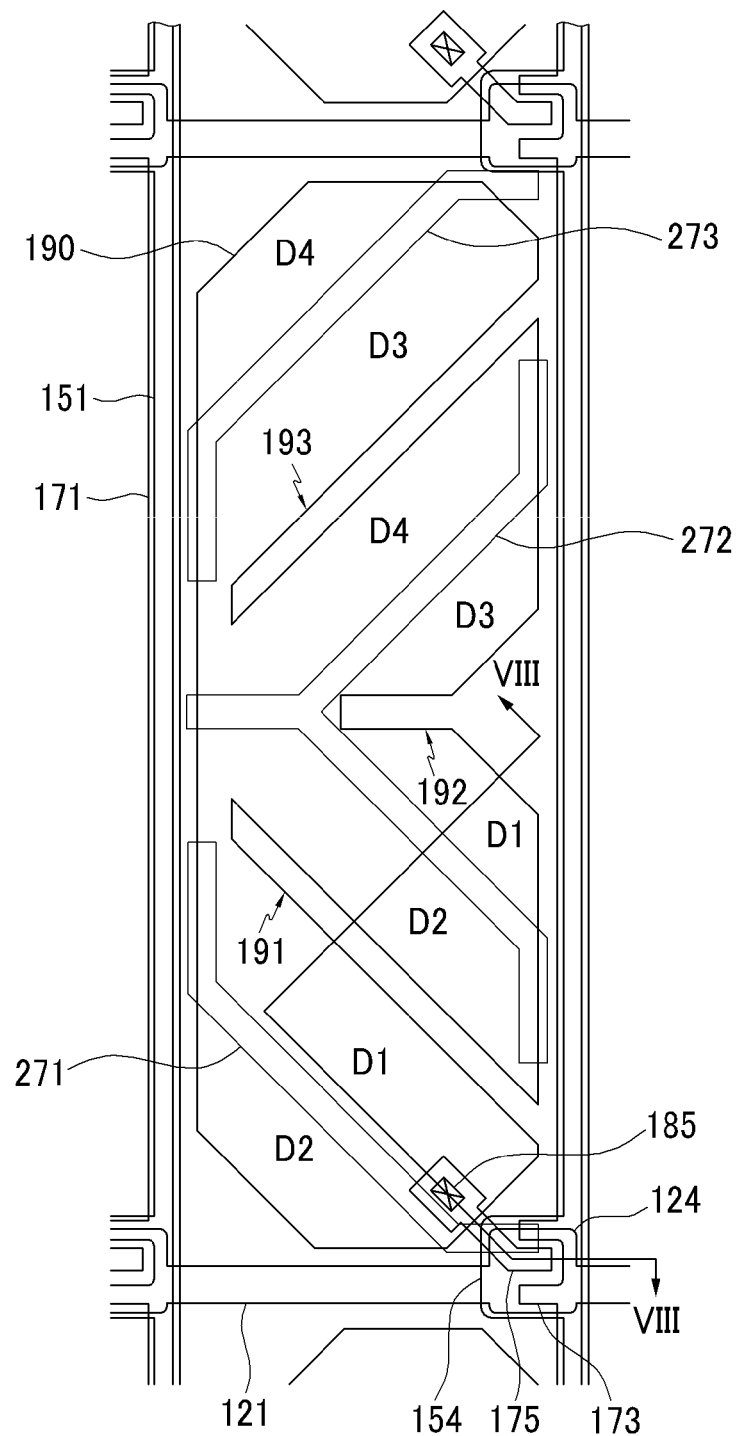
FIG. 19 is a layout view showing a step for secondly aligning a liquid crystal disposed in the second region according to an exemplary embodiment of the present invention.
Figure 20:
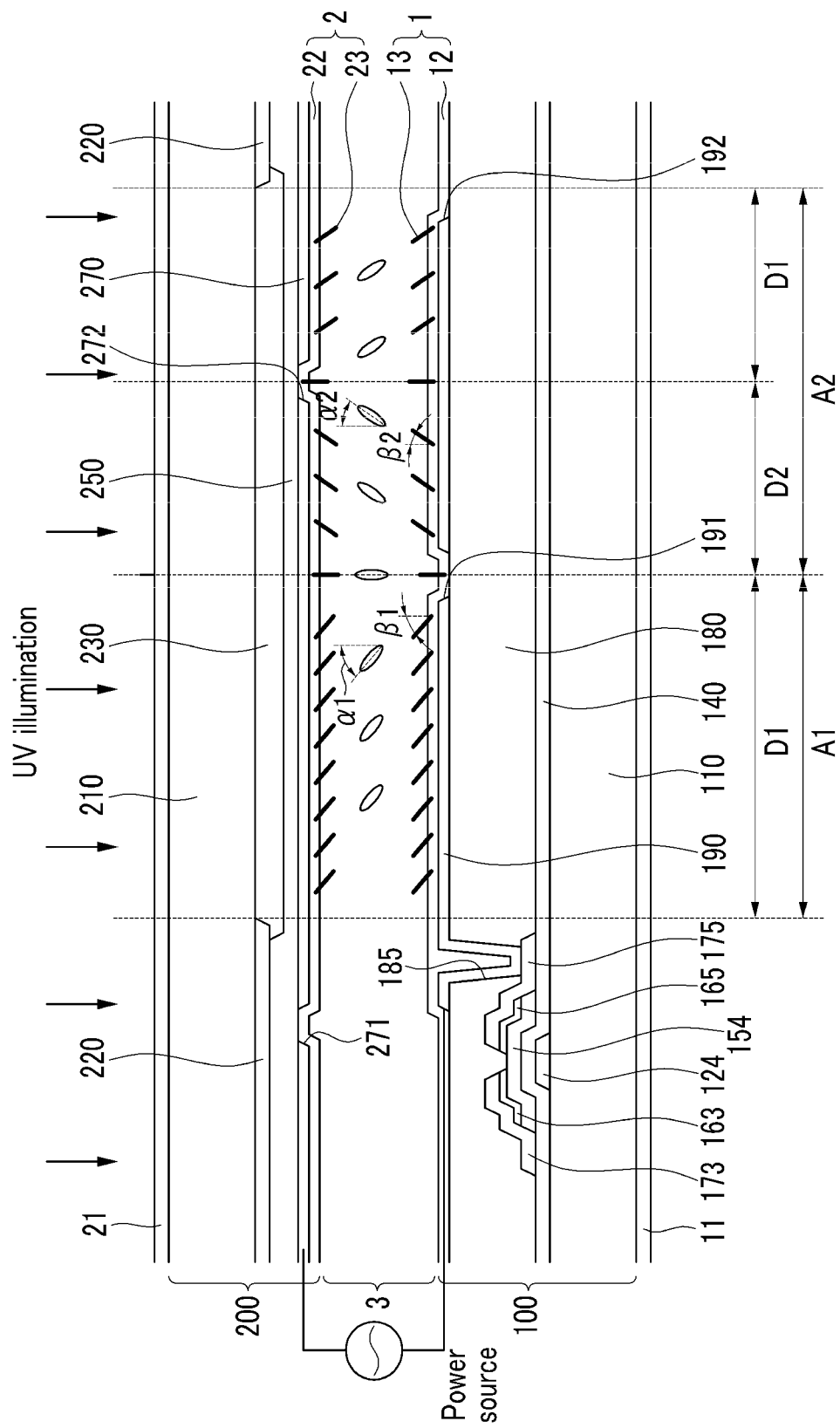
FIG. 20 is a cross-sectional view taken along the line VIII-VIII of FIG. 19.

FIG. 16 is a cross-sectional view showing a step for firstly aligning a liquid crystal according to an exemplary embodiment of the present invention, FIG. 17 is a layout view showing a step for secondly aligning a liquid crystal disposed in the first region according to an exemplary embodiment of the present invention, FIG. 18 is a cross-sectional view taken along the line VI-VI of FIG. 17, FIG. 19 is a layout view showing a step for secondly aligning a liquid crystal disposed in the second region according to an exemplary embodiment of the present invention, and FIG. 20 is a cross-sectional view taken along the line VIII-VIII of FIG. 19.

First, as shown in FIG. 16, a gate line 121, a gate insulating layer 140, a data line 171, a passivation layer 180, and a thin film transistor are formed on the insulation substrate 110 by using a thin film deposition method, a photolithography method, a photo-etching method, and the like, and the pixel electrodes 190 are formed on the passivation layer 180. The pixel electrode 190 is formed through the photolithography process, and a cutout pattern is inserted to the photomask pattern for the photolithography such that the cutouts 191, 192, and 193 as the domain division means are simultaneously formed along with the pixel electrode 190.

In addition, a light blocking member 220, a color filter 230, and an overcoat 250 are formed on the insulation substrate 210 by using a thin film deposition method, a photolithography method, a photo-etching method, and the like, and a common electrode 270 is formed on the overcoat 250. The common electrode 270 is formed through the photolithography process, and a cutout pattern is inserted to the photomask pattern for the photolithography such that the cutouts 271, 272, and 273 as the domain division means are simultaneously formed along with the common electrode 270.

Next, the alignment base material and a monomer or oligomer that is different from the alignment base material are mixed with each other and coated on the pixel electrodes 190 of the thin film transistor array panel 100, and are subjected to heat treatment (curing) at a temperature in the range of 100 to 180° C. for 0.5 to 1 hour to cure the alignment base material, thereby forming a lower alignment layer 1a that includes the monomer or oligomer. In addition, the alignment base material and the monomer or oligomer that is different from the alignment base material are mixed with each other and coated on the common electrode 270 of the common electrode panel 200, and are subjected to heat treatment (curing) at a temperature in the range of 100 to 180° C. for 0.5 to 1 hour to cure the alignment base material, thereby forming an upper alignment layer 2a that includes the monomer or oligomer. Here, the monomer or oligomer included in the lower alignment layer 1a and the upper alignment layer 2a may be a photopolymerizable material.

The alignment base material may include at least one of materials that are generally used as the liquid crystal alignment layer such as a poly-amic acid, a poly-imide, lecithin, nylon, PVA (polyvinyl alcohol), and the like. Accordingly, the lower alignment layer 1a and the upper alignment layer 2a that include the photopolymerizable monomer or oligomer may serve to perform alignment of the liquid crystal according to the property of the alignment base layers. As the photopolymerizable monomer or oligomer, as described above, a reactive mesogen (RM), NOA series manufactured by Norland, Co., Ltd., and the like may be used.

Here, a polymerization initiator may be added to the mixture of the alignment base material and the monomer or oligomer.

Subsequently, the thin film transistor array panel 100 and the common electrode panel 200 are assembled. The assembling of these panels 100 and 200 may be performed by using either of two methods.

As a first method, a sealant is coated on either of the thin film transistor array panel 100 and the common electrode panel 200 to define a region on which the liquid crystal is filled, the liquid crystal is dripped on the defined region, and the thin film transistor array panel 100 and common electrode panel 200 are arranged and bonded. At this time, a spacer for maintaining an interval between the two substrates 100 and 200 may be dispersed before or after the coating of the liquid crystal. The spacer may be previously formed on the thin film transistor array panel 100 and the common electrode panel 200 through a forming process of the thin film. Here, the liquid crystal may be dripped by adding the photopolymerizable monomer or oligomer.

As a second method, the sealant is coated on either one of the thin film transistor array panel 100 and the common electrode panel 200 to define the region at which the liquid crystal is filled and having a liquid crystal injection hole, and the two substrates 100 and 200 are arranged and bonded. Next, there is a method in which, in a vacuum state, the liquid crystal injection hole is dipped in a liquid crystal storage bath, the vacuum is eliminated to inject the liquid crystal, and the liquid crystal injection hole is sealed. Here, the liquid crystal may be dripped by adding the photopolymerizable monomer or oligomer.

Next, as shown in FIG. 17 and FIG. 18, the voltage is applied between the pixel electrodes 190 and the common electrode 270 to rearrange the liquid crystal. Here, the intensity of the first electric field is largely controlled to form the large tilt angle $\alpha1$ of the liquid crystal. Next, the first photomask 4 with the same shape as the second region A2 among of the pixel area is positioned on the second region A2, and then the light such as ultraviolet rays is irradiated. Accordingly, the light is only irradiated on the first region A1 that is not covered by the first photomask 4. Here, the monomer or oligomer included in the lower and upper alignment layers 1 and 2 is the photopolymerizable material such that the monomer or oligomer is photopolymerized by the light such as ultraviolet rays, and the alignment regulators 13 and 23 are extended from the inside of the alignment base layers 12 and 22. These alignment regulators 13 and 23 are only formed in the first region A1. The alignment regulators 13 and 23 that are formed in the first region A1 have the pre-tilt according to the arrangement of the liquid crystal. Accordingly, the liquid crystal has the large tilt angle by the first electric field of the large intensity such that the alignment regulators 13 and 23 that are disposed in the first region A1 have the large pre-tilt angle $\beta1$.

Next, as shown in FIG. 19 and FIG. 20, the second electric field is applied between the pixel electrode 190 and the common electrode 270 to rearrange the liquid crystal. The intensity of the second electric field is less than that of the first electric field such that the tilt angle $\alpha2$ of the liquid crystal is less than the case that the first electric field is applied. Next, the light such as ultraviolet rays is irradiated without the additional photomask such that the light is irradiated on the entire first region A1 and second region A2. Here, the monomer or oligomer included in the lower and upper alignment layers 1 and 2 are photopolymerized such that the alignment base layers 12 and 22 are extended from the inside of the alignment regulators 13 and 23. These alignment regulators 13 and 23 are only formed in the second region A2, and the alignment regulator having the pre-tilt that is previously fixed is formed in the first region A1. The alignment regulators 13 and 23 formed in the second region A2 have the pre-tilt according to the arrangement of the liquid crystal. Accordingly, the liquid crystal has the small tilt angle $\alpha2$ by the second electric field such that a pola angle of the pre-tilt $\beta2$ of the alignment regulators 13 and 23 disposed in the second region A2 is less than a pola angle of the pre-tilt $\beta1$ of the alignment regulators 13 and 23 disposed in the first region A1.

Here, the liquid crystal adjacent to the lower alignment layer 1 and the upper alignment layer 2 has the pre-tilt by the influence of the alignment regulators 13 and 23 of the lower alignment layer 1 and the upper alignment layer 2, and a pola angle of the pre-tilt $\alpha2$ of the liquid crystal adjacent to the lower and upper alignment layers 1 and 2 disposed in the second region A2 is less than a pola angle of the pre-tilt $\alpha1$ of the liquid crystal adjacent to the lower and upper alignment layers 1 and 2 disposed in the first region A1.

Accordingly, all liquid crystal of the liquid crystal layer is immediately inclined according to the pre-tilt of the liquid crystal adjacent to the lower and upper alignment layers 1 and 2 when the voltage is applied, and here, a pola angle of the tilt angle $\alpha1$ of all liquid crystal disposed in the first region A1 is larger than a pola angle of the tilt angle $\alpha2$ of all liquid crystal disposed in the second region A2. Accordingly, the gamma curves between the first region A1 and the second region A2 are different such that the optical characteristics of the first region A1 and the second region A2 are effectively compensated to each other, thereby improving the lateral visibility.

Next, the compensation layer 24 and the polarizers 11 and 21 are attached and the module process is performed.

On the other hand, in the exemplary embodiment, all liquid crystal of the liquid crystal layer is immediately inclined according to the pre-tilt of the liquid crystal adjacent to the lower and upper alignment layers 1 and 2 when the voltage is initially applied, and the tilt angles of all liquid crystal that is disposed in the different regions are different from each other thereby compensating the lateral visibility, however the influence of the alignment regulators 13 and 23 of the lower and upper alignment layers 1 and 2 is decreased after the passage of a predetermined time after the application of the initial voltage and the same voltage is applied to the entire pixel area such that the tilt angles of all liquid crystal become the same, and accordingly it is preferable that the tilt angle of the liquid crystal that is disposed in the different regions is differently maintained. Accordingly, this exemplary embodiment will be described with reference to drawings.

Figure 21:
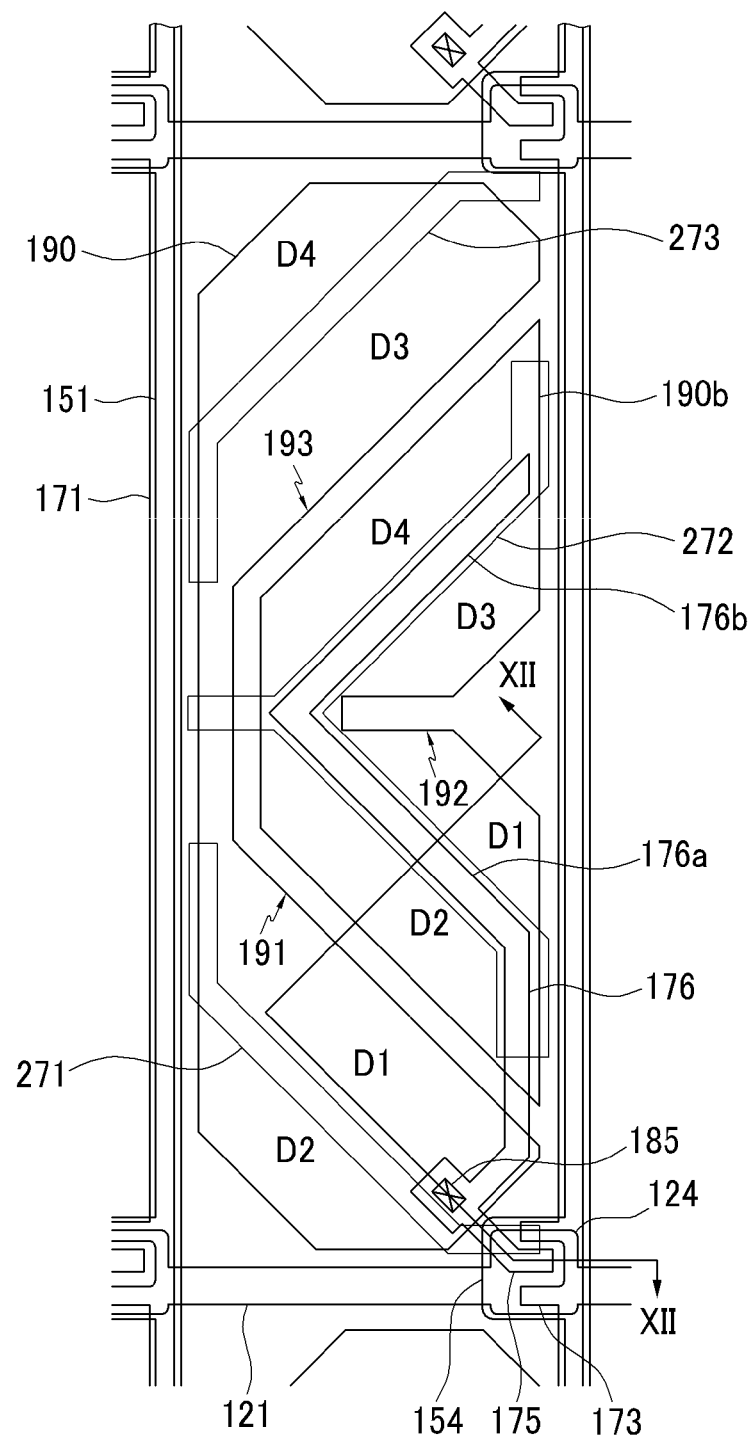
FIG. 21 is a layout view of a liquid crystal display according to another exemplary embodiment of the present invention.
Figure 22:
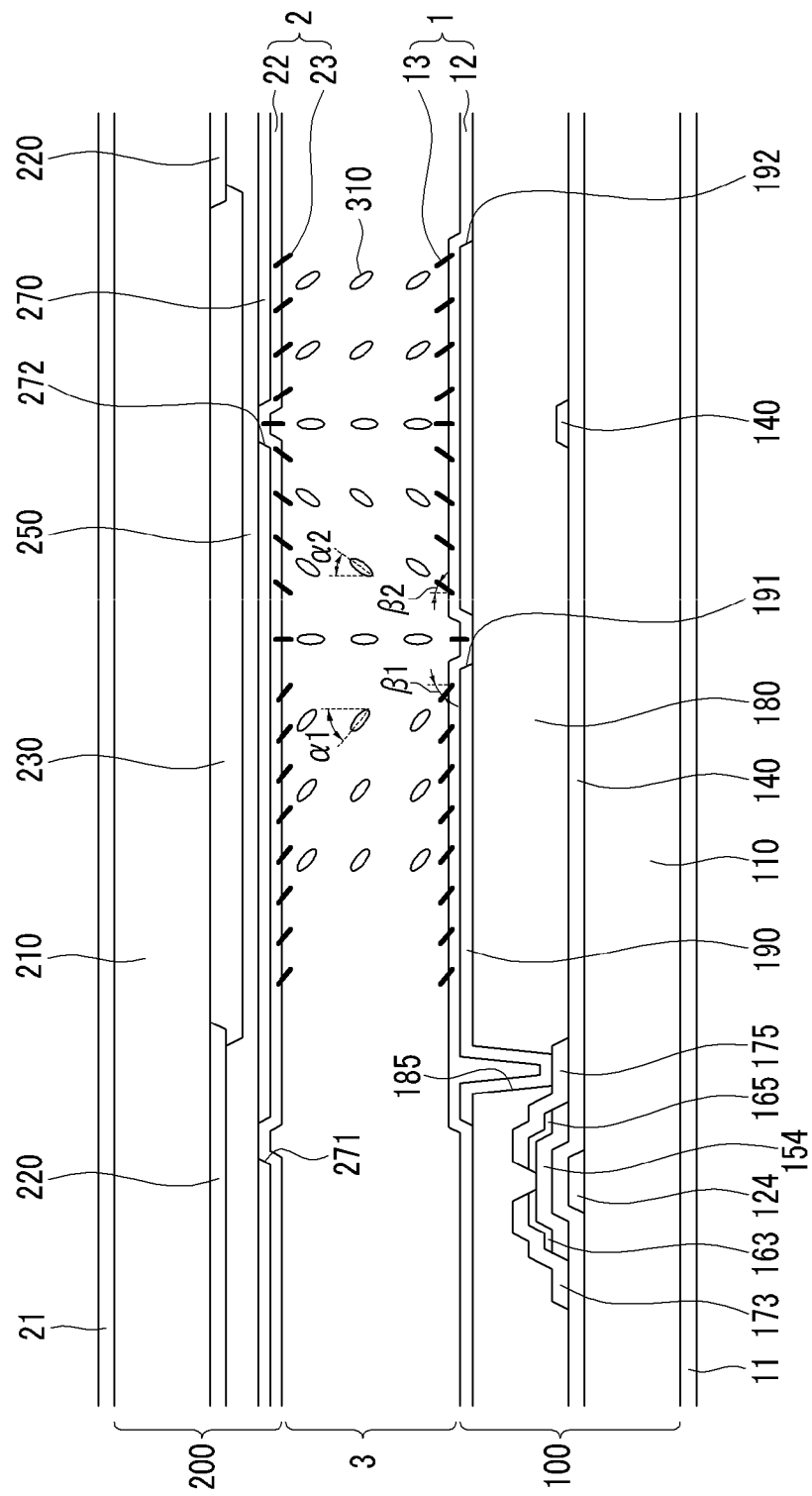
FIG. 22 is a cross-sectional view taken along the line XII-XII of FIG. 21.

FIG. 21 is a layout view of a liquid crystal display according to another exemplary embodiment of the present invention, and FIG. 22 is a cross-sectional view taken along the line XII-XII of FIG. 21.

The liquid crystal display of FIG. 21 and FIG. 22 has mainly the same structure as the liquid crystal display of FIG. 14 and FIG. 15, however the structure of a capacitive coupling electrode 176 extended from the drain electrode 175 and the pixel electrode is distinguished. The differences will be mainly described.

The drain electrode 175 includes the capacitive coupling electrode 176 extending in the longitudinal direction. The capacitive coupling electrode 176 includes two oblique portions 176a and 176b that are connected to each other.

The pixel electrode 190 is divided in to first and second pixel electrodes 190a and 190b that are separated from each other, the first pixel electrode 190a is separated and includes two parts provided on the top and bottom with reference to the second pixel electrode 190b, and the second pixel electrode 190b is inserted between the two parts of the first pixel electrode 190a. The two parts of the first pixel electrode 190a and the second pixel electrode 190b have a side with an inclination of ±45° with respect to the gate line 121, and the pixel electrode 190 has a symmetrical structure with regard to the central line of the neighboring gate line 121. The first subpixel electrode 190a is disposed corresponding to the first region A1, and the second subpixel electrode 190b is disposed corresponding to the second region A2.

Here, the first subpixel electrode 190a is connected to the drain electrode 175 through the contact hole 185, thereby directly receiving the data voltage, however the second subpixel electrode 190b overlaps the capacitive coupling electrode 176 connected to the first subpixel electrode 190a. Accordingly, the second subpixel electrode 190b is electrically and capacitively coupled to the first subpixel electrode 190a.

The first and second subpixel electrodes 190a and 190b include a central cutout 91, a lower cutout 92a, and an upper cutout 92b, and the first and second subpixel electrodes 190a and 190b are divided into a plurality of regions by the cutouts 91, 92a, and 92b. The cutouts 91, 92a, and 92b are inversely symmetrical with respect to a transverse central line bisecting the first and second subpixel electrodes 190a and 190b and parallel to the gate line 121. Here, the lower and upper cutouts 92a and 92b are connected to each other thereby forming a gap dividing the first subpixel electrode 190a and the second subpixel electrode 190b.

The first subpixel electrode 190a is directly connected to the thin film transistor through the drain electrode 175 to receive the image signal voltage transmitted to the data line 171, however the voltage of the second pixel electrode 190b is changed by capacitive coupling with the first pixel electrode 190a. In the present exemplary embodiment, the voltage at the second pixel electrode 190b always has an absolute value that is less than the voltage at the first pixel electrode 190a.

Accordingly, when the voltage is initially applied, the entire liquid crystal of the liquid crystal layer 3 is inclined according to the pre-tilt of the liquid crystal adjacent to the lower and upper alignment layers 13 and 23 such that the response speed is improved, the tilt angles α1 and α2 of the liquid crystal that are disposed in the different regions are different from each other such that the lateral visibility is improved, and the tilt angles of the liquid crystal may be differently maintained by the first subpixel electrode 190a and the second subpixel electrode 190b that are disposed in the different regions and are driven by the different voltages even after time has passed after the application of the initial voltage such that the lateral visibility may be improved.

Meanwhile, in the liquid crystal display of FIG. 21 and FIG. 22, the first subpixel electrode 190a and the second subpixel electrode 190b that are divided into each region are electrically coupled by using one thin film transistor, however the first subpixel electrode 190a and the second subpixel electrode 190b may be connected to the thin film transistor for each region, and the present invention may be applied to this structure that will be described with reference to drawings.

Figure 23:
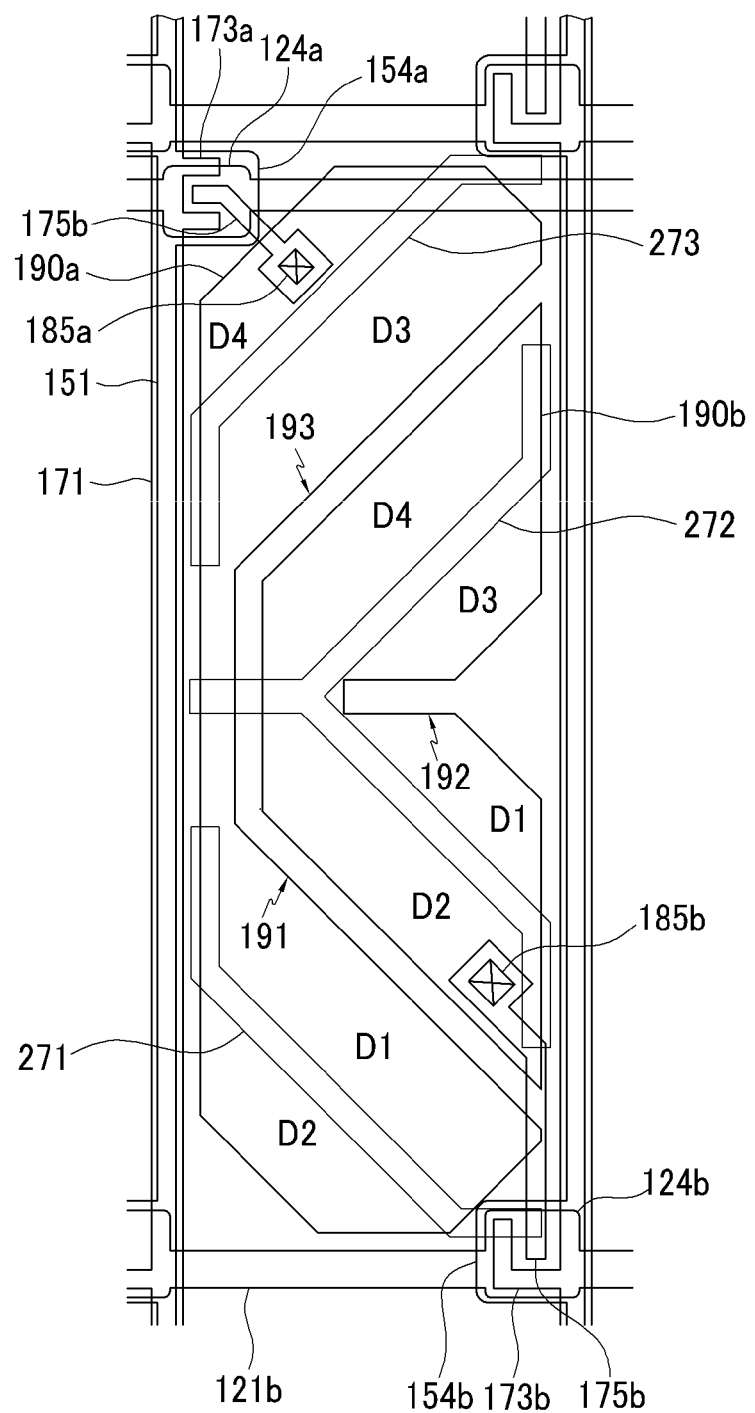
FIG. 23 is a layout view of a liquid crystal display according to another exemplary embodiment of the present invention.

FIG. 23 is a layout view of a liquid crystal display according to another exemplary embodiment of the present invention.

The liquid crystal display of FIG. 23 has almost the same structure as that of the liquid crystal display of FIG. 21 and FIG. 22, and it is distinguished by an additional transistor that is formed to replace the capacitive coupling electrode 176. This difference will be mainly described.

As shown in FIG. 23, first and second gate lines 121a and 121b are extended in the transverse direction, are physically and electrically separated from each other, and transmit the gate signal.

The first and second gate line 121a and 121b include first and second gate electrodes 124a and 124b that are respectively disposed and protruded upward and downward.

A gate insulating layer 140 is formed on the first and the second gate electrodes 124a and 124b, and intrinsic semiconductors 151, 154a, and 154b that are made of amorphous silicon are formed on the gate insulating layer 140. The intrinsic semiconductors 151, 154a, and 154b include a semiconductor stripe 151 extending in the longitudinal direction according to the data line 171, and channel portions 154a and 154b extending toward the gate electrodes 124a and 124b, source electrodes 173a and 173b, and drain electrodes 175a and 175b. Ohmic contacts 163a, 163b, 165a, and 165b are formed on the channel portions 154a and 154b. The first and second source electrodes 173a and 173b and the first and second drain electrode 175a and 175b are formed on the ohmic contacts 163a, 163b, 165a, and 165b. The first/second gate electrode 124a/124b, the first/second source electrode 173a/173b and the first/second drain electrode 175a/175b form the first/second thin film transistor (TFT) along with a channel portion 154a/154b, and the channel of the thin film transistor is formed in the channel portion 154a/154b between the first/second source electrode 173a/173b and the drain electrode 175a/175b.

A passivation layer 180 having contact holes 185a and 185b is formed on the gate insulating layer 140, the first/second source electrode 173a/173b, the first/second drain electrode 175a/175b, and the channel portion 154a/154b.

A plurality of pixel electrodes 190 respectively including the first and second subpixel electrodes 190a and 190b are formed on the passivation layer 180. The first/second subpixel electrode 190a/190b is physically and electrically connected to the first/second drain electrode 175a/175b through the contact hole 185a/185b thereby receiving the data voltage from the first/second drain electrode 175a/175b.

The first subpixel electrode 190a is disposed on a first region A1 and is divided into a first domain D1 to a fourth domain D4, and the second subpixel electrode 190b is disposed on a second region A2 and is divided into a first domain D1 to a fourth domain D4. The first subpixel electrode 190a is applied with a higher voltage than that of the second subpixel electrode 190b.

Accordingly, when the voltage is initially applied, the entire liquid crystal of the liquid crystal layer 3 is inclined according to the pre-tilt of the liquid crystal adjacent to the lower and upper alignment layers 13 and 23 such that the response speed is improved, the tilt angles of the liquid crystal that are disposed in the different regions are different from each other such that the lateral visibility is improved, and the tilt angles of the liquid crystal may be differently maintained by the first subpixel electrode 190a and the second subpixel electrode 190b that are disposed in the different regions and are driven by the different voltages even when time has passed after the application of the initial voltage such that the lateral visibility may be improved. In detail, the voltages of the first region A1 and the second region A2 are controlled by using the first and second thin film transistors such that the gamma curve of each region may be controlled. Accordingly, the combination gamma curve of each region is determined to be close to the reference gamma curve of the front side such that the lateral visibility may be improved.

Another exemplary embodiment of the present invention will now be described.

Figure 24:
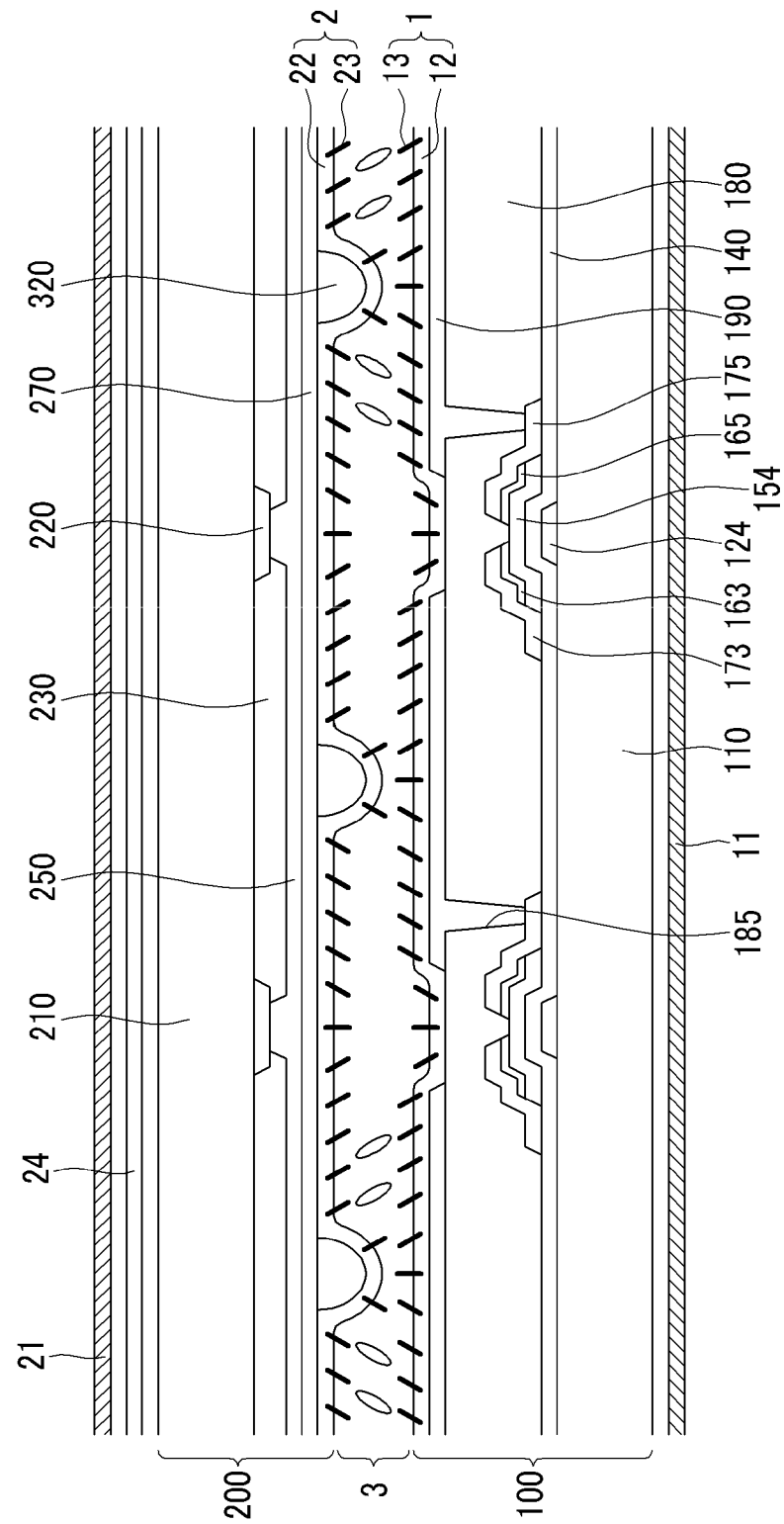
FIG. 24 is a cross-sectional view of a liquid crystal display according to another exemplary embodiment of the present invention.

FIG. 24 is a cross-sectional view of a liquid crystal display according to another exemplary embodiment of the present invention.

The liquid crystal display of FIG. 24 is different from the liquid crystal display of FIG. 2 in that an organic material protrusion 320 is formed on the common electrode 270 instead of forming the cutout 271 on the common electrode 270. The organic material protrusion 320, rather than the cutout 271, enables the electric field that is formed when the voltage is applied between the pixel electrodes 190 and the common electrode 270 to have a component that is parallel to the substrates 110 and 210. The remaining contents of the lower alignment layer 1 and the upper alignment layer 2 that have the alignment base layers 12 and 22 and the alignment regulators 13 and 23, and the alignment regulators 13 and 23 that have the pre-tilt that is sloped in a direction away from the organic material protrusion 320, are similar to those of the liquid crystal display of FIG. 2.

Like the liquid crystal display of FIG. 2, this liquid crystal display has a high response speed, it is easy to control the pre-tilt of the liquid crystal, and the problem caused by the un-reacted photopolymerizable monomer or oligomer that remains in the liquid crystal layer 3 may be prevented.

Unlike the above exemplary embodiment, a mixture of the protrusions and the cutouts may be used as a means for forming a horizontal direction electric field component. For example, a case of when the cutout is formed on the pixel electrode and the organic layer protrusion is disposed on the common electrode, and the opposite case, are possible. In addition, the cutout or the protrusion may be formed on both substrates or may not be present on either substrate.

The present invention may be applied to other mode liquid crystal displays such as TN, IPS, OCB, and the like in addition to the VA liquid crystal display as an alignment method of the liquid crystal.

In the above-described exemplary embodiments, one of the lower alignment layer and the upper alignment layer may be omitted.

Figure 25:
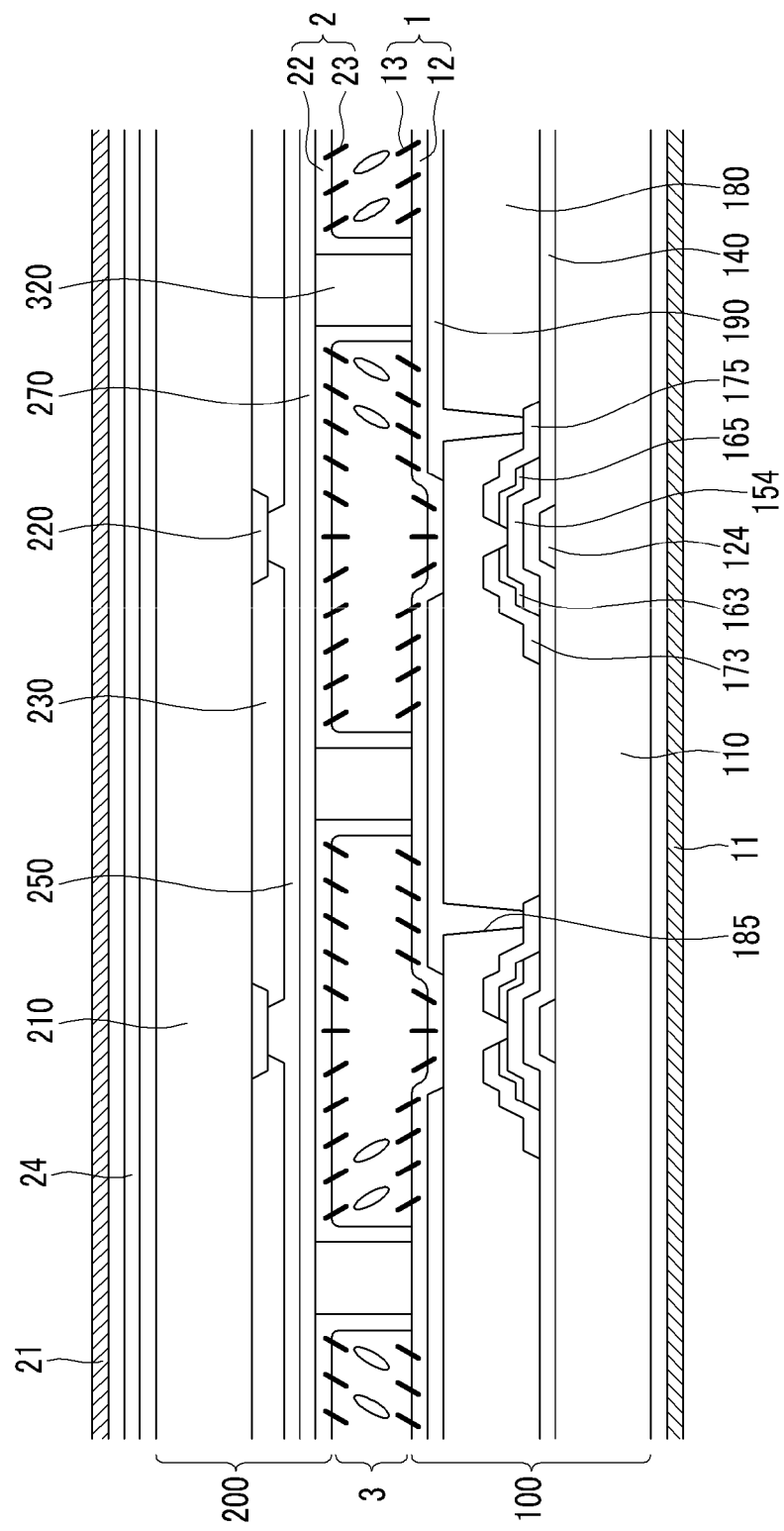
FIG. 25 is a cross-sectional view of a liquid crystal display according to another exemplary embodiment of the present invention.

FIG. 25 is a cross-sectional view of a liquid crystal display according to another exemplary embodiment of the present invention.

A liquid crystal display of FIG. 25 includes an organic material protrusion 320 formed on the pixel electrode 190 on behalf of the cutout 191 of the pixel electrode 190, compared with the liquid crystal display of FIG. 2. The organic material protrusion 320 forms a horizontal component of the electric field with respect to the surface of the substrates 110 and 210 to replace the cutout 191 when the voltage is applied between the pixel electrode 190 and the common electrode 270. Also, the organic material protrusion 320 functions as a spacer maintaining the interval between the thin film transistor array panel 100 and the common electrode panel 200. The lower alignment layer 1 and the upper alignment layer 2 have the alignment base layers 12 and 22 and the alignment regulators 13 and 23, and the alignment regulators 13 and 23 have the pre-tilt inclined in the predetermined direction, similar to the liquid crystal display of FIG. 2.

The arrangement of the organic material protrusion 320 may be the same as the arrangement of the polygon cutouts 195 and 197 of FIG. 9 or FIG. 12. Also, as shown in FIG. 9, the linear cutouts 191 dividing the pixel electrode 190 into a plurality of subregions (three subregions in the drawing), and the organic material protrusion disposed in each subregion may be disposed together.

Like the liquid crystal display of FIG. 2, this liquid crystal display has a high response speed, it is easy to control the pre-tilt of the liquid crystal, and the problem caused by the un-reacted photopolymerizable monomer or oligomer that remains in the liquid crystal layer 3 may be prevented.

Figure 26:
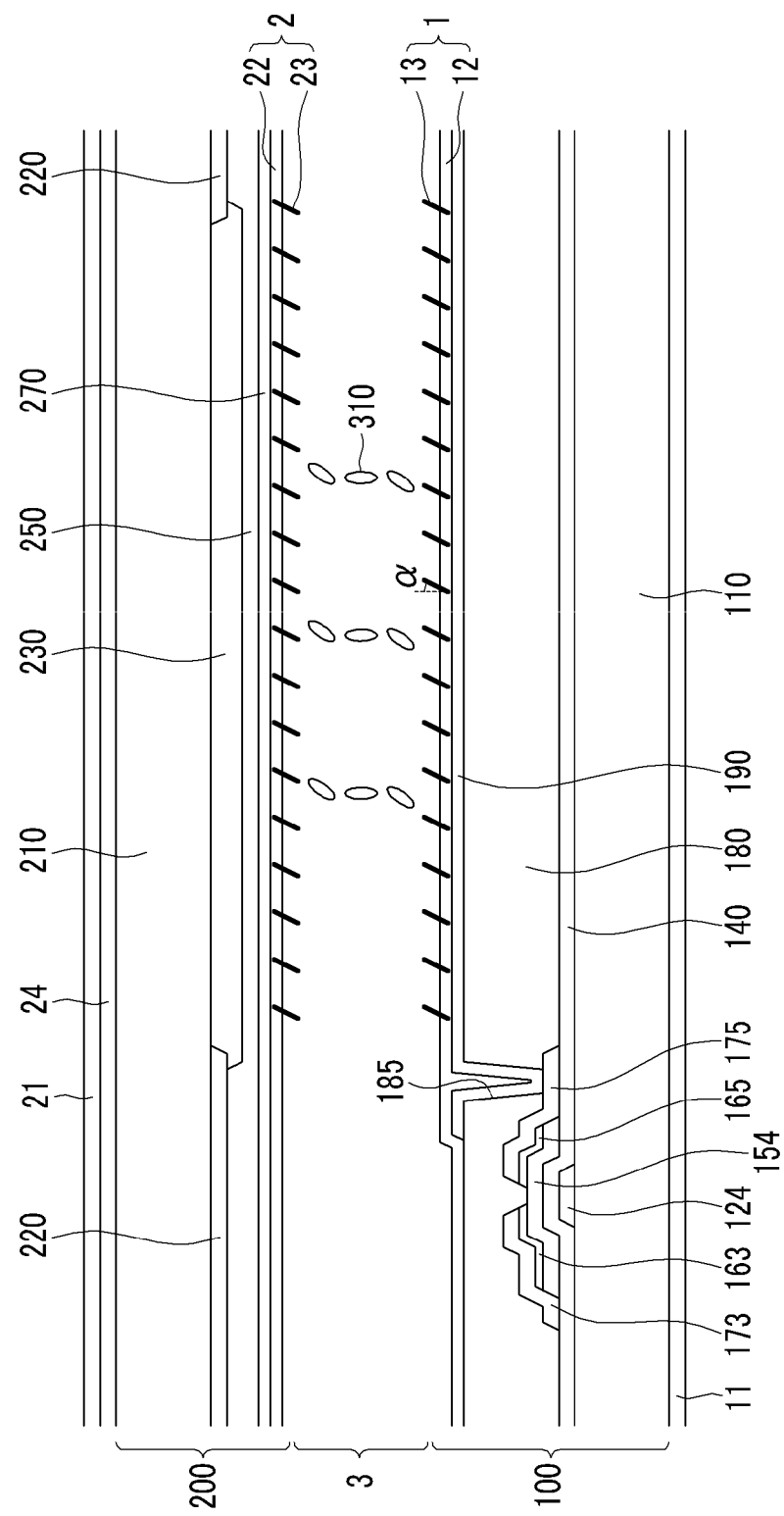
FIG. 26 is a cross-sectional view of a liquid crystal display according to another exemplary embodiment of the present invention.

FIG. 26 is a cross-sectional view of a liquid crystal display according to an exemplary embodiment of the present invention.

A liquid crystal display according to an exemplary embodiment of the present invention as a VA mode liquid crystal display includes a thin film transistor array panel 100, a common electrode panel 200, a liquid crystal layer 3, a lower polarizer 11, an upper polarizer 21, and a compensation film 24.

The thin film transistor array panel 100 includes an insulation substrate 110 and thin films formed thereon, and the common electrode panel 200 includes an insulation substrate 210 and thin films formed thereon.

Firstly, the thin film transistor array panel 100 will be described.

A gate electrode 124 is formed on the insulation substrate 110 that is made of transparent glass and the like. The gate electrode 124 receives a scanning signal through a gate line (not shown).

A gate insulating layer 140 is formed on the gate electrode 124, an intrinsic semiconductor 154 that is made of amorphous silicon and the like is formed on the gate insulating layer 140, and ohmic contacts 163 and 165 that are made of materials such as n+ hydrogenated amorphous silicon in which a silicide or an n-type impurity is doped at a high concentration are formed on the intrinsic semiconductor 154. For convenience, the intrinsic semiconductor 154 and the ohmic contacts 163 and 165 may be called semiconductors, and the term "semiconductor" may mean a polysilicon semiconductor, an oxide semiconductor, or the like in addition to the set of the intrinsic semiconductor and the ohmic contact layer.

A plurality of source electrodes 173 and drain electrodes 175 are formed on the ohmic contacts 163 and 165. The source electrode 173 receives the image signal voltage from a data line (not shown). The drain electrode 175 faces the source electrode 173 on the gate electrode 124. A channel unit of the intrinsic semiconductor 154 between the source electrode 173 and the drain electrode 175 is exposed.

The gate electrode 124, the source electrode 173, and the drain electrode 175 form a thin film transistor (TFT) in conjunction with the intrinsic semiconductor 154, and a channel of the thin film transistor is formed on the channel unit of the intrinsic semiconductor 154 between the source electrode 173 and the drain electrode 175.

A passivation layer 180 that has a contact hole 185 is formed on the channel unit of the gate insulating layer 140, the source electrode 173, the drain electrode 175, and the channel of the intrinsic semiconductor 154. The passivation layer 180 may be made of an inorganic insulating material such as silicon nitride or silicon oxide, or an organic insulating material such as a resin.

Pixel electrodes 190 are formed on the passivation layer 180. The pixel electrodes 190 are connected to the drain electrodes 175 through the contact holes 185, and may be formed of a transparent conductive layer such as ITO (indium tin oxide) or IZO (indium zinc oxide). The pixel electrodes 190 receive a data voltage from the drain electrodes 175.

The pixel electrode 190 does not have an additional cutout, and forms the continuous surface in the pixel area.

A lower alignment layer 1 is formed on the pixel electrode 190. The lower alignment layer 1 includes an alignment base layer 12, an alignment regulator 13 and a polymerization initiator. The alignment base layer 12 may include at least one of materials such as the liquid crystal vertical alignment layer such as a poly-amic acid, a poly-imide, lecithin, and the like. Accordingly, the liquid crystal is basically aligned perpendicular to the substrate by the alignment base layer 12. The alignment regulator 13 is extended from the inside of the alignment base layer 12, and is formed by photopolymerizing the photopolymerizable monomer or oligomer.

As the photopolymerizable monomer or oligomer, there are a reactive mesogen (RM) NOA series manufactured by Norland, Co., Ltd., and the like.

It is not absolutely necessary to add the polymerization initiator, however the polymerization may be speedily executed by adding the polymerization initiator. The alignment regulator 13 of the lower alignment layer 1 has the pre-tilt angle with respect to the direction perpendicular to the horizontal surface of the insulation substrate 110. The lower alignment layer 1 is divided into a plurality of domains according to the pre-tilt direction (azimuth angle) of the alignment regulator 13, and the domain has an arbitrary shape, thereby being irregular.

Next, the common electrode panel 200 will be described.

A light blocking member 220 is formed on the insulation substrate 210 that is made of transparent glass and the like, and a color filter 230 is formed on each region that is defined by the light blocking member 220. An overcoat 250 is formed on the color filter 230, and the common electrode 270 is formed on the overcoat 250.

The common electrode 270 without a cutout forms a continuous surface.

The overcoat 250 may be omitted, and the color filter 230 and the light blocking member 220 may be formed on the thin film transistor array panel 100.

An upper alignment layer 2 is formed on the common electrode 270. The upper alignment layer 2 includes an alignment base layer 22 and an alignment regulator 23. The alignment base layer 22 may include at least one of materials that are the liquid crystal vertical alignment layer such as a poly-amic acid, a poly-imide, lecithin, and the like. Accordingly, the liquid crystal is basically aligned in the direction perpendicular to the substrate by the alignment base layer 22.

The alignment regulator 23 is extended from the inside of the alignment base layer 22, and is formed by photopolymerizing the photopolymerizable monomer or oligomer.

As the photopolymerizable monomer or oligomer, as described above, there are a reactive mesogen (RM), NOA series manufactured by Norland, Co., Ltd., and the like.

The alignment regulator 23 of the upper alignment layer 2 has the pre-tilt inclined in the same direction as the alignment regulator 13 of the lower alignment layer 1.

The liquid crystal layer 3 includes the liquid crystal that has negative dielectric anisotropy and is perpendicularly arranged by alignment force of the alignment base layers 12 and 22 with respect to the substrates 110 and 210, and the liquid crystal that is adjacent to the lower alignment layer 1 and the upper alignment layer 2 has a pre-tilt by effect of the alignment regulators 13 and 23 of the lower alignment layer 1 and the upper alignment layer 2.

When injecting the liquid crystal by adding the photopolymerizable monomer or oligomer, the alignment regulator by which the lower alignment layer 1 and the upper alignment layer 2 are separated may exist in the liquid crystal layer 3, and the photopolymerizable monomer or oligomer that is not photopolymerized may remain.

As described above, if the liquid crystal has the pre-tilt, since the liquid crystal of all regions is immediately sloped according to pre-tilt when the electric field is applied, the response speed is very fast. Accordingly, a residual image problem of the motion picture may be solved. This will be described with reference to Table 2.

TABLE 4

|  | Normal VA (without cutout) | Embodiment of the present invention (without cutout but with alignment regulators) |
|---|---|---|
| Rising Time [ms] at 7 V | 3482.5 | 3.2 |
| Falling Time [ms] at 7 V | 31.4 | 7.4 |
| Response time [ms] | 3513.9 | 10.6 |

According to table 4, a liquid crystal display according to the present invention having alignment regulators has a shorter response time which is a sum of the rising time and falling time than a normal VA liquid crystal display.

Figure 27:
FIG. 27 is a view sequentially showing a plane photo of liquid crystal molecules that are finally aligned by turning on a driving voltage, and a plane photo of liquid crystal molecules that are finally aligned by again turning on a driving voltage after turning off the driving voltage in a liquid crystal display according to an exemplary embodiment of the present invention.
Figure 28:
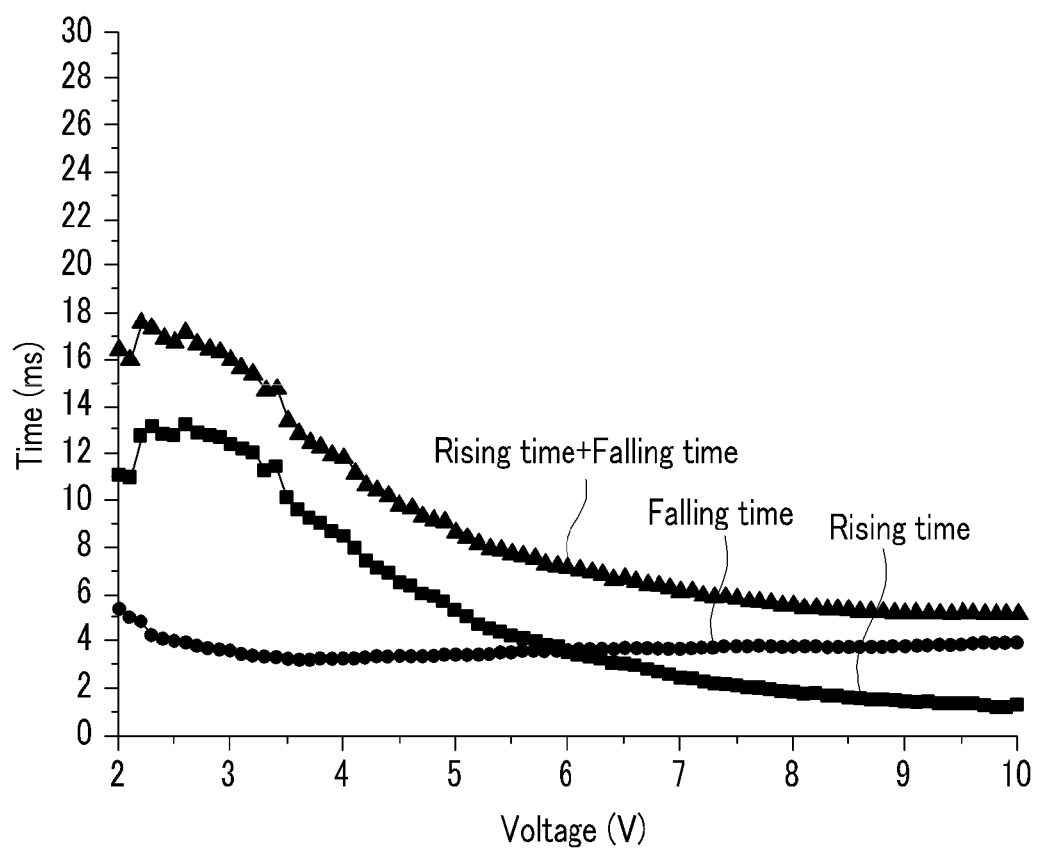
FIG. 28 is a view showing a response time for a driving voltage in a liquid crystal display according to an exemplary embodiment of the present invention.

FIG. 27 is a view sequentially showing a plane photo of liquid crystal molecules that are finally aligned by turning on a driving voltage, and a plane photo of liquid crystal molecules that are finally aligned by again turning on a driving voltage after turning off the driving voltage in a liquid crystal display according to an exemplary embodiment of the present invention, and FIG. 28 is a view showing response time for a driving voltage in a liquid crystal display according to an exemplary embodiment of the present invention.

As shown in FIG. 27, in the state S1 in which the liquid crystal molecules are finally aligned by turning on the driving voltage, the shape of the region (the brightness region of FIG. 2) divided according the arrangement of the liquid crystal is irregular. This is because the liquid crystals are arranged by applying the driving voltage to two electrodes 190 and 270 in the state in which the pixel electrode 190 and the common electrode 270 do not have the means for controlling the inclination direction of the liquid crystal such that the liquid crystal is inclined in the arbitrary directions. Also, the state S1 in which the liquid crystal molecules are finally aligned by initially turning on the driving voltage is the same as the state S2 in which liquid crystal molecules are finally aligned by again turning on the driving voltage after turning off the driving voltage. That is, the shape of the region (the brightness region of FIG. 2) divided according the arrangement of the liquid crystal when turning on the driving voltage is always the same. This because the alignment regulators 13 and 23 are formed in the state such that the liquid crystal are arranged in the arbitrary directions by applying the driving voltage between the pixel electrode 190 and the common electrode 270 such that the inclination directions of the liquid crystal that is inclined in the arbitrary directions are fixed as the pre-tilt of the alignment regulators 13 and 23, as is. As above-described, the final alignment state of the liquid crystal molecules is uniform every time the driving voltage is applied such that it is easy for the liquid crystal molecules to directly return to the previous final arrangement state when the voltage is applied, as shown in FIG. 28, and thereby the response speed of the liquid crystal is improved.

When applying a driving voltage of 8V, the conventional liquid crystal display including the general vertical alignment layer has a response time of more than 10 ms, however, the response time of the liquid crystal display according to an exemplary embodiment of the present invention including the alignment regulator having the pre-tilt as shown in FIG. 28 is about 5.6 ms such that it may be confirmed that the response speed is improved.

Also, when applying a driving voltage of 10V, the contrast ratio of the liquid crystal display having the general vertical alignment layer is 409:1, however, that of the liquid crystal display according to an exemplary embodiment of the present invention including the alignment regulator having the pre-tilt is 494:1, and thereby the viewing angle is improved.

Also, it is not necessary to form the domain division means such as cutouts in the pixel electrode 190 and the common electrode 270, or to execute the mechanical rubbing to improve the response speed, such that the process is simplified and the manufacturing cost is reduced.

As above-described, the lower alignment layer 1 and the upper alignment layer 2 include the alignment base layers 12 and 22 and the alignment regulators 13 and 23, however it is possible for only one of the lower alignment layer 1 and the upper alignment layer 2 to include the alignment base layer and the alignment regulator, and for the remaining one to only made of the alignment base layer.

The lower polarizer 11 and the upper polarizer 21 may be disposed to enable transmissive axes thereof to cross each other.

A lower ¼ wavelength phase retardation film 14 may be formed between the lower polarizer 11 and the substrate 110, and an upper ¼ wavelength phase retardation film 24 may be formed between the upper polarizer 21 and the substrate 210.

It is preferable that the phase retardation axis of the lower ¼ wavelength phase retardation film 14 forms the inclination angle of 45 degrees along with the transmissive axis of the lower polarizer 11, and the phase retardation axis of the upper ¼ wavelength phase retardation film 24 forms the inclination angle of −45 degrees along with the transmissive axis of the lower polarizer 11.

It is preferable that the phase retardation axis of the lower ¼ wavelength phase retardation film 14 forms the inclination angle of 45 degrees along with the transmissive axis of the upper polarizer 21, and the phase retardation axis of the upper ¼ wavelength phase retardation film 24 forms the inclination angle of −45 degrees along with the transmissive axis of the upper polarizer 21.

Figure 29A:
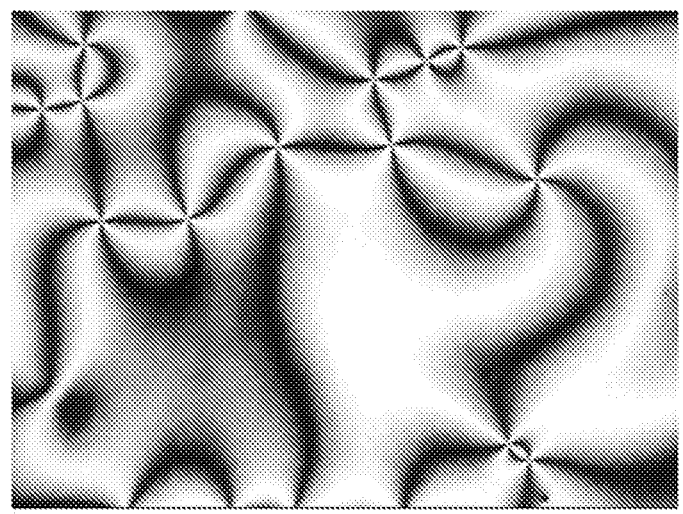
FIG. 29A is a plane photo of liquid crystal molecules that is finally aligned without a phase retardation film of a ¼ wavelength, and FIG. 29B a plane photo of liquid crystal molecules that are finally aligned with a phase retardation film of a ¼ wavelength.
Figure 29B:

FIG. 29A is a plane photo of liquid crystal molecules that are finally aligned without a lower and upper ¼ wavelength phase retardation films, and FIG. 29B a plane photo of liquid crystal molecules that are finally aligned with lower and upper ¼ wavelength phase retardation films.

In an exemplary embodiment of the present invention, the additional domain division means is not formed such that the liquid crystal molecules are aligned in all directions when applying the voltage. Here, the black always appears in the region where the liquid crystal molecules are aligned in the direction parallel or perpendicular to the transmissive axis of the upper polarizer 21 or the lower polarizer 11, regardless of the application of the driving voltage. Accordingly, as shown in FIG. 29A, the portion where the black is always shown is generated, thereby effecting the entire luminance. This is because the light of the linear polarization is incident in the direction of the long and short axis of the liquid crystal molecule such that the light passing through the liquid crystal molecule that is aligned in the direction parallel or perpendicular to the transmissive axis of the upper polarizer 21 or the lower polarizer 11 is blocked.

To prevent this problem, in an exemplary embodiment of the present invention, the lower ¼ wavelength phase retardation film 14 is formed between the lower polarizer 11 and the substrate 110, and the upper ¼ wavelength phase retardation film 24 is formed between the upper polarizer 21 and the substrate 210. In this case, the light of the circular polarization is incident to the liquid crystal molecules such that the entire luminance is improved.

For example, when the inclination angle of the transmissive axis of the lower polarizer 11 is 0 degrees and the inclination angle of the transmissive axis of the upper polarizer 21 is 90 degrees, the phase retardation axis of the lower ¼ wavelength phase retardation film 14 forms the inclination angle of 45 degrees along with the transmissive axis of the lower polarizer 11, the phase retardation axis of the upper ¼ wavelength phase retardation film 24 forms the inclination angle of −45 degrees along with the transmissive axis of the lower polarizer 11, the liquid crystal molecules are aligned horizontally, the long axes of the liquid crystal molecules are parallel to the transmissive axis of the lower polarizer 11, the linear polarization of the direction of 0 degrees passing through the lower polarizer 11 becomes the levorotation circular polarization after passing through the lower ¼ wavelength phase retardation film 14, and the levorotation circular polarization becomes the dextrorotation circular polarization after passing through the liquid crystal molecules. In additional, the dextrorotation circular polarization is changed into the linear polarization of the direction of 90 degrees after passing through the upper ¼ wavelength phase retardation film 24, and the linear polarization is passed through the upper polarizer 21 having the transmissive axis of the direction of 90 degrees, thereby being formed of the white state. Accordingly, as shown in FIG. 29B, the luminance of the portion that is shown as the black in FIG. 29A is increased.

Also, when the liquid crystal molecule is horizontally aligned, the long axis of the liquid crystal molecule forms the inclination angle of 45 degrees along with the transmissive axis of the lower polarizer 11, the linear polarization of the direction of 0 degrees passing through the lower polarizer 11 is changed into the levorotation circular polarization after passing through the lower ¼ wavelength phase retardation film 14, and the levorotation circular polarization is changed into the dextrorotation circular polarization while passing through the liquid crystal molecules. In additional, the dextrorotation circular polarization is changed into the linear polarization of the direction of 90 degrees while passing through the upper ¼ wavelength phase retardation film 24, and the linear polarization is passed through the upper polarizer 21 having the transmissive axis of the direction of 90 degrees, thereby being formed of the white state. Accordingly, as shown in FIG. 29B, the luminance of the portion that is shown as the black in FIG. 29A is increased. Accordingly, the entire luminance is improved.

A method for manufacturing a liquid crystal display according to an exemplary embodiment of the present invention will be described with reference to FIG. 30 and FIG. 31.

Figure 30:
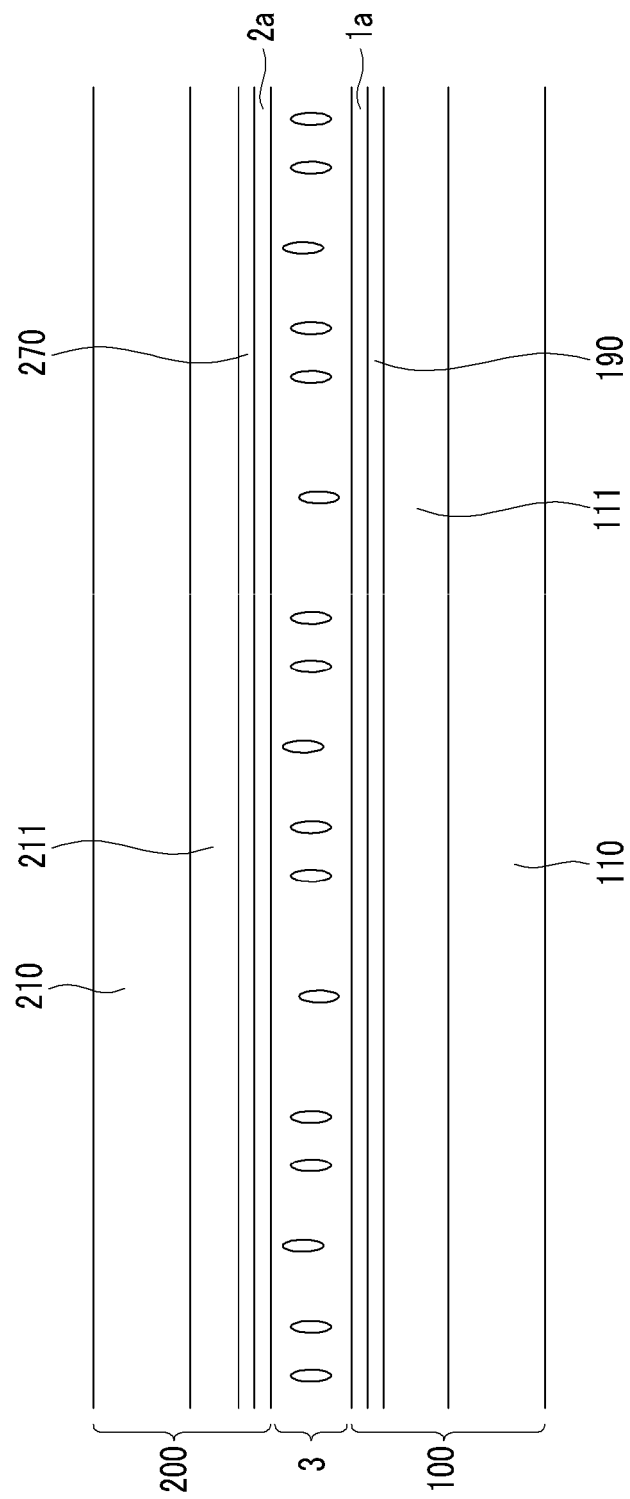
FIG. 30 is a cross-sectional view showing a step for firstly aligning a liquid crystal according to an exemplary embodiment of the present invention.
Figure 31:
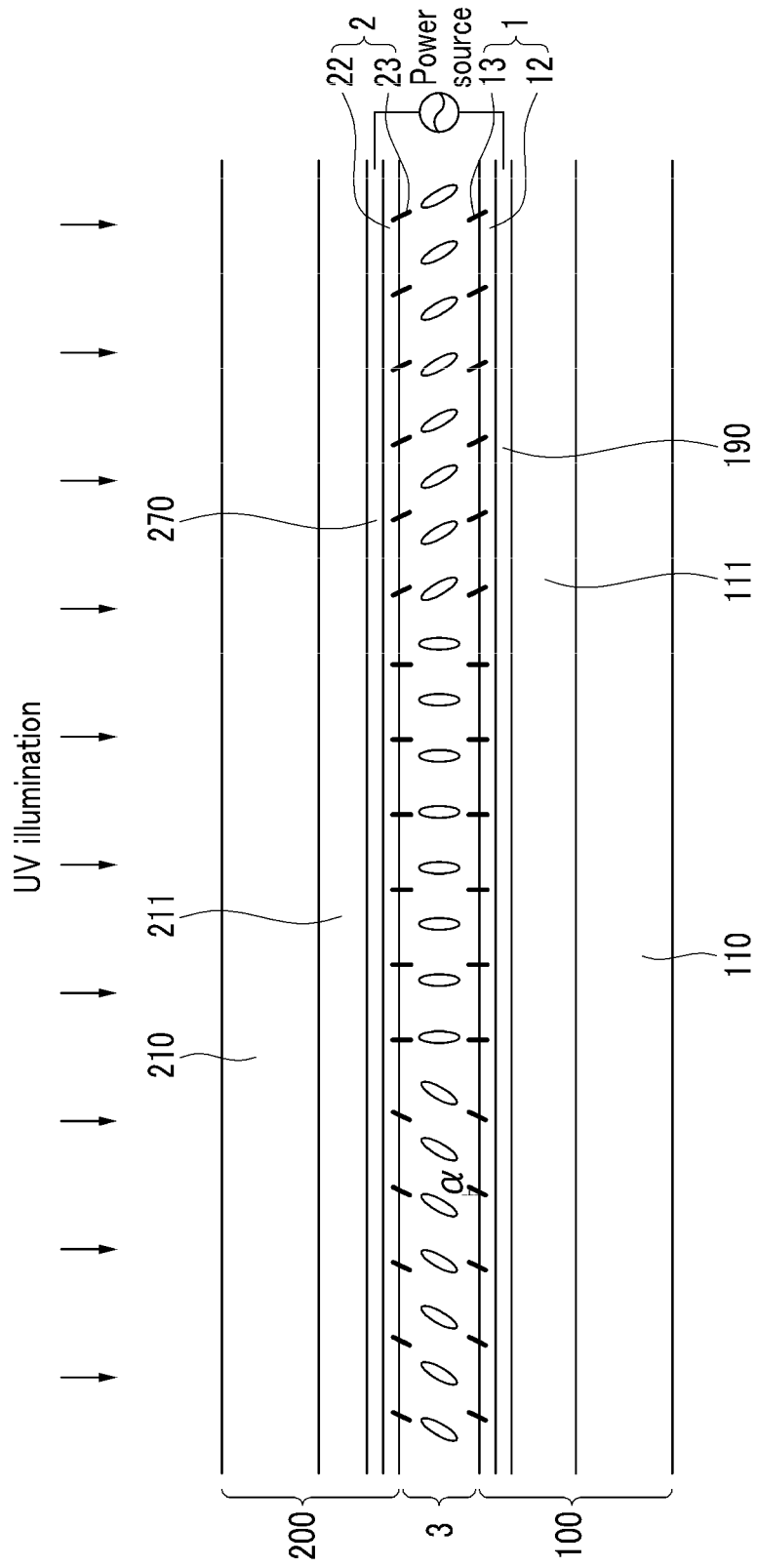
FIG. 31 is a cross-sectional view showing a step for secondly aligning a liquid crystal according to an exemplary embodiment of the present invention.

FIG. 30 is a cross-sectional view showing a step for firstly aligning a liquid crystal according to an exemplary embodiment of the present invention, and FIG. 31 is a cross-sectional view showing a step for secondly aligning a liquid crystal according to an exemplary embodiment of the present invention. In FIGS. 30 and 31, thin film layers that are formed on the thin film transistor array panel 100 and the common electrode panel 200 are schematically illustrated with reference numerals 111 and 211.

First, as shown in FIG. 30, the thin film layer 111 that includes various wiring and thin film transistors is formed on the insulation substrate 110 by using a thin film deposition method, a photolithography method, a photo-etching method, and the like, and the pixel electrodes 190 are formed on the thin film layer 111. The pixel electrodes 190 are formed of a pattern that has a continuous surface in one pixel area, and are separated from each other in a neighboring pixel area through the photolithography method and the photo-etching method.

In addition, the thin film layer 211 that includes light blocking members and color filters is formed on the insulation substrate 210 by using a thin film deposition method, a photolithography method, a photo-etching method, or the like, and the common electrode 270 is formed on the thin film layer 211. The common electrode 270 is formed by only using a thin film deposition method such as sputtering without an additional patterning process such that the continuous surface without the cutout is formed.

Next, the alignment base material and the monomer or oligomer that is different from the alignment base material are mixed with each other and coated on the pixel electrodes 190 of the thin film transistor array panel 100, and are subjected to heat treatment (curing) at a temperature in the range of 100 to 180° C. for 0.5 to 1 hour to cure the alignment base material, thereby forming a lower alignment layer 1a that includes the monomer or oligomer. In addition, the alignment base material and the monomer or oligomer that is different from the alignment base material are mixed with each other and coated on the common electrode 270 of the common electrode panel 200, and are subjected to heat treatment (curing) at a temperature in the range of 100 to 180° C. for 0.5 to 1 hour to cure the alignment base material, thereby forming an upper alignment layer 2a that includes the monomer or oligomer. Here, the monomer or oligomer of the lower alignment layer 1a and the upper alignment layer 2a may be a thermal polymerizable material that is polymerized at a different temperature from the photopolymerizable material or alignment base material.

The alignment base material may be the liquid crystal vertical alignment layer such as a poly-amic acid, a polyimide, lecithin, and the like, and the liquid crystal is basically aligned in the direction perpendicular to the substrate by the lower alignment layer 1a and the upper alignment layer 2a including the photopolymerizable monomer or oligomer through the alignment base material.

As the photopolymerizable monomer or oligomer, there are a reactive mesogen (RM) NOA series manufactured by Norland, Co., Ltd., and the like.

Next, the thin film transistor array panel 100 and the common electrode panel 200 are assembled.

The assembling of these panels 100 and 200 may be performed by using either of two methods.

As a first method, a sealant is coated on either of the thin film transistor array panel 100 and the common electrode panel 200 to define a region on which the liquid crystal is filled, the liquid crystal is dripped on the defined region, and the thin film transistor array panel 100 and common electrode panel 200 are arranged and bonded. At this time, a spacer for maintaining an interval between the two substrates 100 and 200 may be dispersed before or after the coating of the liquid crystal. The spacer may be previously formed on the thin film transistor array panel 100 and the common electrode panel 200 through a forming process of the thin film. Here, the liquid crystal may be dripped after adding the photopolymerizable monomer or oligomer thereto.

As a second method, the sealant is coated on either one of the thin film transistor array panel 100 and the common electrode panel 200 to define the region at which the liquid crystal is filled and having a liquid crystal injection hole, and the two substrates 100 and 200 are arranged and bonded. Next, there is a method in which, in a vacuum state, the liquid crystal injection hole is dipped in a liquid crystal storage bath, the vacuum is eliminated to inject the liquid crystal, and the liquid crystal injection hole is sealed. Here, the liquid crystal may be dripped by adding the photopolymerizable monomer or oligomer.

As above-described, the liquid crystal is introduced between the thin film transistor array panel 100 and the common electrode panel 200 such that the liquid crystal is contacted with the alignment layer including the photopolymerizable monomer or oligomer, thereby firstly aligning the liquid crystal. The alignment base material is the vertical alignment layer such that the liquid crystal is aligned for the long axis thereof to be perpendicular to the substrate.

Next, as shown in FIG. 31, the liquid crystal is rearranged by applying the electric field between the pixel electrode 190 and the common electrode 270. The applying of the electric field to the liquid crystal may be performed by a method such as applying a voltage between the two electrodes that are previously formed on the substrate or by applying a voltage between the electrodes that are disposed at the outside thereof. The liquid crystal has negative dielectric anisotropy such that the liquid crystal is inclined in the direction perpendicular to the electric field.

Subsequently, in a state in which the alignment of the liquid crystal is changed through the application of the electric field, by photopolymerizing the monomer or oligomer included in the lower and upper alignment layers 1a and 2a, alignment regulators 13 and 23 that are extended from the inside of the alignment base layers 12 and 22 are formed. When the monomer or oligomer included in the lower and upper alignment layers 1a and 2a is the photopolymerizable material, the polymerization light such as ultraviolet rays is irradiated, and when the monomer or oligomer included in the lower and upper alignment layers 1a and 2a is the thermal polymerizable material, the monomer or oligomer is heated to a temperature generating the thermal polymerization. The alignment regulator is arranged according to the alignment of the liquid crystal, and even after the applied electric field is eliminated, the arrangement is maintained to affect the alignment of the liquid crystal such that the liquid crystal is secondly aligned. Therefore, the liquid crystal may be arranged by the secondary alignment so as to have a polar angle or azimuth angle that is different from that of the primary alignment. The liquid crystal has the pre-tilt by the secondary alignment of the liquid crystal such that the operation direction of the liquid crystal may be previously determined before the electric field is applied, and accordingly the response speed of the liquid crystal may be improved.

Here, by changing the intensity of the voltage that is applied between the pixel electrodes 190 and the common electrode 270, a pola angle of the pre-tilt a of the alignment regulators 13 and 23 may be controlled. That is, if a strong voltage is applied between the pixel electrodes 190 and the common electrode 270, the liquid crystal lies almost parallel to the surface of the substrates 110 and 210, and in this state, if the ultraviolet rays are irradiated thereon, the alignment regulators 13 and 23 have a large pola angle of pre-tilt. On the contrary, if a weak voltage is applied between the pixel electrodes 190 and the common electrode 270, the liquid crystal stands up almost perpendicular with respect to the surface of the substrates 110 and 210, and in this state, if the ultraviolet rays are irradiated thereon, the alignment regulators 13 and 23 have a small pola angle of pre-tilt.

As described above, if the photopolymerizable monomer or oligomer is mixed with the alignment base material to form the alignment layer and photopolymerized to form the alignment regulator, it is easy to control the pre-tilt of the alignment regulator, and a problem that may occur by leaving un-reacted photopolymerizable monomer or oligomer in the liquid crystal layer 3 may be prevented.

Also, the pre-tilt of the alignment regulator is controlled by controlling the magnitude of the voltage, thereby controlling the pre-tilt of the liquid crystal such that the pre-tilt of the liquid crystal may be more precisely controlled than with the rubbing method.

Thus far, a method in which, after the liquid crystal is filled between the thin film transistor array panel 100 and the common electrode panel 200, the voltage is applied thereto to form the alignment regulators 13 and 23 has been described. However, unlike this, the liquid crystal may be injected after the alignment regulators 13 and 23 are formed. That is, in a state in which the liquid crystal is not filled between the thin film transistor array panel 100 and the common electrode panel 200, the voltage is applied between the pixel electrodes 190 and the common electrode 270 and the ultraviolet rays are irradiated to the alignment layers 1a and 2a that include the photopolymerizable monomer or oligomer to form the alignment regulators 13 and 23. The liquid crystal is injected after the alignment regulators 13 and 23 are formed.

Next, the compensation layer 24 and the polarizers 11 and 21 are attached and the module process is performed.

As above-described, the present invention is applied to the VA mode liquid crystal display, however the present invention may be applied to a TN mode liquid crystal display.

Figure 32:
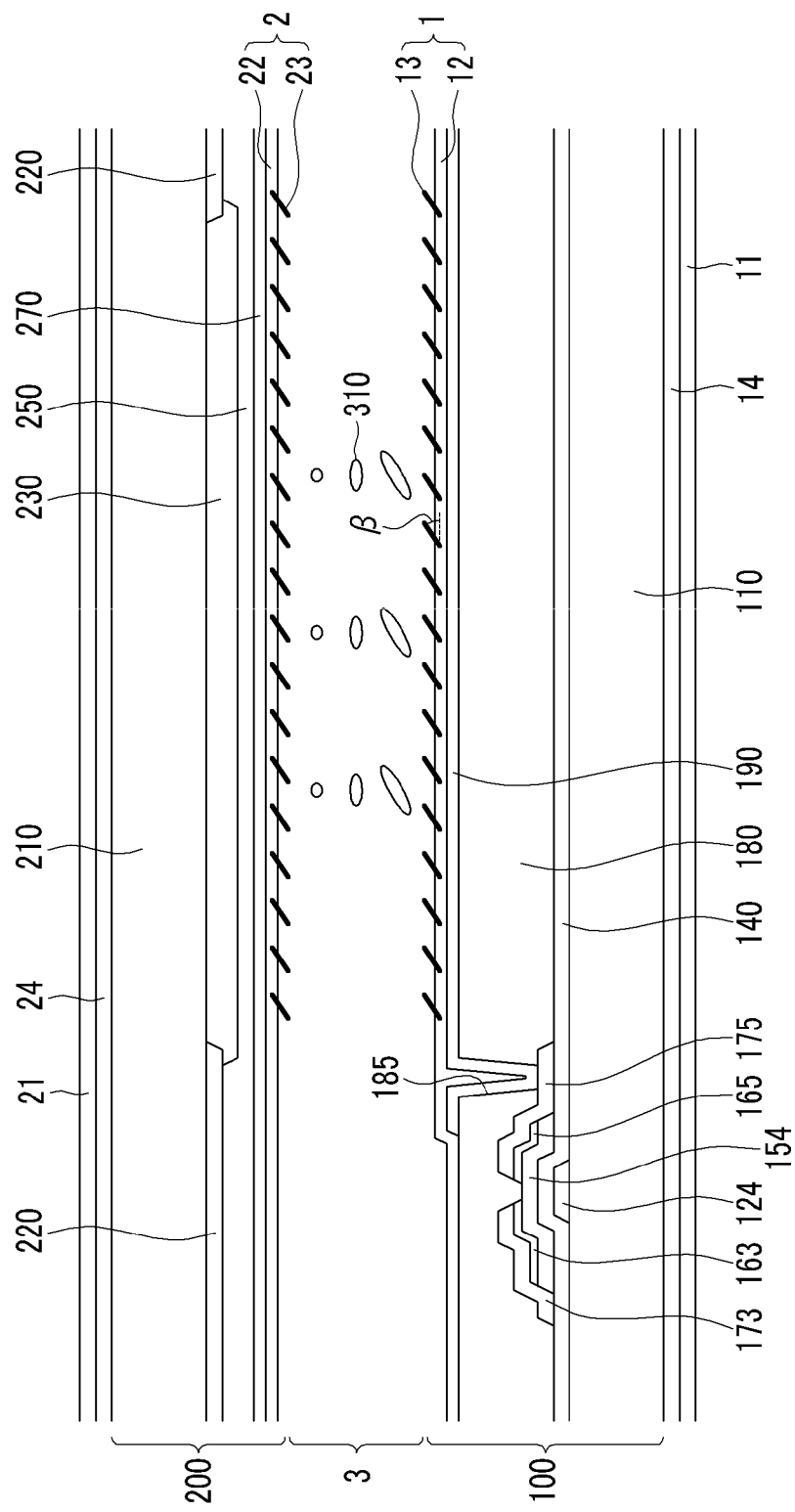
FIG. 32 is a cross-sectional view of a liquid crystal display according to another exemplary embodiment of the present invention.

FIG. 32 is a cross-sectional view of a liquid crystal display according to another exemplary embodiment of the present invention.

The liquid crystal display of FIG. 32 has almost the same structure as the liquid crystal display of FIG. 26, however the kind of the liquid crystal and the alignment base layer, and the pre-tilt of the alignment regulator, are different therefrom. This will be described for the differences.

A lower alignment layer 1 is formed on the pixel electrode 190. The lower alignment layer 1 includes an alignment base layer 12 and an alignment regulator 13. The alignment base layer 12 as the liquid crystal horizontal alignment layer is one such as poly-amic acid, poly-imide, nylon, and polyvinylalcohol that basically aligns the liquid crystal in the direction parallel to the substrate.

An upper alignment layer 2 is formed on the common electrode 270. The upper alignment layer 2 includes an alignment base layer 22 and an alignment regulator 23. The alignment base layer 22 as the liquid crystal horizontal alignment layer is one such as poly-amic acid, poly-imide, nylon, and polyvinylalcohol that basically aligns the liquid crystal in the direction parallel to the substrate.

The liquid crystal layer 3 includes the liquid crystal having the positive dielectric anisotropy, and the liquid crystal is arranged parallel to the substrate 110 and 210 by the alignment force of the alignment base layers 12 and 22. A levorotation or dextrorotation chiral dopant is added in the liquid crystal layer 3 such that the liquid crystal 310 is spirally twisted. The liquid crystal adjacent to the lower alignment layer 1 and the upper alignment layer 2 has the pre-tilt angle β by the influence of the alignment regulator 13 and 23 of the lower alignment layer 1 and the upper alignment layer 2.

As above-described, the liquid crystal near the lower alignment layer 1 and the upper alignment layer 2 has the pre-tilt by the alignment regulators 13 and 23 such that the liquid crystal of all regions is immediately sloped according to the pre-tilt when the electric field is applied, so the response speed is very fast. Accordingly, a residual image problem of the motion picture may be solved.

A method for manufacturing a liquid crystal display according to another exemplary embodiment of the present invention will be described with reference to FIG. 33 and FIG. 34.

Figure 33:
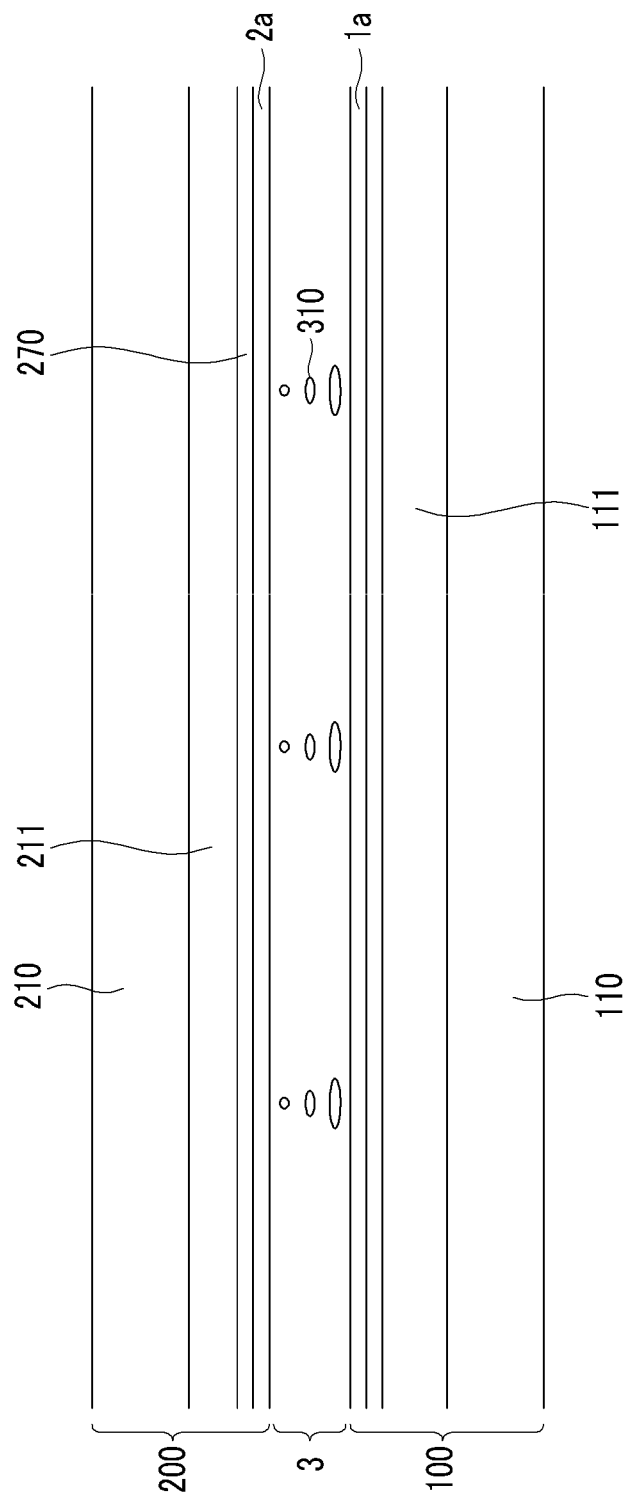
FIG. 33 is a cross-sectional view showing a step for firstly aligning a liquid crystal according to another exemplary embodiment of the present invention.
Figure 34:
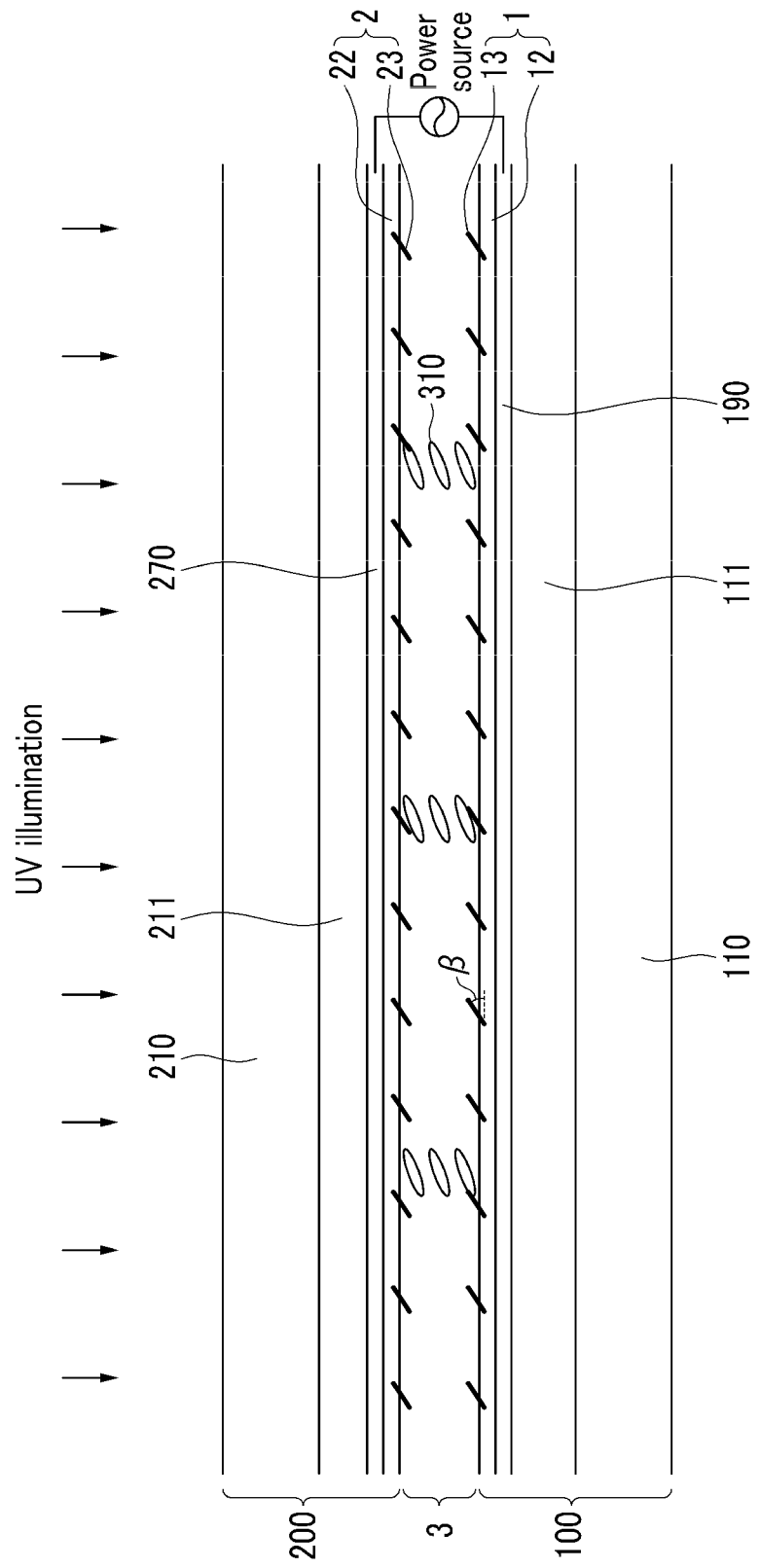
FIG. 34 is a cross-sectional view showing a step for secondly aligning a liquid crystal according to another exemplary embodiment of the present invention.

FIG. 33 is a cross-sectional view showing a step for firstly aligning a liquid crystal according to another exemplary embodiment of the present invention, and FIG. 34 is a cross-sectional view showing a step for secondly aligning a liquid crystal according to another exemplary embodiment of the present invention.

A manufacturing method of a liquid crystal display of FIG. 33 and FIG. 34 is the almost same as the manufacturing method of the liquid crystal display of FIG. 30 and FIG. 31, however the introduction of the horizontal alignment is distinguished. This distinction will be mainly described.

Firstly, as shown in FIG. 33, a thin film layer 111 including various wirings and thin film transistors, and pixel electrodes 190, are formed in the thin film transistor array panel 110, and the pixel electrodes 190 are formed with a pattern that does not include a cutout in one pixel area and are separated from each other on the neighboring pixel area by using a photolithography process and the etching process.

Also, the thin film layer 211 that includes the light blocking member and the color filter is formed in the common electrode panel 210, and the common electrode 270 is formed by only using a thin film deposition method such as sputtering without an additional patterning process such that the continuous surface without the cutout is formed.

Next, a lower alignment layer 1a including a monomer or oligomer is formed on the pixel electrode 190 of the thin film transistor array panel 100, and an upper alignment layer 2a including a monomer or oligomer is formed on the common electrode 270 of the common electrode panel 200.

Here, the alignment base material as the liquid crystal horizontal alignment layer may include a material such as poly-amic acid, poly-imide, nylon, and polyvinylalcohol, and the lower alignment layer 1a and the upper alignment layer 2a including the photopolymerizable monomer or oligomer basically aligns the liquid crystal in the direction parallel to the substrate through the alignment base material.

As the photopolymerizable monomer or oligomer, as described above, a reactive mesogen (RM), NOA series manufactured by Norland, Co., Ltd., and the like may be used.

Next, the thin film transistor array panel 100 and the common electrode panel 200 are assembled, and the liquid crystal is introduced between the thin film transistor array panel 100 and the common electrode panel 200 such that the liquid crystal is contacted with the alignment layer including the photopolymerizable monomer or oligomer, thereby firstly aligning the liquid crystal. The alignment base material is the horizontal alignment layer such that the liquid crystal is aligned for the long axis thereof to be parallel to the substrate.

A levorotation or dextrorotation chiral dopant is added in the liquid crystal layer 3 such that the entire liquid crystal 310 of the liquid crystal layer is spirally twisted.

Next, as shown in FIG. 34, the liquid crystal is rearranged by applying the electric field between the pixel electrode 190 and the common electrode 270, and the liquid crystal has the positive dielectric anisotropy such that the liquid crystal is inclined in the direction parallel to the electric field.

Subsequently, in a state in which the alignment of the liquid crystal is changed through the application of the electric field, by photopolymerizing the monomer or oligomer included in the alignment layer to form alignment regulators 13 and 23 that are extended from the inside of the alignment base layers 12 and 22 are formed. The alignment regulator is arranged according to the alignment of the liquid crystal, and even after the applied electric field is eliminated, the arrangement is maintained to affect the alignment of the liquid crystal such that the liquid crystal is secondly aligned. The liquid crystal has the pre-tilt by the second alignment of the liquid crystal such that the operation direction of the liquid crystal may be previously determined when the electric field is applied, and accordingly the response speed of the liquid crystal may be improved.

Here, by changing the intensity of the voltage that is applied between the pixel electrodes 190 and the common electrode 270, a pola angle of the pre-tilt β of the alignment regulators 13 and 23 may be controlled. As above-described, if the photopolymerizable monomer or oligomer is mixed with the alignment base material to form the alignment layer and photopolymerized to form the alignment regulator, it is easy to control the pre-tilt of the alignment regulator, and a problem that may occur by leaving un-reacted photopolymerizable monomer or oligomer in the liquid crystal layer 3 may be prevented.

Also, the pre-tilt of the alignment regulator is controlled by controlling the magnitude of the voltage thereby controlling the pre-tilt of the liquid crystal such that the pre-tilt of the liquid crystal may be more precisely controlled than the rubbing method.

Figure 35:
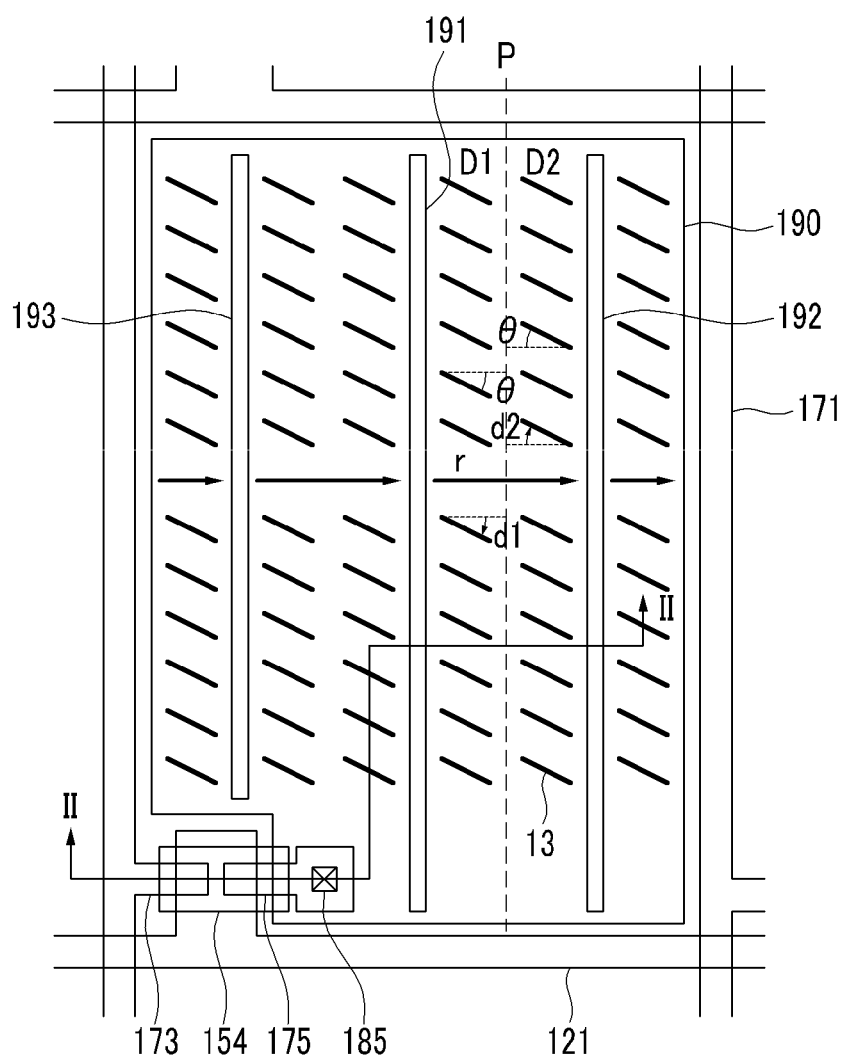
FIG. 35 is a layout view of a thin film transistor array panel of a liquid crystal display according to an exemplary embodiment of the present invention.
Figure 36:
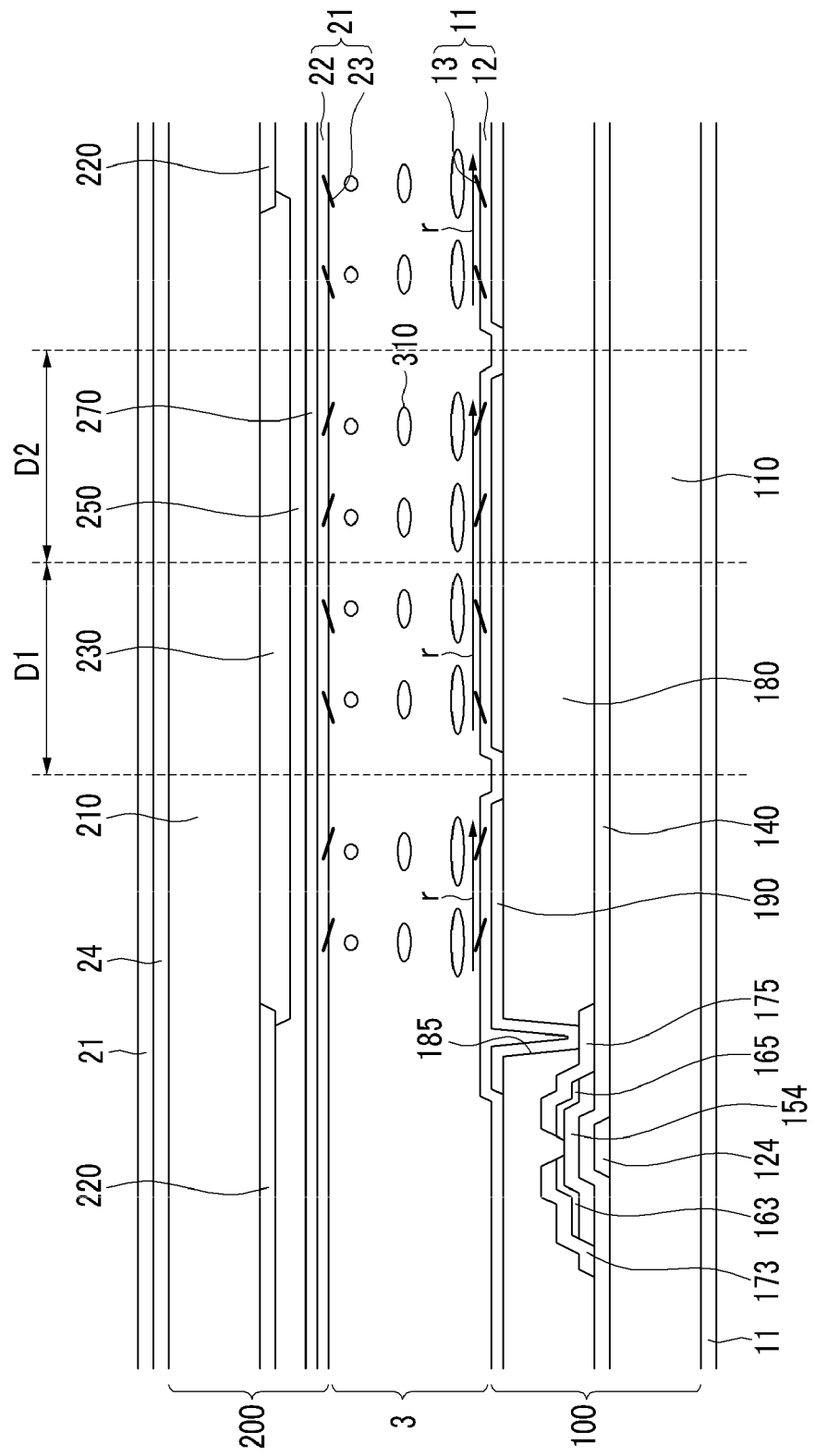
FIG. 36 is a cross-sectional view taken along the line II-II of FIG. 35.

FIG. 35 is a layout view of a thin film transistor array panel of a liquid crystal display according to an exemplary embodiment of the present invention, and FIG. 36 is a cross-sectional view taken along the line II-II of FIG. 35.

A liquid crystal display according to an exemplary embodiment of the present invention as a TN mode liquid crystal display includes a thin film transistor array panel 100, a common electrode panel 200, a liquid crystal layer 3, a lower polarizer 11, an upper polarizer 21, and a compensation film 24.

The thin film transistor array panel 100 includes an insulation substrate 110 and thin films formed thereon, and the common electrode panel 200 includes an insulation substrate 210 and thin films formed thereon.

Firstly, the thin film transistor array panel 100 will be described.

A gate electrode 124 is formed on the insulation substrate 110 that is made of transparent glass and the like. The gate electrode 124 receives a scanning signal through a gate line 121.

A gate insulating layer 140 is formed on the gate electrode 124, an intrinsic semiconductor 154 that is made of amorphous silicon and the like is formed on the gate insulating layer 140, and ohmic contacts 163 and 165 that are made of materials such as n+ hydrogenated amorphous silicon in which a silicide or an n-type impurity is doped at a high concentration are formed on the intrinsic semiconductor 154. For convenience, the intrinsic semiconductor 154 and the ohmic contacts 163 and 165 may be called semiconductors, and the term "semiconductor" may mean a polysilicon semiconductor, an oxide semiconductor, or the like in addition to the set of the intrinsic semiconductor and the ohmic contact layer.

A plurality of source electrodes 173 and drain electrodes 175 are formed on the ohmic contacts 163 and 165. The source electrode 173 receives the image signal voltage from a data line 171. The drain electrode 175 faces the source electrode 173 on the gate electrode 124. A channel unit of the intrinsic semiconductor 154 between the source electrode 173 and the drain electrode 175 is exposed.

The gate electrode 124, the source electrode 173, and the drain electrode 175 form a thin film transistor (TFT) in conjunction with the intrinsic semiconductor 154, and a channel of the thin film transistor is formed on the channel unit of the intrinsic semiconductor 154 between the source electrode 173 and the drain electrode 175.

A passivation layer 180 that has a contact hole 185 is formed on the channel unit of the gate insulating layer 140, the source electrode 173, the drain electrode 175, and the channel of the intrinsic semiconductor 154. The passivation layer 180 may be made of an inorganic insulating material such as silicon nitride or silicon oxide, or an organic insulating material such as a resin.

Pixel electrodes 190 are formed on the passivation layer 180. The pixel electrodes 190 are connected to the drain electrodes 175 through the contact holes 185, and may be formed of a transparent conductive layer such as ITO (indium tin oxide) or IZO (indium zinc oxide). The pixel electrodes 190 receive data voltages from the drain electrodes 175.

The pixel electrode 190 includes a plurality of cutouts 191, 192, and 193 as domain division means. The cutouts 191, 192, and 193 are a plurality of slits dividing the pixel electrode 190 into a plurality of belt regions, and are extended in the longitudinal direction. The regions between the cutouts 191, 192, and 193 are classified into a first domain D1 and a second domain D2 with respect to the boundary line P.

A lower alignment layer 1 is formed on the pixel electrode 190. The lower alignment layer 1 may be rubbed in a predetermined direction to align the liquid crystal in the predetermined azimuth angle, and may be omitted. In an exemplary embodiment of the present invention, the lower alignment layer 1 is rubbed in a direction r. The lower alignment layer 1 includes an alignment base layer 12, an alignment regulator 13, and a polymerization initiator. The alignment base layer 12 may be a liquid crystal horizontal alignment layer such as poly-amic acid, a poly-imide, nylon, and PVA (polyvinyl alcohol), and the liquid crystal is basically aligned in the direction parallel to the substrate 110 by the alignment base layer 12. The alignment regulator 13 is extended from the inside of the alignment base layer 12, and is formed by photopolymerizing the photopolymerizable monomer or oligomer.

As the photopolymerizable monomer or oligomer, there are a reactive mesogen (RM) NOA series manufactured by Norland, Co., Ltd., and the like.

It is not absolutely necessary to add the polymerization initiator, however the polymerization may be speedily executed by adding the polymerization initiator.

The alignment regulator 13 of the lower alignment layer 1 is extended from the inside of the alignment base layer 12 while having the pre-tilt, and the pre-tilt includes the polar angle and the azimuth angle. Particularly, the azimuth angle of the pre-tilt is important in the TN mode, and it will be described in detail.

The amount of the azimuth angle θ of the pre-tilt of the alignment regulator disposed in the first domain D1 and the amount of the azimuth angle θ of the pre-tilt of the alignment regulator disposed in the second domain D2 are the same, and a rotating direction of the pre-tilt of the first alignment regulator disposed in the first domain D1 is opposite to a rotating direction of the pre-tilt of the first alignment regulator disposed in the second domain D2 with respect to the horizontal axis, that is, with reference to the direction parallel to the gate line 121. That is, the alignment regulator disposed in the first domain D1 is rotated in the lower direction d1 with reference to the rubbing direction r, thereby having the azimuth angle θ of the pre-tilt angle, and the alignment regulator disposed in the second domain D2 is rotated in the upper direction d2 with reference to the rubbing direction r, thereby having the azimuth angle θ of the pre-tilt angle.

Next, the common electrode panel 200 will be described.

A light blocking member 220 is formed on the insulation substrate 210 that is made of the transparent glass and the like, and a color filter 230 is formed on each region that is defined by the light blocking member 220. An overcoat 250 is formed on the color filter 230, and a common electrode 270 is formed on the overcoat 250.

The common electrode 270 does not have the cutout, and forms a continuous surface.

The overcoat 250 may be omitted, and the color filter 230 and the light blocking member 220 may be formed in the thin film transistor array panel 100.

An upper alignment layer 2 is formed on the common electrode 270. An additional rubbing process for the upper alignment layer 2 may be omitted, and it may be rubbed in the predetermined direction to align the liquid crystal in the predetermined azimuth angle direction. Here, the upper alignment layer 2 may be rubbed in the direction perpendicular to the rubbing direction r of the lower alignment layer 1.

The upper alignment layer 2 includes the alignment base layer 22 and the alignment regulator 23. The alignment base layer 22 as the liquid crystal horizontal alignment layer is one such as poly-amic acid, poly-imide, nylon, and polyvinylalcohol, and the liquid crystal is basically aligned in the direction parallel to the substrate by the alignment base layer 22. The alignment regulator 23 is extended from the inside of the alignment base layer 22, and may be formed by photopolymerizing the photopolymerizable monomer or oligomer.

As the photopolymerizable monomer or oligomer, as described above, there are a reactive mesogen (RM), NOA series manufactured by Norland, Co., Ltd., and the like.

The alignment regulator 23 of the upper alignment layer 2 is extended from the inside of the alignment base layer 22 while having the pre-tilt, and the pre-tilt includes the polar angle and the azimuth angle.

The liquid crystal layer 3 includes the liquid crystal 310 having positive dielectric anisotropy, and the liquid crystal 310 is aligned parallel to the substrates 110 and 210 by the alignment force of the alignment base layer 12 and 22 and is spirally twisted while having a predetermined pitch. The pitch means the length that the liquid crystal is rotated with respect to 360 degrees in the azimuth angle, and a levorotation or dextrorotation chiral dopant is added in the liquid crystal layer for the liquid crystal to have the pitch. In an exemplary embodiment of the present invention, the dextrorotation chiral dopant is added such that the liquid crystal is twisted to the right side. The twisted angle of the liquid crystal may be controlled by using the ratio d/p of the width d and the pitch p of the liquid crystal layer.

When injecting the liquid crystal by adding the photopolymerizable monomer or oligomer, the alignment regulator with which the lower alignment layer 1 and the upper alignment layer 2 are separated may exist in the liquid crystal layer 3, and the photopolymerizable monomer or oligomer that is not photopolymerized may remain.

The liquid crystal near the lower alignment layer 1 and the upper alignment layer 2 has the pre-tilt by the influence of the alignment regulator 13 and 23 of the lower alignment layer 1 and the upper alignment layer 2. Accordingly, the liquid crystal that forms the predetermined polar angle with the surface of the substrate and the predetermined azimuth angle with the rubbing direction, and is horizontally aligned near the lower alignment layer 1, is rotated according to the predetermined pre-tilt d1 and d2, and stands up in the direction parallel to the electric field under the application of the driving voltage. Accordingly, as well as the liquid crystal near the lower alignment layer 1, the liquid crystal disposed on all layers of the liquid crystal layer is rotated according to the predetermined pre-tilt d1 and d2 and stands up in the direction parallel to the electric field. That is, the liquid crystal disposed in the first domain D1 is rotated in the d1 direction and stands up, and the liquid crystal disposed in the second domain D2 is rotated in the d2 direction and stands up.

As above-described, the pre-tilt directions (the azimuth angle) of the liquid crystal disposed in the first domain D1 and the second domain D2 are opposite to each other by the alignment regulator such that the liquid crystal of each domain may be completely aligned in the different directions.

Accordingly, the liquid crystal is multi-aligned per the first domain D1 and the second domain D2 by the cutouts 191, 192, and 193 of the pixel electrode 190, and the alignment directions of the liquid crystal disposed on the boundary between the domains are different per the domains such that the multi-alignment may be completely realized thereby improving the viewing angle.

As above-described, the lower alignment layer 1 and the upper alignment layer 2 both include the alignment base layers 12 and 22 and the alignment regulators 13 and 23, however it is possible that one of the lower alignment layer 1 and the upper alignment layer 2 only includes the alignment base layer and the alignment regulator, and the remaining one is only made of the alignment base layer.

The lower polarizer 11 and the upper polarizer 21 may be disposed to enable transmissive axes thereof to cross each other.

The compensation film 24 may be disposed between the polarizer 21 and the substrate 210, and may be a phase retardation layer such as a ¼ wavelength delay layer or a ½ wavelength delay layer or a viewing angle compensation film. Two or more compensation layers 24 may be included, or they may be omitted.

A method for manufacturing a liquid crystal display according to an exemplary embodiment of the present invention will now be described with reference to FIG. 37 and FIG. 38.

Figure 37:
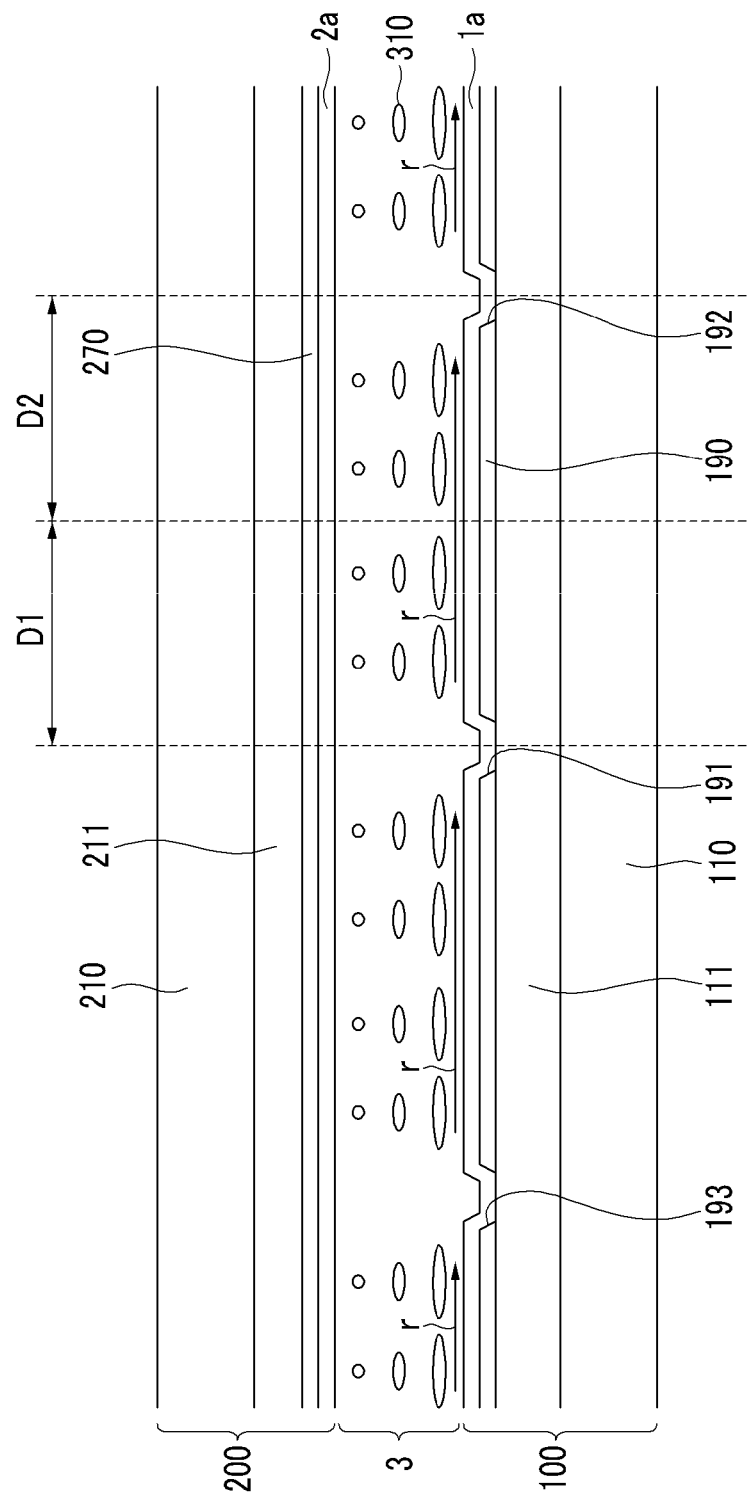
FIG. 37 is a cross-sectional view showing a step for firstly aligning a liquid crystal according to an exemplary embodiment of the present invention.
Figure 38:
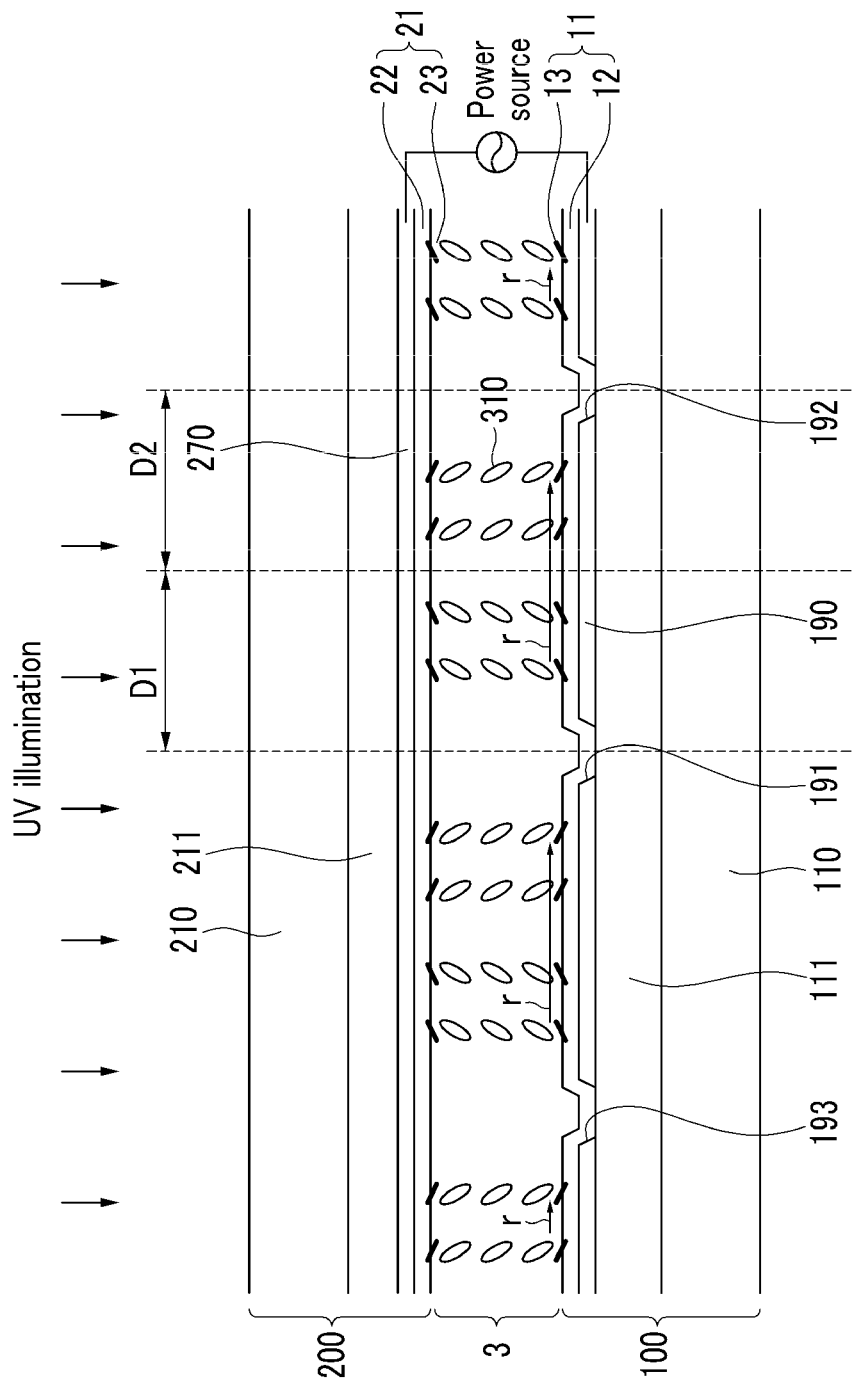
FIG. 38 is a cross-sectional view showing a step for secondly aligning a liquid crystal according to an exemplary embodiment of the present invention.

FIG. 37 is a cross-sectional view showing a step for firstly aligning a liquid crystal according to an exemplary embodiment of the present invention, and FIG. 38 is a cross-sectional view showing a step for secondly aligning a liquid crystal according to an exemplary embodiment of the present invention. In FIGS. 37 and 38, thin film layers that are formed on the thin film transistor array panel 100 and the common electrode panel 200 are schematically illustrated with reference numerals 111 and 211.

First, as shown in FIG. 37, the thin film layer 111 that includes various wiring and thin film transistors is formed on the insulation substrate 110 by using a thin film deposition method, a photolithography method, a photo-etching method, or the like, and the pixel electrodes 190 are formed on the thin film layer 111. The pixel electrode 190 is formed through the photolithography process, and a cutout pattern is inserted to the photomask pattern for the photolithography such that the cutouts 191, 192, and 193 are simultaneously formed along with the pixel electrode 190.

In addition, the thin film layer 211 that include the light blocking member and the color filter is formed on the insulation substrate 210 by using a thin film deposition method, a photolithography method, a photo-etching method, or the like, and a common electrode 270 is formed on the thin film layer 211. The common electrode 270 is formed by only using a thin film deposition method such as sputtering without an additional patterning process such that a continuous surface without a cutout is formed.

Next, the alignment base material and the monomer or oligomer that is different from the alignment base material are mixed with each other and coated on the pixel electrodes 190 of the thin film transistor array panel 100, and are subjected to heat treatment (curing) at a temperature in the range of 100 to 180° C. for 0.5 to 1 hour to cure the alignment base material, thereby forming a lower alignment layer 1*a* that includes the monomer or oligomer. In addition, the alignment base material and the monomer or oligomer that is different from the alignment base material are mixed with each other and coated on the common electrode 270 of the common electrode panel 200, and are subjected to heat treatment (curing) at a temperature in the range of 100 to 180° C. for 0.5 to 1 hour to cure the alignment base material, thereby forming an upper alignment layer 2*a* that includes the monomer or oligomer. Here, the monomer or oligomer of the lower alignment layer 1*a* and the upper alignment layer 2*a* may be a thermal polymerizable material that is polymerized at a different temperature from the photopolymerizable material or alignment base material.

A polymerization initiator for the polymerization of the monomer or oligomer may be added to the lower alignment layer 1*a* and the upper alignment layer 2*a*.

Here, the alignment base material as the liquid crystal horizontal alignment layer is one such as poly-amic acid, poly-imide, nylon, and polyvinylalcohol, and the lower alignment layer 1*a* and the upper alignment layer 2*a* including the photopolymerizable monomer or oligomer basically align the liquid crystal in the direction parallel to the substrate by the alignment base material.

As the photopolymerizable monomer or oligomer, as described above, a reactive mesogen (RM), NOA series manufactured by Norland, Co., Ltd., and the like may be used.

Next, the lower alignment layer 1*a* is rubbed in the r direction. Next, the thin film transistor array panel 100 and the common electrode panel 200 are assembled, and the liquid crystal is introduced between the thin film transistor array panel 100 and the common electrode panel 200 such that the liquid crystal is contacted with the alignment layer including the photopolymerizable monomer or oligomer, thereby firstly aligning the liquid crystal. The alignment base material is the horizontal alignment layer such that the liquid crystal is aligned for the long axis thereof to be parallel to the substrate. Here, the liquid crystal may be inserted by adding the photopolymerizable monomer or oligomer.

The dextrorotation chiral dopant is added in the liquid crystal layer such that the liquid crystal 310 of the liquid crystal layer is spirally twisted with a predetermined pitch.

Next, as shown in FIG. 38, the voltage is applied between the pixel electrode 190 and the common electrode 270 to rearrange the liquid crystal. The applying of the electric field to the liquid crystal may be performed by a method such as by applying a voltage between the two electrodes that are previously formed on the substrate or by applying a voltage between the electrodes that are disposed at the outside thereof. The liquid crystal has the positive dielectric anisotropy such that the liquid crystal is inclined in the direction parallel to the electric field. The electric field is formed perpendicular to the surface of the substrate such that the liquid crystal stands up.

Subsequently, in a state in which the alignment of the liquid crystal is changed through the application of the electric field, by photopolymerizing the monomer or oligomer included in the alignment layer, alignment regulators 13 and 23 that are extended from the inside of the alignment base layers 12 and 22 are formed. The monomer or oligomer included in the lower and upper alignment layers 1*a* and 2*a* is the photopolymerizable material, the polymerization light such as ultraviolet rays is irradiated, and when the monomer or oligomer included in the lower and upper alignment layers 1*a* and 2*a* is the thermal polymerizable material, the monomer or oligomer is heated to the temperature generating the polymerization for the thermal polymerization. The alignment regulator is arranged according to the alignment of the liquid crystal, and even after the applied electric field is removed, the arrangement is maintained to affect the alignment of the liquid crystal such that the liquid crystal is secondarily aligned. Therefore, the liquid crystal may be arranged by the secondary alignment so as to have a polar angle or azimuth angle that is different from that of the primary alignment. The liquid crystal has the pre-tilt by the secondary alignment of the liquid crystal such that the operation direction of the liquid crystal may be previously determined before the electric field is applied, and particularly, the azimuth angle of the pre-tilt directions of the liquid crystal disposed in the first domain D1 and the second domain D2 are opposite to each other by the alignment regulator such that the liquid crystal may be completely aligned in the different directions for each domain.

Accordingly, the alignment directions of the liquid crystal disposed on the boundary between the domains are different per the domains such that the multi-alignment may be completely realized, thereby improving the viewing angle.

Here, by changing the intensity of the voltage that is applied between the pixel electrodes 190 and the common electrode 270, the pre-tilt θ of the alignment regulators 13 and 23 may be controlled. That is, if a strong voltage is applied between the pixel electrodes 190 and the common electrode 270, the liquid crystal is largely rotated and stands up in the direction of the electric field, and if the ultraviolet rays is irradiated in this state, the alignment regulators 13 and 23 have a large pre-tilt θ. On the contrary, if a weak voltage is applied between the pixel electrodes 190 and the common electrode 270, the liquid crystal is slightly rotated and stands up in the direction of the electric field, and if the ultraviolet rays are irradiated in this state, the alignment regulators 13 and 23 have a small pre-tilt θ. The pre-tilt is formed to previously determine the operation direction of the liquid crystal such that it is preferable for a voltage of a middle gray to be applied rather than a voltage of a large or small gray.

Also, if the photopolymerizable monomer or oligomer is mixed with the alignment base material to form the alignment layer and photopolymerized to form the alignment regulator, it is easy to control the pre-tilt of the alignment regulator and a problem that may occur by leaving un-reacted photopolymerizable monomer or oligomer in the liquid crystal layer 3 may be prevented.

Thus far, a method in which, after the liquid crystal is filled between the thin film transistor array panel 100 and the common electrode panel 200, the voltage is applied thereto to form the alignment regulators 13 and 23 has been described. However, unlike this, the liquid crystal may be injected after the alignment regulators 13 and 23 are formed. That is, in a state in which the liquid crystal is not filled between the thin film transistor array panel 100 and the common electrode panel 200, the voltage is applied between the pixel electrodes 190 and the common electrode 270, and the ultraviolet rays are irradiated to the alignment layers 1a and 2a that include the photopolymerizable monomer or oligomer to form the alignment regulators 13 and 23. The liquid crystal is injected after the alignment regulators 13 and 23 are formed.

Next, the compensation layer 24 and the polarizers 11 and 21 are attached and the module process is performed.

Figure 39:
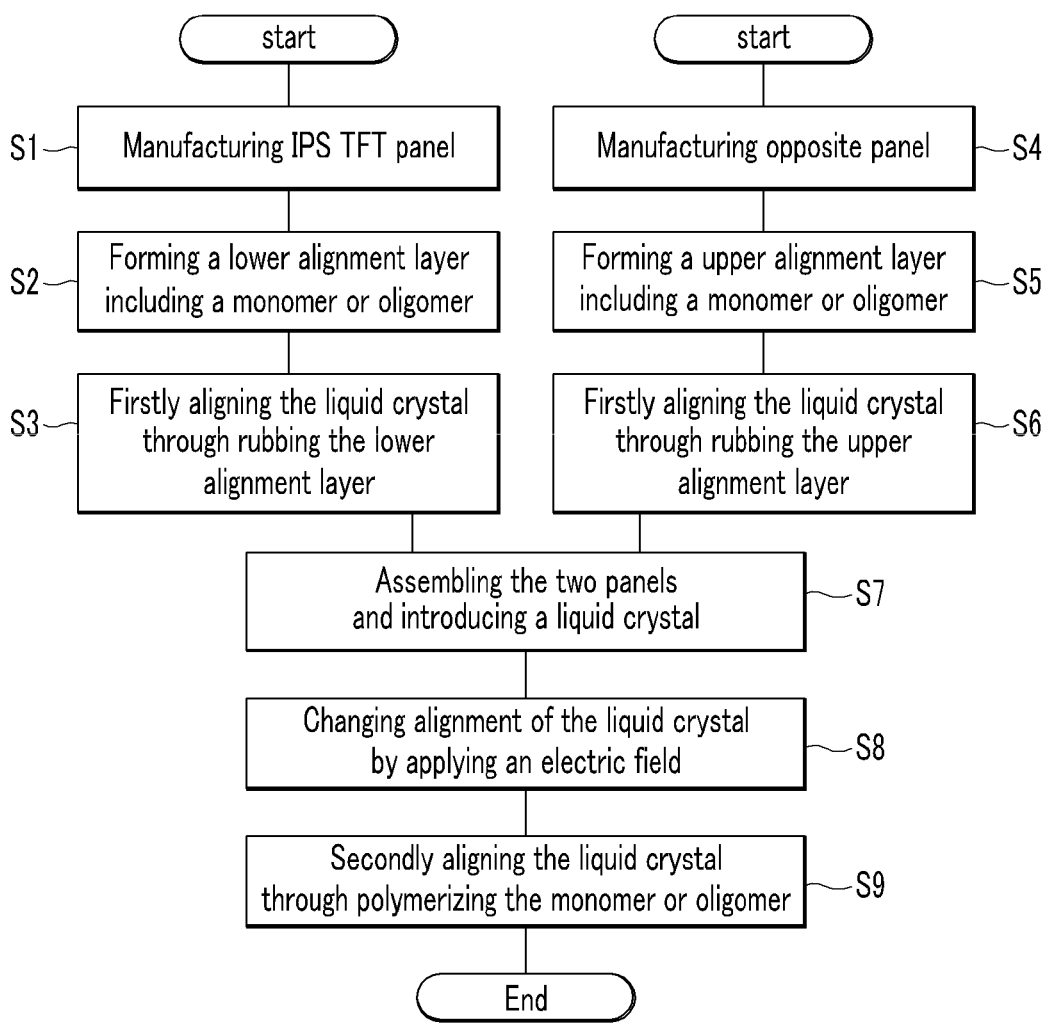
FIG. 39 is a flowchart of a method for aligning a liquid crystal according to another exemplary embodiment of the present invention.

FIG. 39 is a flowchart of a method for aligning a liquid crystal in an in-plane switching (IPS) liquid crystal display according to another exemplary embodiment of the present invention.

Firstly, the IPS mode thin film transistor (TFT) array panel is manufactured (S1). The IPS mode thin film transistor array panel is manufactured by forming a gate line, a data line intersecting the gate line, a thin film transistor having a control electrode and an input electrode connected to the gate line and the data line, a linear pixel electrode connected to an output terminal of the thin film transistor, a linear common electrode facing the linear pixel electrode, and a common electrode line supplying a common voltage to the linear common electrode on an insulation substrate.

The first alignment layer including a monomer or an oligomer is formed on the IPS mode thin film transistor array panel (S2). The first alignment layer may be formed by coating and mixing the photopolymerizable monomer or oligomer with the alignment base material, and hardening the alignment base material. The alignment base material of the first alignment layer may be any one of general materials that are used as an alignment layer of a liquid crystal display. Accordingly, the alignment layer that includes the photopolymerizable monomer or oligomer may act as the alignment layer of the liquid crystal, and the liquid crystal may be aligned according to the properties of the alignment base material in various patterns such as vertical and horizontal patterns.

Here, a polymerization initiator may be added along with the alignment base material and the photopolymerizable monomer or oligomer. It is not absolutely necessary to add the polymerization initiator, however the polymerization may be speedily executed by adding the polymerization initiator.

Next, the first alignment layer is firstly aligned through the rubbing (S3). The first alignment layer is rubbed for the alignment base material to have the property that the liquid crystal is aligned perpendicularly to the surface of the substrate through the first alignment.

On the other hand, an opposite panel for assembling to facing the IPS mode thin film transistor array panel is manufactured (S4). The opposite panel may include a color filter and a light blocking pattern.

Next, the second alignment layer including a monomer or an oligomer is formed on the opposite panel (S5). The second alignment layer may be formed by coating and mixing the photopolymerizable monomer or oligomer with the alignment base material, and hardening the alignment base material. The alignment base material of the second alignment layer may be any one of general materials that are used as an alignment layer of a liquid crystal display. Accordingly, the alignment layer that includes the photopolymerizable monomer or oligomer may act as the alignment layer of the liquid crystal, and the liquid crystal may be aligned according to the properties of the alignment base material in various patterns such as vertical and horizontal patterns.

Here, a polymerization initiator may be added along with the alignment base material and the photopolymerizable monomer or oligomer. It is not absolutely necessary to add the polymerization initiator, however the polymerization may be speedily executed by adding the polymerization initiator.

Next, the second alignment layer is firstly aligned through the rubbing (S6). The second alignment layer is rubbed for the alignment base material to have the property that the liquid crystal is aligned perpendicularly to the surface of the substrate through the first alignment.

Next, the IPS thin film transistor array panel and the opposite panel are assembled, and then a liquid crystal is introduced between two panels (S7).

Here, the introduction of the liquid crystal is performed by using a method for injecting the liquid crystal between the two panels that have the alignment layer including the photopolymerizable monomer or oligomer. Here, the liquid crystal may be injected by adding the photopolymerizable monomer or oligomer.

Next, by applying the electric field to the liquid crystal, the alignment of the liquid crystal is changed (S8). The applying of the electric field to the liquid crystal may be performed by a method such as applying a voltage between the linear pixel electrode and the linear common electrode that are previously formed on the substrate, or by applying a voltage between the electrodes that are disposed at the outside thereof. The change of the alignment of the liquid crystal according to the application of the electric field is performed according to the dielectric anisotropy of the liquid crystal, and in the case of liquid crystal having positive dielectric anisotropy, it is sloped in a direction that is parallel to the electric field, and in the case of the liquid crystal having the negative dielectric anisotropy, it is sloped in a direction that is perpendicular to the electric field. In addition, the degree of change of the alignment of the liquid crystal may vary according to the intensity of the electric field.

Subsequently, in a state in which the alignment of the liquid crystal is changed through the application of the electric field, by photopolymerizing the photopolymerizable monomer or oligomer included in the alignment layer to form an alignment regulator, the liquid crystal is subjected to secondary alignment (S9). The photopolymerization is performed by irradiating light such as ultraviolet rays, which initiates the polymerization of the photopolymerizable monomer or oligomer. The alignment regulator is arranged according to the alignment of the liquid crystal, and even after the applied electric field is removed, the arrangement is maintained to affect the alignment of the liquid crystal. Therefore, the liquid crystal may be arranged by the secondary alignment so as to have a polar angle or azimuth angle that is different from that of the primary alignment. The secondary alignment may be used in order to align the liquid crystal in a predetermined azimuth angle when physical rubbing is not applied to the alignment layer, and to allow the liquid crystal to have a pre-tilt so that an operation direction of the liquid crystal is previously determined before the electric field is applied.

Now, an exemplary embodiment in which the alignment method of the liquid crystal according to an exemplary embodiment of the present invention is applied to an IPS mode liquid crystal display will be described.

Figure 40:
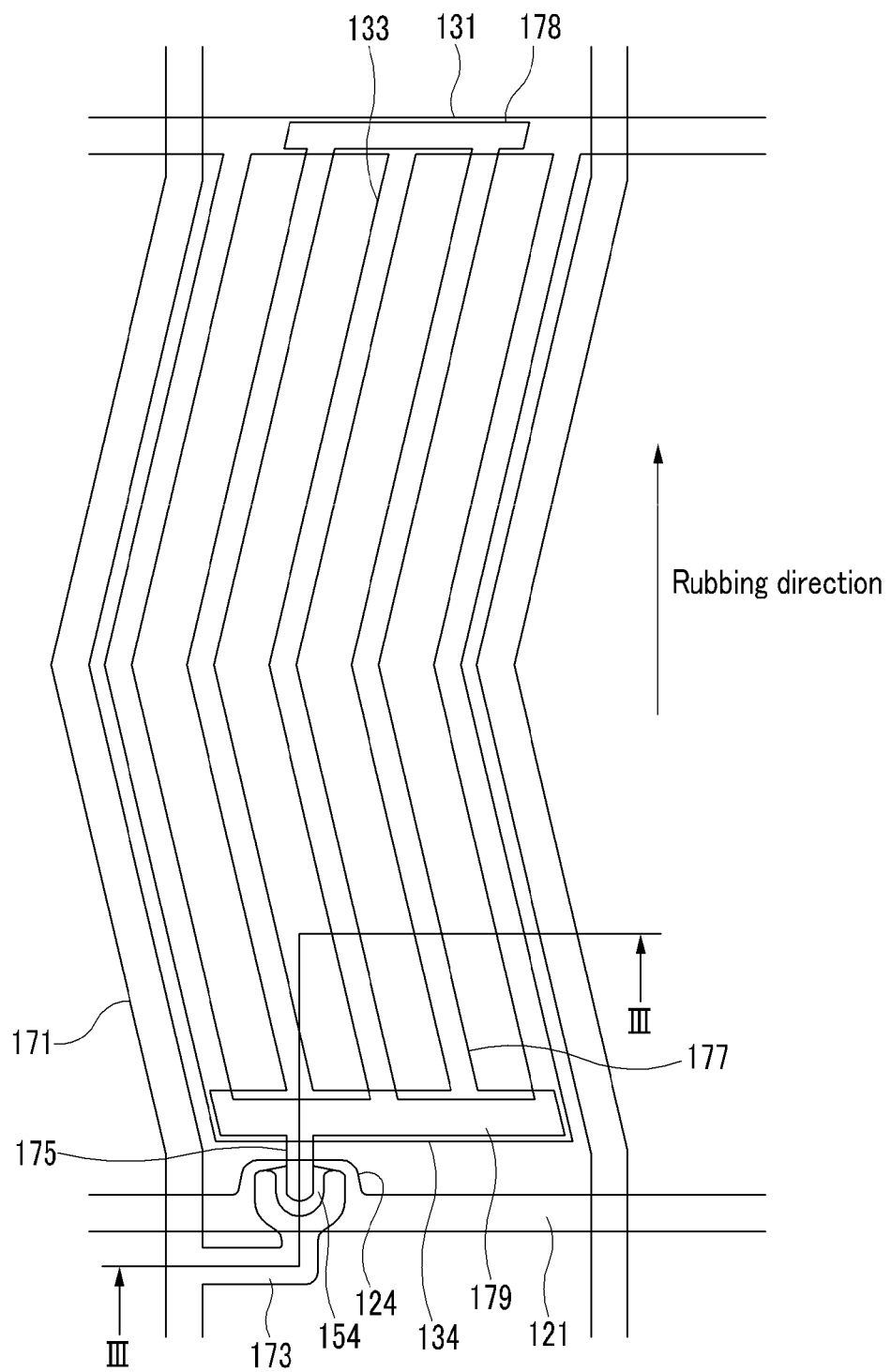
FIG. 40 is a layout view of a liquid crystal display according to another exemplary embodiment of the present invention.
Figure 41:
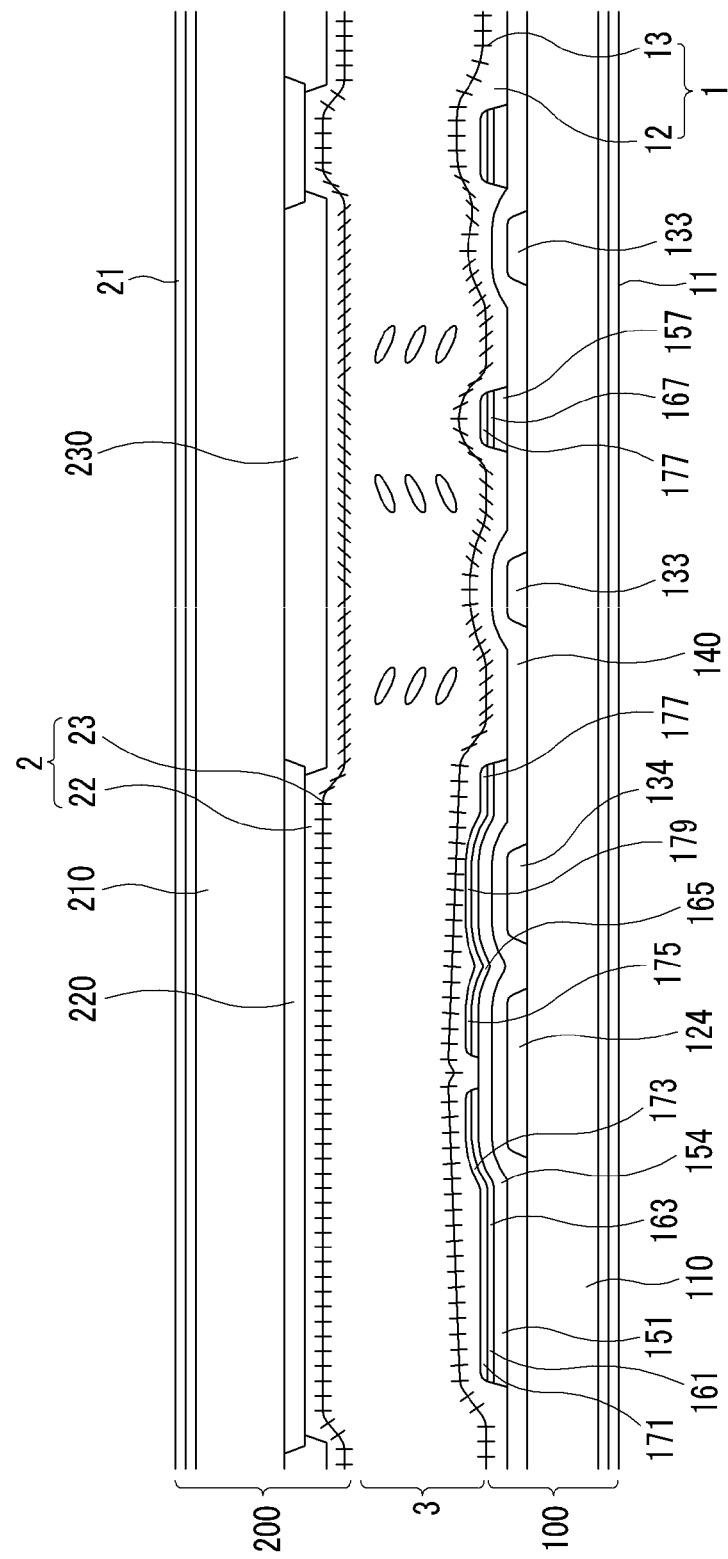
FIG. 41 is a cross-sectional view taken along the line III-III of FIG. 40.

FIG. 40 is a layout view of a liquid crystal display according to an exemplary embodiment of the present invention, and FIG. 41 is a cross-sectional view taken along the line III-III of FIG. 40.

A liquid crystal display according to an exemplary embodiment of the present invention includes a thin film transistor array panel 100, an opposite panel 200, a liquid crystal layer 3, a lower polarizer 11, and an upper polarizer 21.

The thin film transistor array panel 100 includes an insulation substrate 110 and thin film layers that are formed thereon, and the opposite panel 200 includes an insulation substrate 210 and thin films that are formed thereon.

Firstly, the thin film transistor array panel 100 will be described.

A gate line 121 including a gate electrode 124 and a common electrode line 131 are formed in the transverse direction on an insulation substrate 110 made of transparent glass. The common electrode line 131 is connected to linear common electrodes 133 and 134. The gate line 121 receives the scanning signal, and the common electrode line 131 receives the common voltage. The linear common electrodes 133 and 134 include a common electrode portion 133 directly connected to the common electrode line 131, and a common connection 134 connecting the remaining ends of the common electrode portion 133 to each other. The central part of the common electrode portion 133 is curved.

A gate insulating layer 140 is formed on the gate line 121 and the common electrode line 131, intrinsic semiconductors 151, 154, and 157 that are made of amorphous silicon and the like are formed on the gate insulating layer 140, and ohmic contacts 161, 163, 165, and 167 that are made of materials such as n+ hydrogenated amorphous silicon in which a silicide or n-type impurity is doped at a high concentration are formed on the intrinsic semiconductor 151, 154, and 157. For convenience, the intrinsic semiconductors 151, 154, and 157 and the ohmic contacts 161, 163, 165, and 167 may be called semiconductors, and the term "semiconductor" may mean a polysilicon semiconductor, an oxide semiconductor, or the like in addition to the intrinsic semiconductor and the semiconductor made of the ohmic contact layer.

A data line 171 including a plurality of source electrodes 173, a drain electrode 175, and linear pixel electrodes 177, 178, and 179 connected to the drain electrode 175 are formed on the ohmic contacts 161, 163, 165, and 167. The data line 171 receives the image signal voltage. The drain electrode 175 faces the source electrode 173 on the gate electrode 124. The channel unit of the intrinsic semiconductor 154 between the source electrode 173 and the drain electrode 175 is exposed. The linear pixel electrodes 177, 178, and 179 includes a pixel electrode portion 177 extending parallel to the common electrode portion 133, a first pixel connection 179 directly connected to the drain electrode 175 and connecting one end of each of the pixel electrode portions 177 to each other, and a second pixel connection 178 connecting the remaining ends of the pixel electrode portions 177. The central part of the pixel electrode portion 177 is curved like the common electrode portion 133. Also, the data line 171 is curved according to the shape of the pixel electrode portion 177 and the common electrode portion 133.

The data line 171, drain electrode 175, and linear pixel electrodes 177, 178, and 179 may have substantially the same plane shape as the underlying ohmic contacts 161, 163, 165, and 167, and the intrinsic semiconductors 151, 154, and 157 except for the exposed portion between the source electrode 173 and the drain electrode 175 may have substantially the same plane shape as ohmic contacts 161, 163, 165, and 167. Meanwhile, the ohmic contact and the intrinsic semiconductor may be formed with the island shape such that they may be disposed near the gate electrode 124.

The gate electrode 124, the source electrode 173, and the drain electrode 175 form a thin film transistor (TFT) in conjunction with the intrinsic semiconductor 154, and a channel of the thin film transistor is formed on the channel unit of the intrinsic semiconductor 154 between the source electrode 173 and the drain electrode 175.

A lower alignment layer 1 is formed on the data line 171, the drain electrode 175, and the linear pixel electrodes 176, 177, and 178. The lower alignment layer 1 includes an alignment base layer 12 and an alignment regulator 13. The alignment base layer 12 may include at least one of materials that are generally used as the liquid crystal alignment layer, such as a poly-amic acid, a poly-imide, lecithin, nylon, PVA (polyvinyl alcohol), and the like. Accordingly, the liquid crystal is basically aligned according to the property of the alignment base layer 12. The alignment regulator 13 is extended from the inside of the alignment base layer 12, and is formed by photopolymerizing the photopolymerizable monomer or oligomer.

As the photopolymerizable monomer or oligomer, there are a reactive mesogen (RM) NOA series manufactured by Norland, Co., Ltd., and the like.

In the present exemplary embodiment, the lower alignment layer 1 is rubbed in the direction perpendicular to the gate line 121 such that the liquid crystal is sloped in the rubbing direction by the alignment force of the alignment base layer 12. Accordingly, the directors of the liquid crystal are disposed parallel to the surface of the substrates 110 and 210, and are disposed perpendicular to the gate line 121. However, the alignment of the liquid crystal is changed by the alignment force of the alignment regulator 13 such that the director of the liquid crystal forms the angle of more than 0 degrees with respect to the rubbing direction.

Although not shown, an insulating layer for protecting the channel of the intrinsic semiconductor 154 may be further formed between the data line 171, the drain electrode 175 and linear pixel electrodes 177, 178, and 179, and the lower alignment layer 1.

Next, the opposite panel 200 will be described.

A light blocking member 220 is formed on the insulation substrate 210 that is made of transparent glass and the like, and a color filter 230 is formed on each region that is defined by the light blocking member 220.

The color filter 230 and the light blocking member 220 may be formed in the thin film transistor array panel 100.

An upper alignment layer 2 is formed on the color filter 230. The upper alignment layer 2 includes an alignment base layer 22 and an alignment regulator 23. The alignment base layer 22 may include at least one of materials that are generally used as the liquid crystal alignment layer, such as a poly-amic acid, a poly-imide, lecithin, nylon, PVA (polyvinyl alcohol), and the like. Accordingly, the liquid crystal is basically aligned according to the property of the alignment base layer 22. The alignment regulator 23 is extended from the inside of the alignment base layer 22, and is formed by photopolymerizing the photopolymerizable monomer or oligomer.

As the photopolymerizable monomer or oligomer, as described above, there are a reactive mesogen (RM), NOA series manufactured by Norland, Co., Ltd., and the like.

In the present exemplary embodiment, the upper alignment layer 2 is also rubbed in the direction perpendicular to the gate line 121 such that the liquid crystal is sloped in the rubbing direction by the alignment force of the alignment base layer 22. Accordingly, the director of the liquid crystal are disposed parallel to the surface of the substrates 110 and 210, and are disposed perpendicular to the gate line 121. However, the alignment of the liquid crystal is changed by the alignment force of the alignment regulator 23 such that the director of the liquid crystal forms the angle more than 0 degrees with respect to the rubbing direction.

The liquid crystal layer 3 includes the liquid crystal that has positive dielectric anisotropy and is arranged parallel to the surface of the substrates 110 and 210 by alignment force of the alignment base layers 12 and 22, and the liquid crystal that is adjacent to the lower alignment layer 1 and the upper alignment layer 2 has a pre-tilt of more than 0 degrees with respect to the rubbing direction by effect of the alignment regulator of the lower alignment layer 1 and the upper alignment layer 2.

As described above, if the liquid crystal has the pre-tilt, since the liquid crystal of all regions is immediately sloped according to the pre-tilt when the electric field is applied, the response speed is very fast. Accordingly, a residual image problem of the motion picture may be solved.

When injecting the liquid crystal by adding the photopolymerizable monomer or oligomer, the alignment regulator by which the lower alignment layer 1 and the upper alignment layer 2 are separated may exist in the liquid crystal layer 3, and the photopolymerizable monomer or oligomer that is not photopolymerized may remain.

The lower polarizer 11 and the upper polarizer 21 may be disposed to enable transmissive axes thereof to cross each other.

A method for manufacturing the liquid crystal display according to an exemplary embodiment of the present invention will be described with reference to FIG. 40 and FIG. 41.

First, a thin film layer that includes various wiring, thin film transistors, and the linear common electrode 133 and 134 and the linear pixel electrode 177, 178, and 179 is formed on the insulation substrate 110 by using a thin film deposition method, a photolithography method, a photo-etching method, and the like. In addition, the thin film layer that includes the light blocking member 220 and the color filter 230 is formed on the insulation substrate 210 by using a thin film deposition method, a photolithography method, a photo-etching method, and the like.

Next, the alignment base material and the photopolymerizable monomer or oligomer are mixed with each other and coated on the thin film layer of the thin film transistor array panel 100, and are subjected to heat treatment (curing) at a temperature in the range of 100 to 180° C. for 0.5 to 1 hour to cure the alignment base material, thereby forming a lower alignment layer 1 that includes the photopolymerizable monomer or oligomer. In addition, the alignment base material and the photopolymerizable monomer or oligomer are mixed with each other and coated on the thin film layer of the opposite panel 200, and are subjected to heat treatment (curing) at a temperature in the range of 100 to 180° C. for 0.5 to 1 hour to cure the alignment base material, thereby forming an upper alignment layer 2 that includes the photopolymerizable monomer or oligomer.

Here, the alignment base material may include at least one of materials that are generally used as the liquid crystal alignment layer, such as a poly-amic acid, a poly-imide, lecithin, nylon, PVA (polyvinyl alcohol), and the like. Accordingly, the lower alignment layer 1a and the upper alignment layer 2a that include the photopolymerizable monomer or oligomer may serve to perform alignment of the liquid crystal according to the property of the alignment base layers 12 and 22. As the photopolymerizable monomer or oligomer, as described above, a reactive mesogen (RM), NOA series manufactured by Norland, Co., Ltd., and the like may be used.

Subsequently, the thin film transistor array panel 100 and the opposite panel 200 are assembled. The assembling of these panels 100 and 200 may be performed by using either of two methods.

As a first method, a sealant is coated on either of the thin film transistor array panel 100 and the opposite panel 200 to define a region on which the liquid crystal is filled, the liquid crystal is dripped on the defined region, and the thin film transistor array panel 100 and opposite panel 200 are arranged and bonded. At this time, a spacer for maintaining an interval between the two panels 100 and 200 may be dispersed before or after the coating of the liquid crystal. The spacer may be previously formed on the thin film transistor array panel 100 and the opposite panel 200 through a forming process of the thin film. Here, the liquid crystal may be dripped after adding the photopolymerizable monomer or oligomer thereto.

As a second method, the sealant is coated on either one of the thin film transistor array panel 100 and the opposite panel 200 to define the region at which the liquid crystal is filled and having a liquid crystal injection hole, and the two panels 100 and 200 are arranged and bonded. Next, there is a method in which, in a vacuum state, the liquid crystal injection hole is dipped in a liquid crystal storage bath, the vacuum is removed to inject the liquid crystal, and the liquid crystal injection hole is sealed. Here, the liquid crystal may be dripped by adding the photopolymerizable monomer or oligomer.

Subsequently, in a state in which the voltage is applied between the linear pixel electrode 177, 178, and 179, and the linear common electrode 133 and 134 to rearrange the liquid crystal, light such as ultraviolet rays and the like is irradiated onto the lower and upper alignment layers 1 and 2 to photopolymerize the photopolymerizable monomer or oligomer. Thereby, as shown in FIG. 1, the alignment regulators 13 and 23 that are extended from the inside of the alignment base layers 12 and 22 are formed. The alignment regulators 13 and 23 have a pre-tilt according to the arrangement state of the liquid crystal.

Here, by changing the intensity of the voltage that is applied between the linear pixel electrode 177, 178, and 179, and the linear common electrode 133 and 134, the pre-tilt angle of the alignment regulators 13 and 23 may be controlled. That is, if a strong voltage is applied between the linear pixel electrode 177, 178, and 179, and the linear common electrode 133 and 134, the liquid crystal lies almost perpendicular with respect to the linear pixel electrodes 177, 178, and 179, and the linear common electrode 133 and 134, and in this state, if the ultraviolet rays are irradiated thereon, the alignment regulators 13 and 23 have a large pre-tilt. On the contrary, if a weak voltage is applied between the linear pixel electrode 177, 178, and 179, and the linear common electrode 133 and 134, the liquid crystal stands up almost parallel to the rubbing direction, and in this state, if the ultraviolet rays are irradiated thereon, the alignment regulators 13 and 23 have a small pre-tilt.

As described above, if the photopolymerizable monomer or oligomer is mixed with the alignment base material to form the alignment layer and photopolymerized to form the alignment regulator, it is easy to control the pre-tilt of the alignment regulator, and a problem that may occur by leaving un-reacted photopolymerizable monomer or oligomer in the liquid crystal layer 3 may be prevented.

Thus far, a method in which, after the liquid crystal is filled between the thin film transistor array panel 100 and the opposite panel 200, the voltage is applied thereto to form the alignment regulators 13 and 23 has been described. However, unlike this, the liquid crystal may be injected after the alignment regulators 13 and 23 are formed. That is, in a state in which the liquid crystal is not filled between the thin film transistor array panel 100 and the opposite panel 200, the voltage is applied between the linear pixel electrode 177, 178, and 179, and the linear common electrode 133 and 134 and the ultraviolet rays are irradiated to the alignment layers 1 and 2 that include the photopolymerizable monomer or oligomer to form the alignment regulators 13 and 23. The liquid crystal is injected after the alignment regulators 13 and 23 are formed.

Next, the module process is performed.

Another exemplary embodiment of the present invention will now be described.

Figure 42:
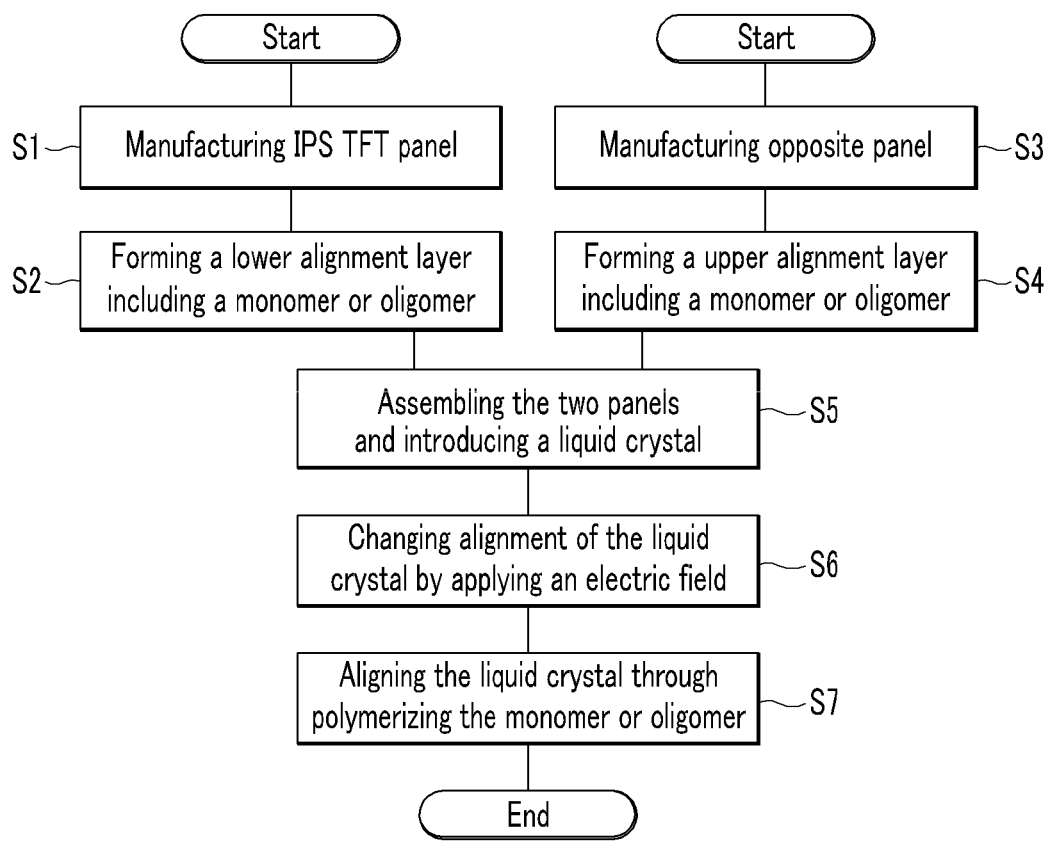
FIG. 42 is a flowchart of a method for aligning a liquid crystal according to another exemplary embodiment of the present invention.

FIG. 42 is a flowchart of a method for aligning a liquid crystal according to another exemplary embodiment of the present invention.

The first alignment by rubbing the lower alignment layer and the upper alignment layer is omitted in a method for aligning a liquid crystal of FIG. 42, differently from the method for aligning the liquid crystal of FIG. 39. That is, the aligned liquid crystal according to the alignment characteristic of the alignment base layer that is not rubbed is aligned by the alignment force of the alignment regulator. For example, when the alignment base layer is formed of the material having the vertical alignment characteristic, the director of the liquid crystal is aligned perpendicularly to the surface of the substrate. If the voltage is applied between the linear pixel electrode and the linear common electrode in this state, the liquid crystal is rearranged in the direction parallel to the electric field formed between the linear pixel electrode and the linear common electrode. By controlling the intensity of the voltage between the linear pixel electrode and the linear common electrode, the liquid crystal may be controlled to have the slope inclined in the direction of the electric field formed between pixel electrode and the linear common electrode. Accordingly, the director of the liquid crystal forms an angle of less than 90 degrees with respect to the surface of the substrate. In this state, if the ultraviolet rays are irradiated to polymerize the monomer or the oligomer thereby forming the alignment regulator, the alignment regulator has the pre-tilt angle such that the director of the liquid crystal maintains the inclination state of the pre-tilt after removing the electric field.

Figure 43:
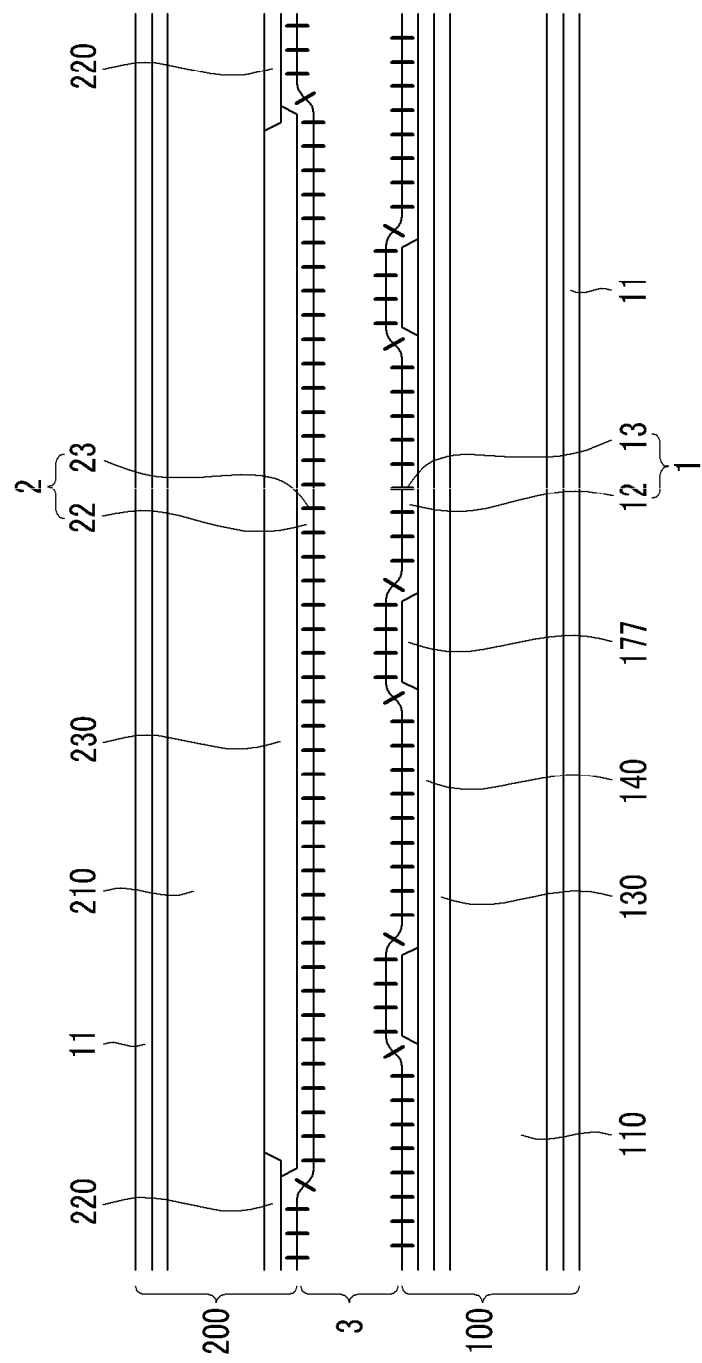
FIG. 43 is a cross-sectional view of a liquid crystal display according to another exemplary embodiment of the present invention.

FIG. 43 is a cross-sectional view of a liquid crystal display according to another exemplary embodiment of the present invention.

The liquid crystal display according to another exemplary embodiment of the present invention includes a thin film transistor array panel 100, a common electrode panel 200, a liquid crystal layer 3, a lower polarizer 11, and an upper polarizer 21.

The thin film transistor array panel 100 includes an insulation substrate 110 and thin film layers that are formed thereon, and the common electrode panel 200 includes an insulation substrate 210 and thin films that are formed thereon.

The thin film transistor array panel 100 includes thin film transistors (not shown), a surface type common electrode 130, linear electrodes 177, and an insulating layer insulating the common electrode 130 from the linear electrode 177. A lower alignment layer 1 is formed on the linear electrode 177. The lower alignment layer 1 includes an alignment base layer and a plurality of alignment regulators 13. The alignment base layer 12 may include at least one of materials that are generally used as the liquid crystal alignment layer such as a poly-amic acid, a poly-imide, lecithin, nylon, PVA (polyvinyl alcohol), and the like. Accordingly, the liquid crystal is basically aligned according to the property of the alignment base layer 12. The alignment regulator 13 is extended from the inside of the alignment base layer 12, and is formed by photopolymerizing the photopolymerizable monomer or oligomer. As the photopolymerizable monomer or oligomer, there are a reactive mesogen (RM) NOA series manufactured by Norland, Co., Ltd., and the like.

Next, the opposite panel 200 will be described.

A light blocking member 220 is formed on the insulation substrate 210 that is made of transparent glass and the like, and a color filter 230 is formed on each region that is defined by the light blocking member 220. The color filter 230 and the light blocking member 220 may be formed in the thin film transistor array panel 100.

An upper alignment layer 2 is formed on the color filter 230. The upper alignment layer 2 includes an alignment base layer 22 and an alignment regulator 23. The alignment base layer 22 may include at least one of materials that are generally used as the liquid crystal alignment layer, such as a poly-amic acid, a poly-imide, lecithin, nylon, PVA (polyvinyl alcohol), and the like. Accordingly, the liquid crystal is basically aligned according to the property of the alignment base layer 22. The alignment regulator 23 is extended from the inside of the alignment base layer 22, and is formed by photopolymerizing the photopolymerizable monomer or oligomer. As the photopolymerizable monomer or oligomer, as described above, there are a reactive mesogen (RM), NOA series manufactured by Norland, Co., Ltd., and the like.

Liquid crystals of the present embodiment also have pre-tilt due to influence of the alignment regulator 13 and 23. Since the liquid crystals of all regions are immediately sloped according to the pre-tilt when the electric field is applied, the response speed is very fast. Accordingly, a residual image problem of the motion picture may be solved.

When injecting the liquid crystal with the photopolymerizable monomer or oligomer added thereto, the alignment regulator by which the lower alignment layer 1 and the upper alignment layer 2 are separated may exist in the liquid crystal layer 3, and some photopolymerizable monomer or oligomer that is not photopolymerized may remain.

The lower polarizer 11 and the upper polarizer 21 may be disposed to enable transmissive axes thereof to cross each other.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for manufacturing a liquid crystal display, comprising:
   forming a first electrode on a first region and a second region of the first substrate;
   forming a second electrode on a second substrate;
   forming a first alignment layer that comprises a first alignment base layer and first alignment regulators on one of the first substrate and the second substrate;
   introducing a liquid crystal between the first substrate and the second substrate;
   applying a first voltage between the first electrode and the second electrode while irradiating light to the first alignment layer to form a first pre-tilt in the first alignment layer in the first region while preventing the light from irradiating to the first alignment layer in the second region; and
   after the applying the first voltage, applying a second voltage between the first electrode and the second electrode while irradiating light to the first alignment layer to form a second pre-tilt in the first alignment layer in the second region,
   wherein the first voltage and the second voltage are different from each other, and wherein the first pre-tilt and the second pre-tilt are tilting angles of the first alignment regulators with respect to the first alignment base layer and are different from each other.

2. The method of claim 1, further comprising forming a first domain division means in the first electrode.

3. The method of claim 2, wherein the first domain division means is a cutout formed together in the patterning of the first electrode.

4. The method of claim 3, further comprising forming a second domain division means in the second electrode.

5. The method of claim 4, wherein the second domain division means is a cutout formed together in the patterning of the second electrode.

6. The method of claim 5, further comprising, before the introducing of the liquid crystal between the first substrate and the second substrate, forming a second alignment layer that comprises a second alignment base layer and a plurality of second alignment regulators on one of the first substrate and the second substrate.

7. The method of claim 6, further comprising:
forming a gate line on the first substrate; and forming a data line insulated from and crossing the gate line, a drain electrode extended from the data line, and a capacitive coupling electrode connected to the drain electrode,
wherein the first electrode includes the first subpixel electrode connected to the drain electrode, and the second subpixel electrode separated from the first subpixel electrode and overlapping the capacitive coupling electrode.

8. The method of claim 7, further comprising:
forming a thin film transistor connected to the gate line and the data line, and having a drain electrode, wherein the first electrode is connected to the thin film transistor through the drain electrode, and
wherein the first electrode includes first and second pixel electrodes, the gate line includes a first gate line and a second gate line respectively disposed for the first and the second pixel electrodes, the thin film transistor includes first and second thin film transistors respectively connected to the first and the second pixel electrodes, the first and the second gate lines, and the data line, and the drain electrode includes first and second drain electrodes.

* * * * *